(12) United States Patent
Takahara et al.

(10) Patent No.: US 7,176,989 B2
(45) Date of Patent: Feb. 13, 2007

(54) LCD WITH RELAY LAYER CONNECTING PIXEL ELECTRODE WITH STORAGE CAPACITOR THAT ALSO COVERS THE STORAGE CAPACITOR

(75) Inventors: Kenichi Takahara, Chino (JP); Hisaki Kurashina, Matsumoto (JP); Yuichi Shimizu, Sutama-cho (JP)

(73) Assignee: Seiko Epson Corporation, Tokyo (JP)

( * ) Notice: Subject to any disclaimer, the term of this patent is extended or adjusted under 35 U.S.C. 154(b) by 108 days.

(21) Appl. No.: 10/694,019

(22) Filed: Oct. 28, 2003

(65) Prior Publication Data
US 2004/0141097 A1    Jul. 22, 2004

(30) Foreign Application Priority Data
Oct. 31, 2002   (JP)   ............................. 2002-318546
Sep. 12, 2003   (JP)   ............................. 2003-321785

(51) Int. Cl.
*G02F 1/1343*    (2006.01)

(52) U.S. Cl. ..................... 349/39; 349/110; 349/111; 349/38

(58) Field of Classification Search ............ 349/38–39, 349/43–44, 110–111, 29
See application file for complete search history.

(56) References Cited

U.S. PATENT DOCUMENTS 5,734,455 A * 3/1998 Yoshida et al. ............... 349/99
6,088,070 A * 7/2000 Ohtani et al. ............... 349/38
6,597,413 B2   7/2003 Kurashina
6,665,024 B2  12/2003 Kurashina
6,825,891 B2  11/2004 Kurashina
2002/0018278 A1* 2/2002 Sato ........................... 359/245
2003/0016311 A1* 1/2003 Sato et al. .................... 349/43

FOREIGN PATENT DOCUMENTS

JP        A-01-102525       4/1989
JP        A 2002-156652     5/2002
JP        2002215064     *  7/2002
KR        A-2002-0026193    4/2002

* cited by examiner

*Primary Examiner*—Andrew Schechter
*Assistant Examiner*—Phu Vu
(74) *Attorney, Agent, or Firm*—Oliff & Berridge, PLC

(57) ABSTRACT

An electro-optical device including, above a substrate: data lines extending in a first direction, scanning lines extending in a second direction which intersects the data lines, pixel electrodes and thin film transistors provided so as to correspond to intersection regions of the data lines and the scanning lines, and storage capacitors electrically connected to the thin film transistors and the pixel electrodes. Dielectric films which constitute the storage capacitors are made of a plurality of layers including different materials and one of the plurality of layers is made of a material having a higher dielectric constant than those of the other layers.

20 Claims, 27 Drawing Sheets

F I G. 1
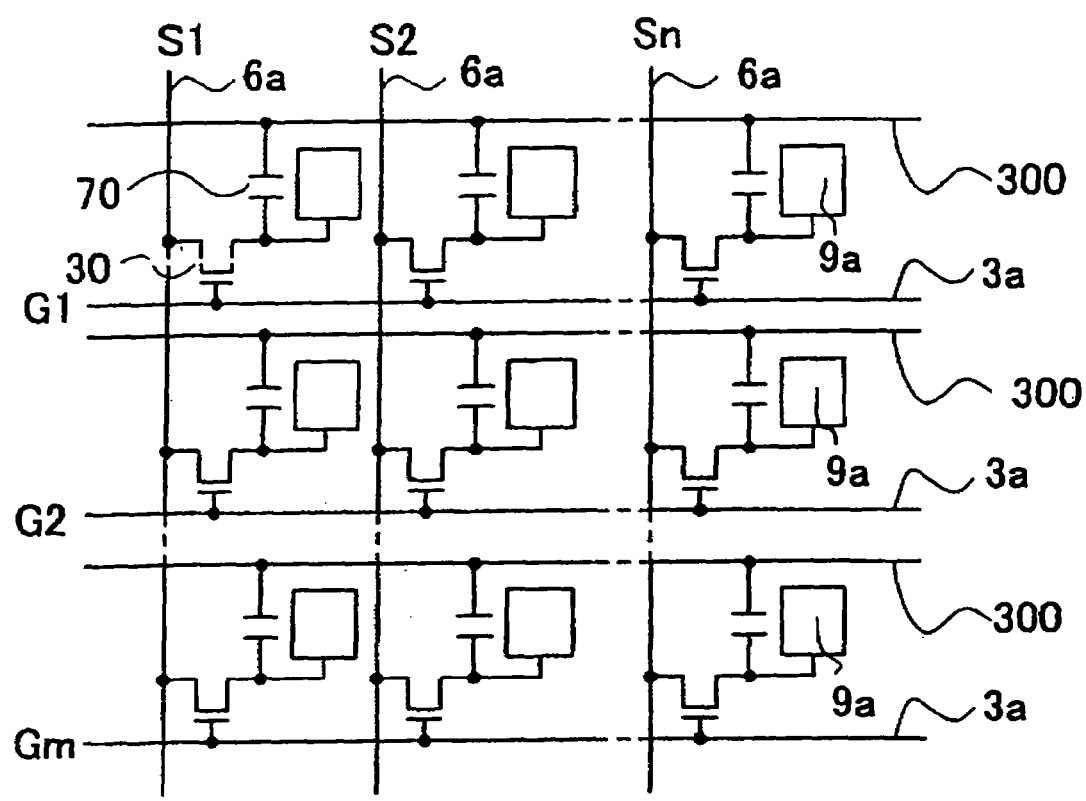

LCD WITH RELAY LAYER CONNECTING PIXEL ELECTRODE WITH STORAGE CAPACITOR THAT ALSO COVERS THE STORAGE CAPACITOR

BACKGROUND OF THE INVENTION

1. Field of Invention

The present invention relates to a technical field of electro-optical devices such as liquid crystal devices, and electronic apparatuses. The present invention also relates to a technical field of an electrophoresis device, such as an electronic paper, an EL (electroluminescent) device, and a device using an electron emission element (a field emission display and a surface-conduction electron-emitter display).

2. Description of Related Art

In the related art, an electro-optical device, such as a liquid crystal device capable of displaying an image, in which an electro-optical material, such as liquid crystal, is interposed between a pair of substrates and light is transmitted so as to pass through the substrates and the electro-optical material, is disclosed. "Displaying the image" is realized, for example, by changing the state of an electro-optical material in each pixel to change the transmittance ratio of light and by causing light with different gray scale levels to be sensed in each pixel.

As such an electro-optical device, an active-matrix driven electro-optical device has been proposed which includes, on one of the pair of substrates, pixel electrodes arranged in a matrix, scanning lines and data lines positioned to thread through the pixel electrodes, and TFTs (thin film transistors) as pixel switching elements. According to the electro-optical device capable of being active matrix driven, the TFTs are provided to control conduction between the pixel electrodes and the data lines. The TFTs are electrically connected to the scanning lines and the data lines. Therefore, it is possible to control the turning on and off of the TFTs through the scanning lines and to apply image signals received through the data lines to the pixel electrodes, that is, to change the transmittance ratio of light in each pixel when the TFTs are turned on.

According to the above-mentioned electro-optical device, the above-mentioned various components are formed on one substrate. However, when the components are expanded two-dimensionally, the components occupy a large area, and a pixel aperture ratio, that is, a ratio of a region through which light passes to the entire surface of the substrate may decrease. Therefore, even in the related art, a method of forming the above-mentioned various components three-dimensionally, that is, a method of laminating the various components by interposing interlayer insulating layers is adopted. More specifically, the TFTs and the scanning lines, functioning as gate electrode films of the TFTs, are formed on the substrate. The data lines are formed on the TFTs and the scanning lines. The pixel electrodes are formed on the data lines. According to such a construction, it is possible to enhance the pixel aperture ratio by appropriately arranging the various components as well as to miniaturize the electro-optical device.

It is natural and essential for the electro-optical devices to demand a high quality display, and moreover, miniaturization, high accuracy, and high frequency driving. In order to meet the demands, many technical problems have to be solved. Specifically, for example, there is a problem of the so-called light leakage current which is generated when light enters the semiconductor layers constituting the aforementioned TFTs. The light leakage current is one of the obstacles to the high quality image display and the high frequency driving. Therefore, light-shielding devices are necessary for the semiconductor layers. Furthermore, for the purpose of implementing the electro optical apparatus with high contrast, storage capacitors, that is, condensers are sometimes provided to electrically connect the TFTs to pixel electrodes, and the capacitance value of the storage capacitor should be as large as possible. However, the implementation is difficult because of the complexity in the laminated structure and the problems associated with the aperture ratio as described above. Furthermore, much attention has to be given to the liquid crystal, which is an example of the electro optical materials, in order to avoid any unnecessary external disturbance from being added to the alignment states of the liquid crystal molecules.

Like this, although there are many problems to be addressed, it is believed that the aforementioned problems have to be totally considered and the overall measures have to be taken to achieve high quality image display by addressing the aforementioned problems in relation to miniaturization, high accuracy, and high frequency driving in the electro optical apparatus.

SUMMARY OF THE INVENTION

The present invention addresses the above problems. The present invention is to provide an electro-optical device capable of implementing miniaturization with high accuracy and displaying high quality of images with high frequency driving by taking overall measures. The present invention also provides an electronic apparatus including the electro-optical device.

An electro-optical device according to an aspect of the present invention includes, above a substrate, data lines extending in a first direction, scanning lines extending in a second direction which intersects the data lines, pixel electrodes and thin film transistors provided so as to correspond to intersection regions of the data lines and the scanning lines, and storage capacitors electrically connected to the thin film transistors and the pixel electrodes. In addition, dielectric films which constitute the storage capacitors are made of a plurality of layers including different materials and one of the plurality of the layers is made of a material having a higher dielectric constant than those of the other layers.

First, the electro-optical device of an aspect of the present invention can be driven in an active matrix by including the scanning lines, the data lines, the pixel electrodes, and the thin film transistors. Furthermore, in the above electro-optical device, it is possible to achieve miniaturization of the whole apparatus by including the aforementioned various constituents as part of the laminated structure. It is also possible to enhance the pixel aperture ratio by arranging the various constituent appropriately.

Moreover, in the present configuration, other than the aforementioned various constituents, particularly the storage capacitors, the shielding layers, and the interlayer insulating films are provided as the constituents of the laminated structure.

First, provision of storage capacitors enables an aspect of the present invention to enhance a potential holding property of the pixel electrodes. By doing so, it is possible to display images with high contrast. In addition, particularly, in an aspect of the present invention, the dielectric films which constitute the storage capacitors are formed with a plurality of layers including different materials. One of the plurality of the layers is made of a material having a higher dielectric constant than those of the other layers. Therefore, the storage capacitor in accordance with an aspect of the present invention has further excellent charge storage characteristics in comparison to the related art, and by doing so, it is possible to further enhance the charge storage characteristics of the pixel electrodes. As a result, it is possible to display images with higher quality. Furthermore, construction of the laminated structure enables reduction of the disorder caused by a pinhole in a single-layered film. In addition, "high dielectric constant material" referred in an aspect of the present invention includes an insulating material which is made of at least one of TaOx (tantalum oxide), BST (barium strontium titanate), PZT (lead zirconate titanate), $TiO_2$ (Titanium dioxide), $ZiO_2$ (zirconium dioxide), $HfO_2$ (hafnium dioxide), and SiON (silicon oxynitride) other than the below-described SiN (silicon nitride). In particular, by using a high dielectric constant material such as TaOx, BST, PZT, $TiO_2$, $ZiO_2$, and $HfO_2$, it is possible to increase the capacitance value on the limited area on the substrate. Alternatively, by using a material comprising silicon such as $SiO_2$ (silicon dioxide), SiON (silicon oxynitride), and SiN, it is possible to reduce the occurrence of the stress in the interlayer insulating films, etc.

Second, provision of shielding layers between the data lines and the pixel electrodes enables reduction or prevention of the occurrence of capacitance couplings between the data lines and the pixel electrodes.

Namely, the electrical conduction of data lines enables reduction of the probability of the occurrence of potential variation in the pixel electrodes, and thus, it is possible to display images with higher quality.

Furthermore, in the aspect of the present invention, it is preferable that the interlayer insulating films be formed below the pixel electrodes, and the surfaces of the interlayer insulating films are planarized by, for example, CMP (chemical mechanical polishing) process, etc. By doing so, it is possible to reduce the probability of the occurrence of disorder of the alignment state of the electro-optical material such as liquid crystal, etc., and thus, it is possible to display images with higher quality.

According to the electro-optical device of an aspect of the present invention, it is possible to display images with high quality by exhibiting various functions and effects as described above.

In such a construction that the surface of the interlayer insulating film is planarized similarly to the aforementioned aspect of the present invention, in a case where every scanning line or every row of the pixel electrodes, which are connected to the scanning lines, is driven by the different polarities (that is, the "1H inversion driving", see the later description), since the transverse electric field may occur between the adjacent pixel electrodes, disorder of the alignment state of liquid crystal may occur. In this point, as described below, although suppressing the occurrence of the transverse electric field by convex portions being provided at the surface of the interlayer insulating film, etc. is preferable, other devices may be preferably employed as follows.

Namely, the inversion of the polarity may be performed, not for every scanning line, but for every one field period (one vertical scanning period). In other words, the "IV inversion driving" is performed. By doing so, since the adjacent pixel electrodes are not driven by the different polarities during any field period, the transverse electric field cannot occur in principle.

However, if the 1V inversion driving is employed, the following problems occur. Namely, one of the difficult problems is that the flicker may occur on the image whenever the polarity is inverted, that is, every one vertical scanning period.

Therefore, in these cases, as described later in details in exemplary embodiments, a multiplication-speed field inversion driving is preferable. Herein, the multiplication-speed field inversion driving is a driving manner in which the one field period is shortened by half in comparison to the related art period (for example, assuming that the conventional period is driven at 120 [Hz], the "half" is preferably ⅟60 [s] or less). Therefore, in a case of the 1V inversion driving, the period of the inversion of the polarity is a half of the related art period. By doing so, the one vertical scanning period is shortened. In other words, the changeover between the screen corresponding to the positive polarity and the screen corresponding to the negative polarity is further rapidly carried out, so that the aforementioned flicker cannot be perceived by human eyes.

Like this, in accordance with the multiplication-speed field inversion driving manner, it is possible to display images with higher quality without flicker.

According to one aspect of the electro-optical device of the present invention, the dielectric films are made of silicon oxide films and silicon nitride films.

According to the above aspect, since the dielectric films include the silicone nitride films which have relatively high dielectric constant, even if the area of the storage capacitor, that is, the area of a pair of electrodes constituting each of the storage capacitors is sacrificed, it is possible to obtain high charge storage characteristics.

By doing so, it is possible to further enhance the potential holding property of the pixel electrodes and to display images with higher quality. Furthermore, since the storage capacitor can be implemented in a small area, it is possible to further enhance the pixel aperture ratio.

Furthermore, since the silicon nitride film has an excellent function of reducing or preventing water from permeating or diffusing, it is possible to reduce or prevent water from permeating the semiconductor layers which constitute the thin film transistors. If water permeates the semiconductor layers, gate insulating films, or the like, a bad effect is caused such that the positive charges occur at the boundary surfaces between the semiconductor layers and the gate insulating films, and thus, the threshold voltage will gradually increase. In this aspect, as described above, since the permeation of water into the semiconductor layers can be effectively reduced or prevented, it is possible to reduce or prevent the occurrence of the problem in that the threshold voltages of the thin film transistors greatly increase.

In addition, since the dielectric films include the silicon oxide film as well as the aforementioned silicon nitride film, the dielectric strength of the storage capacitors will never decrease.

Like this, in accordance with the dielectric films of this aspect, it is possible to obtain multiple functions and effect simultaneously.

In addition, the present aspect includes a case wherein the dielectric films are constructed in a two-layered structure of a silicon oxide film and a silicon nitride film, and also, a case wherein the dielectric film are constructed in a three-layered structure of, for example, a silicon oxide film, a silicon nitride film, and a silicon oxide film, or a case wherein the dielectric films are constructed in a more-than-three-layered structure.

In another aspect of the electro-optical device according to the present invention, each of the data lines is formed of the same film as one of a pair of electrodes which constitute each of the storage capacitors.

According to the above aspect, each data line and one electrode of a pair of electrodes which constitute each of the storage capacitors are made of the same film, in other words, formed on the same layer, or formed in the same manufacturing process. By doing so, it is not necessary to provide both of each of the data lines and one electrode on separate layers and to separate them by interlayer insulating films. Thus, it is possible to avoid a highly laminated structure. At this point, the aspect of the present invention is advantageous in that the laminated structure includes the shielding layers formed between the data lines and the pixel electrodes, and thus, a highly laminated structure which has an altitude increase is expected. The reason for such an advantage is that, excessively multi-layered structure obstructs easy manufacturing or high manufacturing yield. In addition, even though the data lines and the one electrode of a pair of the electrodes are formed at the same time, as in this aspect, by an appropriate patterning process on the aforementioned films, it is possible to facilitate the insulation between them, and no particular problem occurs with respect to this point.

In addition, conversely, as apparent from the description of the aspect, in the aspect of the present invention, it is not always necessary to form each of the data lines and the one electrode of a pair of electrodes which constitute each of the storage capacitor as the same film. In other words, they may be separately formed in the different layers.

Furthermore, in the electro-optical device of the present aspect, it is preferable that the data lines include a laminated body of an aluminum film and a conductive polysilicon film.

According to the above aspect, it is possible to implement electrical connection between the data lines and the thin film transistors by the contact of the conductive polysilicon film which constitute the data lines and the semiconductor layers which constitute the thin film transistors, so that a good electrical connection between them can be obtained.

In another aspect of the electro-optical device according to the present invention, the electro-optical device further includes relay layers, as a part of a laminated structure, to electrically connect each of the pixel electrodes to one of a pair of electrodes which constitute each of the storage capacitors.

According to the above aspect, the one electrode of a pair of electrodes of each of the storage capacitor and the pixel electrodes which constitute part of the laminated structure are electrically connected by the relay layer which constitutes part of the laminated structure. Specifically, such connection may be performed through contact holes. By doing so, the relay layers according to the present invention are formed of a two-layered structure, in which the upper layer is made of a material which is very compatible with ITO, an example of a transparent conductive material which is generally used as a material of the pixel electrode. The lower layer is made of a material which is compatible with one electrode of a pair of electrodes which constitute each of the storage capacitor. Like this, since the relay layer can employ such a flexible construction, it is possible to further suitably implement the application of voltage to the pixel electrodes or the potential holding in the pixel electrodes.

In the aspect, particularly, it is preferable that the relay layers include an aluminum film and a nitride film.

In accordance with the construction, in a case where the pixel electrodes include, for example, ITO, if the ITO and the aluminum are directly contacted, electrical erosion occurs between them, and thus, the disconnection of aluminum or the insulation due to generation of alumina occurs, which is not desirable. Therefore, in this aspect, the ITO does not directly contact with aluminum, but the ITO contacts with a nitride film, for example, a titanium nitride film, so that electrical connection between the pixel electrodes and the relay layer and thus to the storage capacitors can be achieved. Thus, the present construction provides an example of the aforementioned "well-compatible material."

Furthermore, since the nitride film has an excellent function of reducing or preventing water from permeating or diffusing as described above with respect to the dielectric films constituting the aforementioned storage capacitors, it is possible to reduce or prevent water from permeating the semiconductor layers which constitute the thin film transistors. In this aspect, since the relay layers include the nitride films, it is possible to obtain the aforementioned functions, and thus, it is possible to greatly reduce or prevent the occurrence of the problem in that the threshold voltage of the thin film transistors increases.

Furthermore, in an aspect that the relay layers are provided, it is preferable that the shielding layers be formed of the same film as the relay layers.

In the construction according to the above aspect, since the relay layers and the shielding layers are formed as the same film, both constituents can be formed at the same time, so that it is possible to facilitate simplification of the manufacturing process or to lower manufacturing cost by that much.

In another aspect in which the construction according to the above aspect is combined with the aforementioned aspect that the data lines and the one electrode of a pair of electrodes which constitute each of the storage capacitor are formed as the same film, the arrangement of the data lines, the storage capacitors, the relay layers, and the pixel electrodes, particularly, the laminating order, etc., becomes preferable, so that it is possible to further effectively obtain the aforementioned functions and effects.

Further, particularly, in another aspect in which the construction according to the above aspect is combined with the construction that the relay layers include the nitride film, the shielding layers also include the nitride films. Therefore, it is possible to further widely obtain the above-mentioned function of reducing or preventing water from penetrating the semiconductor layers of the thin film transistors over the surface of the substrate. Accordingly, it is possible to further effectively obtain the function and effect of the long-term operation of the thin film transistor.

In addition, as apparent from the description of the above aspect, in the present invention, it is not always necessary to form the shielding layers and the relay layers as the same film. In other words, they may be separately formed in different layers.

In another aspect of the electro-optical device of the present invention, the shielding layers are made of transparent conductive materials and are formed in a mat shape over the entire surface of the substrate.

According to the above aspect, since the shielding layers are formed in a mat shape over the entire surface of the substrate, it is possible to further surely eliminate the influence of the capacitance couplings which occur between the data lines and the pixel electrodes. Furthermore, even though the shielding layers are formed in a mat shape, since the shielding layers are made of the transparent conductive materials such as ITO or IZO (indium zinc oxide), etc., no particular hindrance occurs to the light transmission in the electro-optical device.

In addition, according to the present aspect, since the pixel electrodes and the shielding layers form the storage capacitors, it is possible to enhance the display quality in accordance with the increase of the storage capacitance.

In addition, in a case where the shielding layers are formed in a mat shape as this aspect, in order to correspond to the formation of the contact holes, which electrically connect the pixel electrodes to the thin film transistors, it is preferable that the shielding layers include apertures which are formed at the positions where the contact holes are formed. By doing so, since it is possible to easily form the contact holes, it is possible to easily implement the electrical connection between the aforementioned various constituents which constitute the electro-optical device according to an aspect of the present invention. In addition, for the "aperture" referred herein, it is not necessary to form the aperture very accurately. In other words, since the "aperture" will suffice if the contact holes penetrate thereto, it is not necessary to pay particular attention to the aperture in the manufacturing process.

However, even in a case where the shielding layers are formed in a mat shape over the entire surface of the substrate, it is preferable to include the aforementioned "relay layers" which are formed of the same film as the shielding layers, and in this case, the aperture into which contact holes are to penetrate is not necessary. However, since it is necessary to facilitate electrical insulation between the shielding layers (fixed potential) and the relay layers (potential of pixel electrodes), although the patterning for forming the "aperture" is not necessary, the patterning for forming the "relay layer" is necessary. The "mat shape" referred in the aspect includes the above-described cases.

Like the present aspect, in a case where the shielding layers are formed in a mat shape over the entire surface, it is preferable that the thickness of the shielding layers be about 50 to 500 nm. By doing so, the thickness of the shielding is sufficient to eliminate the influence of the capacitance couplings, and also, is restricted to a range appropriate to sustain the transparency of the whole electro-optical device.

Furthermore, in the electro-optical device according to an aspect of the present invention, it is preferable that the shielding layers be formed along the data lines and have wider widths than those of the data lines.

According to this aspect, it is possible to eliminate the influence of the capacitance couplings between the pixel electrodes and the data lines which are formed along the shielding layers. In other words, the problems as described in the "background of invention" do not occur at least between the data lines and the pixel electrodes. Therefore, in accordance with the aspect, it is possible to effectively obtain the aforementioned functions and effects while suppressing the decrease of the transmittance due to the shielding layers to the minimum.

In another aspect of the electro-optical device according to the present invention, the data lines formed along the shielding layers include the data lines which are located at the both ends of the data line group to which image signals are supplied at one time.

In accordance with the construction, in the aspect that the data lines are divided into several groups and the image signals are supplied at one time per group, since the shielding layers are formed on the data lines for which the influence of the capacitance coupling is not most desired, it is possible to expect the effective enhancement of the quality of the image. In other words, in the aforementioned case, it is possible to suppress the occurrence of the display non-uniformity which is almost associated with the data lines extending to the end boundaries between the groups (hereinafter, referred to as a "supplied group") to which the image signals are supplied and groups adjacent thereto (hereinafter, referred to as "non-supplied group"). The reason for such suppression is that there are some cases where the electric fields which accurately correspond to the image signals are not applied to the pixel electrodes which exist right at the end boundaries of the supplied groups and the non-supplied groups. More specifically, in this case, since the data lines to which image signals are supplied exist at one end portion of the pixel electrodes, and the data lines to which image signals are not supplied exist at the other end portion of the pixel electrodes, even if the electric fields which accurately correspond to the image signals are applied, the potential variation may occur due to the influence of the capacitance couplings between the pixel electrodes and the data lines to which image signals are not supplied.

In addition, "the data line group to which image signals are supplied at one time", that is, a group of the data lines constituting one group, is determined in accordance with how many parallel signals the image signal includes. For example, assuming that the image signals are formed by converting a serial signal into six parallel signals, the aforementioned group becomes a group including six data lines which are adjacent to each other. In addition, in this case, "data lines which are located at the both ends of the group" correspond to the first data line and the sixth data line.

In another aspect of the electro-optical device of the present invention, the thin film transistors include semiconductor layers having channel regions which extend in a longitudinal direction and channel adjacent regions which further extend in the longitudinal direction from the channel regions, the scanning lines include main body parts extending in a direction intersecting the longitudinal direction and having gate electrodes of the thin film transistors overlapping the channel region in plan view, and horizontal protrusions protruding from the main body parts in the longitudinal direction at the sides of the channel adjacent regions in plan view.

According to this aspect, the scanning lines include the horizontal protrusions protruding along the channel adjacent regions at the sides of the channel adjacent regions from the main body parts which include gate electrodes of the thin film transistors in plan view. Therefore, the incident light and the returning light which travels at an angle with respect to the surface of the substrate and the slanted light, such as the inside-reflected light and the multiple-reflected light based on the incident light and the returning light can be at least partially prevented from entering the channel regions and the channel adjacent regions by the horizontal protrusions as well as the main body parts which include the gate electrodes among the scanning lines absorbed light and reflected light. At this time, particularly, when the light shielding is performed by the horizontal protrusions which are provided at positions where the interlayer distance from the channel adjacent regions is very short, that is, at the interlayer positions separated by the thickness of the gate insulating films, it is possible to quite effectively perform the light shielding.

For example, on the substrate, in a case wherein the lower light-shielding films are provided at the lower sides of the thin film transistors, the construction that the channel adjacent regions or the channel regions are interposed between the lower light-shielding films interlayer distance of which is relatively short and the main body parts or the horizontal protrusions of the scanning lines which function as light-shielding films, can be obtained so that excellent light shielding performance for the slanted light can be obtained.

As a result, according to this aspect, since the light-resistant property can be increased, it is possible to efficiently control the switching of the pixel electrodes by the thin film transistors leakage current of which light is reduced, even under such a severe condition that strong incident light or returning light enters, and finally, to display images with high brightness and high contrast.

In this aspect, particularly, it is preferable that the main body parts and the horizontal protrusions be formed of the same film in one body.

According to this aspect, in manufacturing the electro-optical device, the light-shielding protrusions and the main body parts can be formed in the process of forming the scanning lines, and no additional process is required for forming the protrusions. Therefore, it is possible to facilitate simplification of the laminated structure and the manufacturing process.

Furthermore, in an aspect that the horizontal protrusions are provided, it is preferable that the horizontal protrusions protrude at both sides of the channel adjacent regions which are located at source side and drain side of every channel region in plan view.

According to this aspect, a total of four horizontal protrusions are provided, that is, at the source side, the drain side, and both sides of every thin film transistor. Therefore, by these protrusions, it is possible to enhance the light shielding performance against the slanted light which enters from various directions three-dimensionally.

In another aspect of the electro-optical device of the present invention, the thin film transistors include semiconductor layers having channel regions which extend in the longitudinal direction, the electro-optical device may include upper light-shielding films which cover at least the channel regions of the thin film transistors from the upper side, and at least a part of the upper light-shielding films is formed to have a concave shape in the cross section which is perpendicular to the longitudinal direction of the channel region as viewed from the channel regions.

According to this aspect, the upper light-shielding films which cover at least the channel regions from the upper sides are provided, and at least a part of the upper light-shielding films is formed to have a concave shape in the cross section which is perpendicular to the longitudinal direction of the channel region as viewed from the channel regions. In other word, the lower side has a concave shape. As a result, in comparison to the case that the upper light-shielding films are flat, the incident light which travels at an angle with respect to the surface of the substrate and the slanted light such as the inside-reflected light and the multiple-reflected light based on the incident light and the returning light can be reduced or prevented more effectively from finally entering the channel regions from the slanted upper side by the upper light-shielding films.

For example, in a case where the lower light-shielding films are provided at the lower side of the thin film transistors on the substrate, since the construction that the channel regions are interposed between the lower light-shielding films and the upper light-shielding films is obtained, it is possible to obtain the excellent light shielding performance against the slanted light. At that time, it is preferable that at least a part of the lower light-shielding films be formed to have a concave shape in the cross section which is perpendicular to the longitudinal direction of the channel region, as viewed from the channel regions, with inverted unevenness of the aforementioned upper light-shielding films.

As a result, in accordance with this aspect, since the light-resistant property can be increased, it is possible to efficiently control the switching of the pixel electrodes by the thin film transistors light leakage current of which is reduced, even under such a severe condition that strong incident light or returning light enters, and thus finally to display images with high brightness and high contrast.

In another aspect of the electro-optical device of the present invention, the thin film transistors includes semiconductor layers having channel regions which extend in the first direction, and the scanning lines includes main line portions including gate electrodes of the thin film transistors which are disposed to face the channel regions with gate insulating films interposed therebetween and extending in the second direction which intersects the first direction in plan view, and surrounding parts which extend to surround the semiconductor layers from the main line portions at positions which are separated from the channel regions by a predetermined distance in the second direction in plan view.

According to this aspect, the scanning lines include surrounding parts which extend to surround the semiconductor layers from the main line portions at positions which are separated from the channel regions by a predetermined distance in the second direction in plan view. Therefore, the incident light and the returning light which travel to the surface of the substrate and the slanted light, such as the inside-reflected light and the multiple-reflected light based on the incident light and the returning light, can be at least partially prevented from entering the channel regions and the channel adjacent regions by the light absorption or reflection particularly by the surrounding portions, as well as the main body parts which include the gate electrodes, of the scanning lines. At this time, since the light shielding is performed particularly by the positions where the interlayer distance from the channel regions or the channel adjacent regions is very short, that is, by the surrounding portions which are located generally at the interlayer positions separated by the thickness of the gate insulating films, and also the surrounding portions can shield the slanted light in any directions, it is possible to quite effectively perform the light shielding.

As a result, according to the present aspect, since the light-resistant property can be increased, it is possible to efficiently control the switching of the pixel electrodes by the thin film transistors light leakage current of which is reduced even under such a severe condition that strong incident light or returning light enters, and thus finally to display images with high brightness and high contrast by the present invention.

In consideration of the technical effects as described above, "surrounding the semiconductor layer in plan view" is a wide concept including the construction that the surrounding portions are formed around the semiconductor layers with slight disconnection parts around the lower side of the channel regions in plan view, the construction that the surrounding portions are intermittently formed, or the construction that the surrounding portions are sporadically formed in an island shape, other than the construction that the surrounding portions are formed to extend continuously around the semiconductor layers in plan view.

In the aspect that these horizontal protrusions and the upper light-shielding films surrounding portions having concave shapes are provided, particularly, it is preferable that the scanning lines further include the vertical protrusions protruding from the main line portions in the direction perpendicular to the substrate, at the positions which are separated from the channel regions by a predetermined distance in the second direction.

According to this aspect, since the main line portions include the vertical protrusion protruding in the direction perpendicular to the substrate, the channel regions can be three-dimensionally covered by the main line portions including the vertical protrusions, and the light shielding performance can be enhanced. Particularly, in case of a so-called top gate type in which the scanning lines are located at the upper sides of the channel regions, the construction that the channel regions are three-dimensionally covered from the upper sides by the main line portions including the vertical protrusions is obtained. In addition, the predetermined distance associated with the surrounding portions and the predetermined distance associated with the vertical protrusions may be equal to or different from each other.

In addition, in the aspect that the aforementioned surrounding portions are provided, it is preferable that the scanning lines further include vertical protrusions protruding from the surrounding portions in the direction perpendicular to the substrate.

According to the above aspect, since the channel regions can be three-dimensionally covered by the vertical protrusions of the main line portions and/or the vertical protrusion of the surrounding portions, it is possible to further enhance the light shielding performance. Particularly, in case of a so-called "top gate type" in which the scanning lines are located at the upper side of the channel regions, the construction that the channel regions are three-dimensionally covered by the main line portions and the surrounding portions including the vertical protrusions from the upper sides can be obtained. Incidentally, these vertical protrusions may protrude consecutively or separately.

In another aspect of the electro-optical device of the present invention, the thin film transistors include semiconductor layers having channel regions which extend in the first direction, and the scanning lines include main line portions including gate electrodes of the thin film transistors which are disposed to face the channel regions with gate insulating films interposed therebetween and extending in the second direction which intersects the first direction in plan view, and vertical protrusions which protrude downwardly from the main line portions at positions which are separated from the channel region by a predetermined distance in the second direction in plan view.

According to this aspect, the scanning lines include the vertical protrusions which protrude downwardly from the main line portions at positions which are separated from the channel region by a predetermined distance in the second direction in plan view. Therefore, the incident light and the returning light, which travel to the surface of the substrate, and the slanted light, such as the inside-reflected light and the multiple-reflected light based on the incident light and the returning light can be three-dimensionally reduced or prevented from entering the channel regions and the channel adjacent regions by the protrusions as well as the main body parts which include the gate electrodes of the scanning lines, and the channel regions and the channel adjacent regions can be three-dimensionally shielded by the main line portions and the protrusions at positions in the vicinity of the channel regions or the channel adjacent regions, it is possible to quite effectively perform the light shielding.

As a result, in accordance with the aspect, since the light-resistant property can be increased, it is possible to efficiently control the switching of the pixel electrodes by the thin film transistors light leakage current of which is reduced, even under such a severe condition that strong incident light or returning light enters, and thus finally to display images with high brightness and high contrast.

In the aspect that the aforementioned vertical protrusions are provided, particularly, it is preferable that lower light-shielding films, which cover at least the channel regions from the lower side, be further provided and the vertical protrusions have front end sides which contact the lower light-shielding films.

In accordance with the construction, the construction that the channel adjacent regions or the channel regions are interposed between the lower light-shielding films interlayer, the distance of which is relatively short, and the main body parts or the surrounding portions which function as light-shielding films can be obtained. In addition, the space between the lower light-shielding films and the main body parts and the surrounding portions of the scanning lines, where the channel adjacent regions or the channel regions exist, become a space at least partially closed by the protrusions. For the reason, it is possible to obtain very high light shielding performance against the slanted light which is slanted in any directions.

Furthermore, in accordance with this aspect, for example, instead of forming the scanning lines and the gate electrode of the thin film transistors as the same layer, the gate electrodes and the scanning lines can be formed in different layers, and the lower light-shielding films of this aspect can be used as the scanning lines. Namely, in this case, the lower light-shielding films have the additional function as the scanning lines. In addition, as another aspect, it is possible that the gate electrodes and the scanning lines are formed in the same layer, while the upper light-shielding films have the function as the scanning lines. In this case, two scanning lines are provided in parallel in each thin film transistor and redundancy structure is provided for the scanning lines. By doing so, even though one of the two scanning lines has a failure such as disconnection, the other scanning line can be used, so that an advantage of further increasing the reliability can be obtained.

In addition, in the case that the lower light-shielding films have the additional function as scanning lines, as described above, the lower light-shielding films must be formed in a stripe shape to correspond to the respective rows of the thin film transistors arranged in a matrix.

Alternatively, it is preferable that the lower light-shielding films, which cover at least the channel regions from the lower side be further provided, and the vertical protrusions do not contact the lower light-shielding films.

In accordance with the construction, the construction that the channel adjacent regions or the channel regions are interposed between the lower light-shielding films interlayer distance of which is relatively short and the main body parts or the surrounding portions which function as light-shielding films can be obtained. In addition, the space between the lower light-shielding films and the main body parts and the surrounding portions of the scanning lines, where the channel adjacent regions or the channel regions exist, becomes a space partially closed by the protrusions. For such a reason, it is possible to obtain very high light shielding performance against the slanted light which is slanted in any directions.

In a case where the construction in which the lower light-shielding films and the scanning lines do not contact with each other is employed, a bad effect due to the potential variation of the lower light-shielding films, such as the bad effect on the thin film transistors, can be reduced or prevented from occurring.

In another aspect of the electro-optical device according to the present invention, the thin film transistors include semiconductor layers having channel regions which extend in the first direction, the scanning lines include main line portions including gate electrodes of the thin film transistors which are disposed to face the channel regions with gate insulating films interposed therebetween and extending in the second direction which intersects the first direction in plan view, and the main line portions include inside-groove portions which are provided inside grooves which are etched in the substrate and cover at least a part of the channel regions from the sides.

According to this aspect, the scanning lines include the main line portions which extend in the second direction in plan view. Herein, particularly, the inside-groove portions which are provided inside groove among the main line portions at least partially cover the channel regions from the sides. Therefore, the incident light which travels at an angle with respect to the surface of the substrate, the returning light which particularly travels at an angle with respect to the rear surface, and the slanted light, such as the inside-reflected light and the multiple-reflected light based on the incident light and the returning light, can be partially prevented from entering the channel regions and the channel adjacent regions by the light absorption and reflection by the inside-groove portions. Like this, by increasing the light-resistant property, it is possible to efficiently control the switching of the pixel electrodes by the thin film transistors light leakage current of which is reduced, even under such a severe condition that strong incident light or returning light enters, and thus, it is possible to display images with high brightness and high contrast.

In addition, since the main line portions of the scanning lines include the inside-groove portions, by increasing the cross sectional areas of the inside-groove portions at the cross section perpendicular to the second direction and the cross sectional areas of the outside-groove portions which are located outside the grooves, it is possible to reduce the wire resistance of the scanning lines. Like this, by reducing the wire resistance of the scanning lines, it is possible to reduce the occurrence of the crosstalk, flicker, etc., due to the signal delay of the scanning signals, and thus finally to display images with high quality while facilitating the high accuracy and miniaturization of the pixel pitch in the electro-optical device. As a result, it is possible to display images with high brightness and high quality in accordance with this aspect of the present invention.

In addition, in an aspect of the present invention, the grooves in which the main line portions of the scanning lines are at least partially provided may be directly etched in the substrate like the above case, or may be etched in the base insulating films which are laminated on the substrate.

In another aspect of the electro-optical device of the present invention, the thin film transistors include semiconductor layers having channel regions which extend in the first direction, the scanning lines include main line portions including gate electrodes of the thin film transistors which are disposed to face the channel regions with gate insulating films interposed therebetween and extending in the second direction which intersects the first direction in plan view, and the main line portions include inside-groove portions which extend in the second direction and are provided inside the grooves which are etched in the substrate and outside-groove portions which extend in the second direction and are provided outside the grooves.

According to this aspect, the scanning lines include the main line portions which extend in the second direction in plan view. Herein, particularly, since the main line portions include the inside-groove portions and the outside-groove portions which extend in the second direction, respectively, it is possible to reduce the wire resistance of the scanning lines in accordance with the total area of the inside-groove portions and the outside-groove portions on the cross section perpendicular to the second direction. For example, in consideration of a certain restriction in the allowable step difference on the surface of the substrate which defines the thickness of the layers of the electro-optical materials such as liquid crystal in relation to the operational failure of the electro-optical materials, such as disorder of the liquid crystal, in comparison with the related art scanning lines which are formed on the flat surface or the scanning lines which are completely buried within the grooves, the construction of the present invention in which the cross sectional area of the scanning lines can be increased over the total thickness in the laminated structure on the substrate is very advantageous in practice.

Like this, by reducing the wire resistance of the scanning lines, it is possible to reduce the occurrence of the crosstalk or flicker, etc., due to the signal delay of the scanning signals, and thus, it is eventually possible to display images with high quality while facilitating the high accuracy and miniaturization of the pixel pitch in the electro-optical device.

Incidentally, in an aspect of the present invention, the grooves in which the main line portions of the scanning lines are at least partially provided may be directly etched in the substrate like the above case, or may be etched in the base insulating films which are laminated on the substrate.

As described above, particularly in the aspect that the light shielding for the semiconductor layer can be performed by providing particular constituents, for example, vertical protrusions, surrounding portions, etc., for the scanning lines, it is preferable that the scanning lines include light-shielding films containing metals or alloys.

According to the above aspect, the scanning lines include the light-shielding film containing metals or alloys, more specifically, for example, a single metal substance, a metal alloy, a metal silicide, a poly silicide including at least one of high melting point metals such as Ti (titan), Cr (chromium), W (tungsten), Ta (tantalum), Mo (molybdenum), Pb (lead), etc., or a laminated structure thereof. Therefore, by the main body parts and the protrusions made of the light-shielding films, it is possible to further enhance the light shielding performance against the slanted light in the channel regions or the channel adjacent regions.

However, even in a case where the scanning lines are not formed of these light-shielding films but formed of polysilicon films, etc., the light shielding performance can be obtained corresponding to the light-absorbing property.

In another aspect of the electro-optical device of the present invention, a plurality of the pixel electrodes are arranged in a plane and include a first pixel electrode group which is inversely driven at a first period and a second pixel electrode group which is inversely driven at a second period which is complementary to the first period, and the data lines include main line portions which extend at upper sides of the scanning lines so as to intersect the scanning lines and overhanging portions which overhang along the scanning lines. The electro-optical device may include a counter electrode on a counter substrate which is provided opposite to the substrate, the counter electrode facing the plurality of the pixel electrodes on the substrate. Convex portions are formed on base surfaces of the pixel electrodes on the substrate, corresponding to the overhanging portions, in the regions of gaps between the pixel electrodes which are adjacent to each other in plan view with the scanning lines interposed therebetween.

According to this aspect, a plurality of pixel electrodes are two-dimensionally arranged on the first substrate and include a first pixel electrode group which is inversely driven at the first period and a second pixel electrode group which is inversely driven at the second period, which is complementary to the first period. That is, two types of pixel electrodes exist; (1) adjacent pixel electrodes which are respectively driven by the driving voltages with opposite polarities every time during the inversion driving, and (2) adjacent pixel electrodes which are respectively driven by the driving voltages with the same polarity every time during the inversion driving. Both of the types exist in a case that the electro-optical device, such as matrix driven liquid crystal apparatus employs, for example, the aforementioned 1H inversion driving manner. Therefore, the transverse electric field is generated between the adjacent pixel electrodes that belong to the different pixel electrode groups, that is, between the adjacent pixel electrodes to which opposite potential is applied, respectively.

Herein, in the present invention, particularly, the data lines include the overhanging portions along the scanning lines from the main line portions, which extend at the upper sides of the scanning lines to intersect with the scanning lines. In addition, corresponding to the presence of the overhanging portions, convex portions are formed on the base surface of the pixel electrodes, in the regions of gaps between the adjacent pixel electrodes in plan view with the scanning lines interposed therebetween. Namely, the base surfaces of the pixel electrodes become surfaces on which convex portions having a predetermined height and a predetermined shape are formed.

As a result, first, if the edge parts of each pixel electrode are formed to be located on the convex portions, it is possible to relatively strengthen the longitudinal electric field generated between each pixel electrode and each counter electrode in comparison with the transverse electric field generated between the adjacent pixel electrodes, particularly, between the pixel electrodes which belong to the different pixel electrode groups. Since in general, the electric field is getting stronger as the distance between the electrodes is getting shorter, and the edge parts are closer to the counter electrode by the distance corresponding to the height of the convex portions, so that the longitudinal electric field generated between the electrodes can be strengthened. Second, irrespective of whether the edge parts of each pixel electrode are located on the convex portions or not, the transverse electric field generated between the adjacent pixel electrodes, particularly, between the pixel electrodes which belong to the different pixel electrode groups becomes smaller by the presence of the convex portions in accordance with the dielectric constant of the convex portions, and also by reduction in the volume of the electro-optical materials through which the transverse electric field passes through by the partial substitution thereof with the convex portions, so that it is possible to reduce the influence of the transverse electric field on the electro-optical materials. Therefore, it is possible to reduce operational failure of the electro-optical materials, such as the disorder of liquid crystal due to the transverse electric field in accordance with the inversion driving manner. At this time, as described above, the edge parts may be or may be not located on the convex portions, and further, the edge parts may be located in the middle of the slanted or substantially vertical side of the convex portions.

Furthermore, it is possible to control the height or shape of the convex portions further accurately in comparison with a technique to control the height of the edge of the pixel electrodes by using the presence of the other wiring lines or elements which are located at the lower portion of the data lines. In the aforementioned technique, since slight discrepancies of patterns in plural films are combined, it is basically difficult to control the height or shape of the uppermost layer which is finally formed, as the desired design. Therefore, since the operational failure of the electro-optical materials, such as disorder of the liquid crystal due to the transverse electric field is surely reduced finally, it is possible to enhance reliability of the apparatus.

In addition, since the light-shielding film for covering positions of operational failure in the electro-optical materials can be formed in a small size, it is possible to increase the aperture ratio of each pixel without image defects, such as a light leakage.

As a result, since operational failures due to the transverse electric field in the electro-optical materials, such as liquid crystal, etc., can be surely reduced by the formation of the convex portions corresponding to the overhanging portions of the data lines, it is possible to relatively easily manufacture the electro-optical device, such as liquid crystal apparatuses with high contrast, high brightness, and high quality.

It is noted that these aspects of the present invention can be applied to various types of electro-optical devices besides the transmissive and reflective types of electro-optical devices.

In another aspect of the electro-optical device of the present invention, a plurality of the pixel electrodes are arranged two-dimensionally and include a first pixel electrode group which is inversely driven at a first period and a second pixel electrode group which is inversely driven at a second period which is complementary to the first period. The electro-optical device further includes counter electrode which faces the plurality of the pixel electrodes, on a counter substrate which is provided opposite to the substrate, and convex portions formed in regions of gaps between the pixel electrodes which are adjacent in plan view. The convex portions have gentle step differences which are formed by removing the planarization films, which are formed in advance on the convex portions by an etching process, and causing the surfaces of the convex portions, which are exposed after removing, to be receded.

According to this aspect, although the transverse electric field is generated between the adjacent pixel electrodes belonging to the different pixel electrode groups, that is, between the adjacent pixel electrodes to which potentials of opposite polarities are applied, since the convex portions are constructively formed by the etching process for the edge parts which are located at non-opening regions of each pixel electrode or the edge parts of the adjacent pixel electrodes, first, if the edge parts of each pixel electrode are formed to be located on the convex portions, it is possible to relatively strengthen the longitudinal electric field generated between each pixel electrode and each counter electrode in comparison with the transverse electric field generated between the adjacent pixel electrodes. Second, irrespective of whether the edge parts of each pixel electrode are located on the convex portions or not, the transverse electric field generated between the adjacent pixel electrodes becomes smaller by the presence of the prominence in accordance with the dielectric constant of the convex portions, and also by reduction in the volume of the electro-optical materials which the transverse electric field passes through, so that it is possible to reduce the influence of the transverse electric field to the electro-optical materials. Therefore, it is possible to reduce operational failure of the electro-optical materials, such as the disorder of liquid crystal due to the transverse electric field in accordance with the inversion driving manner. At this time, as described above, the edge parts of the pixel electrodes may be or may not be located on the convex portions; further, the edge parts may be located in the middle of the slanted or substantially surface of the vertical side of the convex portions.

In addition, since the light-shielding film to cover the positions of operational failure in the electro-optical materials can be formed in a small size, it is possible to increase the aperture ratio of each pixel without image defects, such as a light leakage.

Moreover, in the present invention, particularly, since the convex portions having gentle step differences are formed, it is possible to effectively reduce or prevent the occurrence of the operational failures, such as the disorder of the liquid crystal in advance due to the step differences in the vicinity of the convex portions of the electro-optical materials. In particular, in a case wherein the rubbing process is performed on the alignment films which are formed on the pixel electrodes, if the step differences of the convex portions are gentle, the rubbing process can be relatively easily performed without any non-uniformity, so that is possible to effectively reduce or prevent the operational failures of the electro-optical materials, such as the disorder of the liquid crystal.

As a result, it is possible to surely reduce the operational failure due to the transverse electric field in the electro-optical materials, such as liquid crystal by the formation of the convex portion, and also, it is possible to suppress the occurrence of the operational failure due to the step differences in the electro-optical materials, such as liquid crystal by the gentle step differences, so that it is possible to implement electro-optical device, such as liquid crystal apparatus capable of displaying images with high contrast, high brightness, and high quality.

In addition, in aforementioned various aspects of the present invention, one aspect can be basically combined with any other aspects freely. However, there are some cases that combination of some aspects may be not compatible, in nature. For example, the combination of the configuration that the dielectric films are made of silicon oxide films and silicon nitride films and the configuration that the shielding layers are formed over the entire surface of the substrate is not compatible. Also, the combination of the configuration that "horizontal protrusions" for shielding the semiconductor layers of the thin film transistors are provided for the scanning lines and the configuration that "convex portions" are provided for the interlayer insulating films provided as the bases of the pixel electrodes is not compatible. Of course, the electro-optical device may be constructed by combination of three or more of the configurations.

An electronic apparatus of an aspect of the present invention includes the aforementioned electro-optical device of an aspect of the present invention.

In accordance with the electronic apparatus of an aspect of the present invention, since the electronic apparatus includes the above-mentioned electro-optical device of an aspect of the present invention, it is possible to implement various types of electronic apparatuses capable of displaying images with high quality, such as a projection type display apparatus, a liquid crystal television set, a mobile phone, an electronic diary, a word processor, a viewfinder type or monitor-direct-viewing type video tape recorder, a workstation, a television telephone, a POS terminal, a touch panel, etc.

These effects and the other advantages of an aspect of the present invention will be clarified by the exemplary embodiments described below.

BRIEF DESCRIPTION OF THE DRAWINGS

FIG. 1 is a circuit schematic illustrating an equivalent circuit of various elements and wiring lines which are provided in a plurality of pixels arranged in a matrix which constitute image display regions in an electro-optical device according to an exemplary embodiment of the present invention;

DETAILED DESCRIPTION OF PREFERRED EMBODIMENTS

Now, the exemplary embodiments of the present invention will be described with reference to the figures. The following exemplary embodiment is an electro-optical device according to an aspect of the present invention which is applied to a liquid crystal apparatus.

Constitution of Pixel Portion

Figure 2:
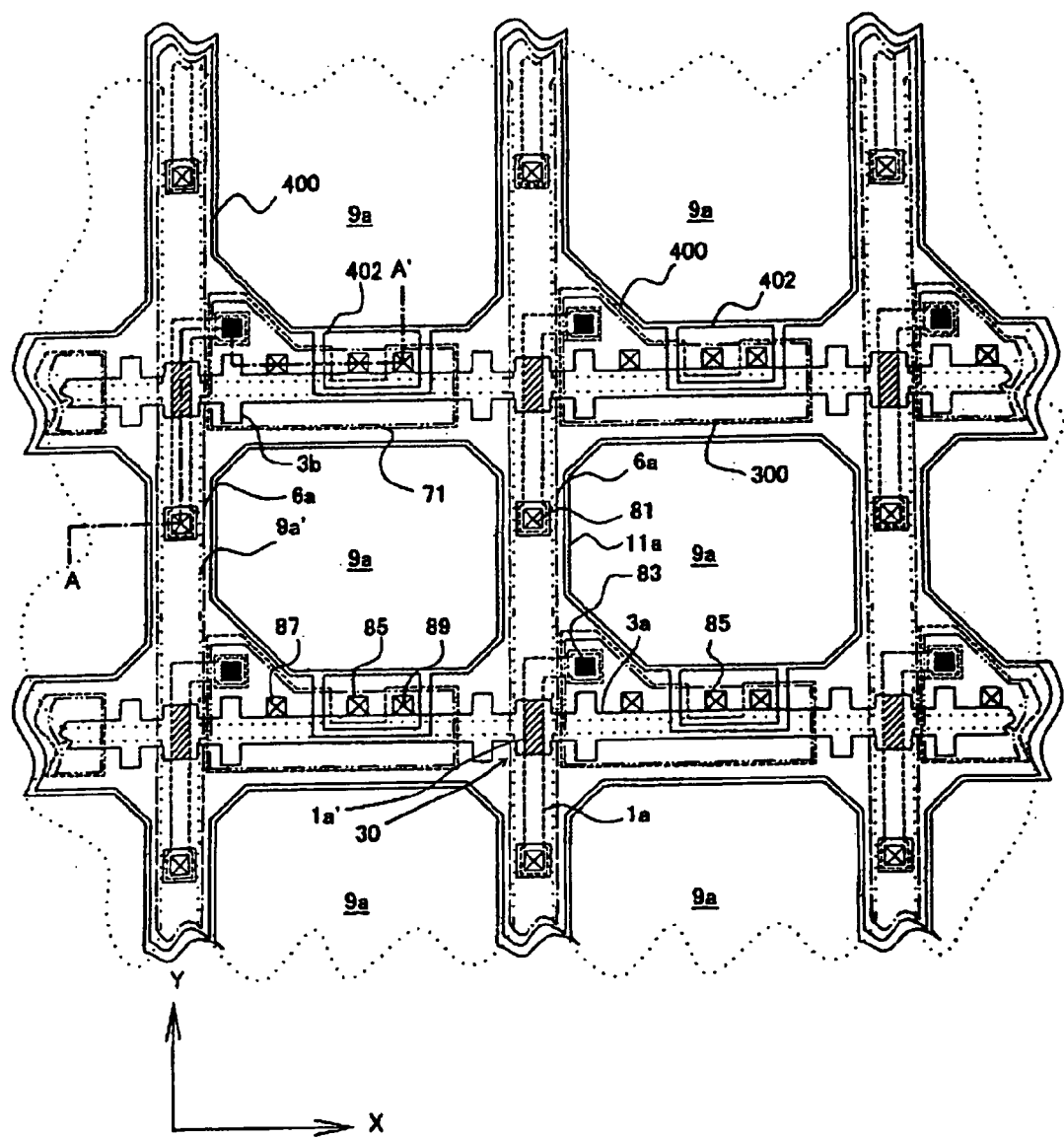
FIG. 2 is a plan view illustrating a plurality of adjacent pixel groups on a TFT array substrate on which data lines, scanning lines, pixel electrodes, etc. are formed, in the electro-optical device according to an exemplary embodiment of the present invention.
Figure 3:
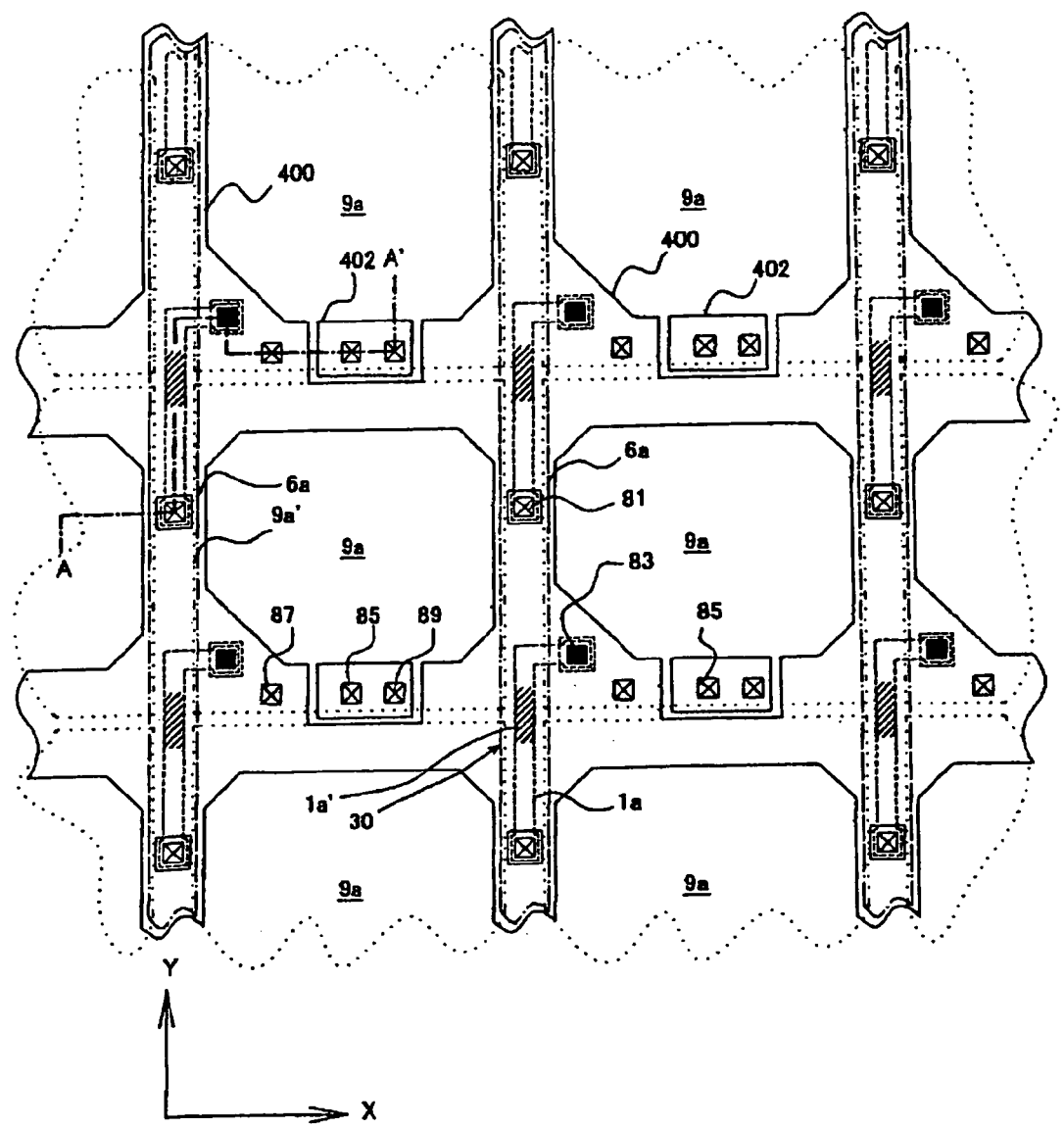
FIG. 3 is a plan view illustrating the only principal parts extracted from FIG. 2.
Figure 4:
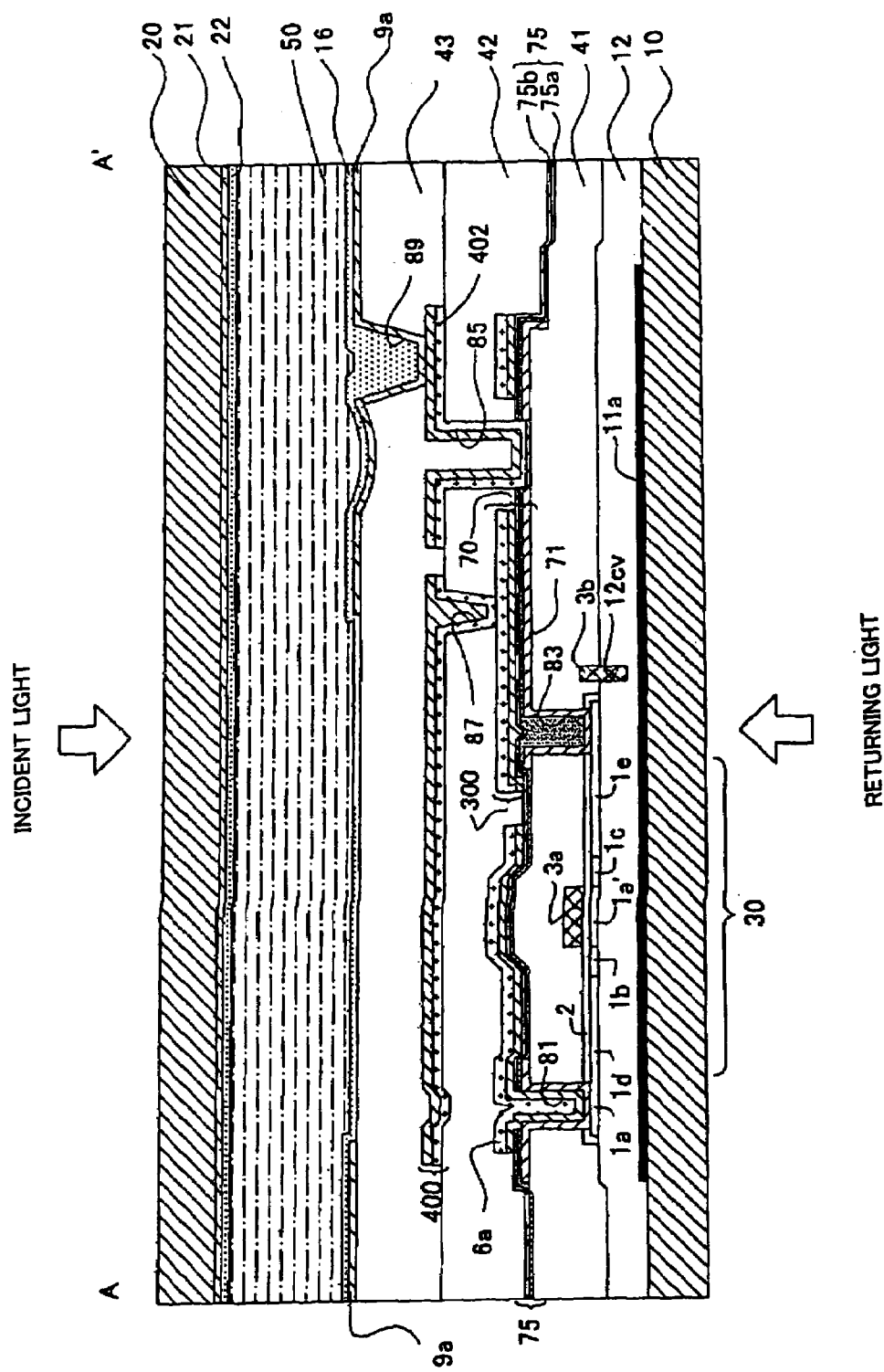
FIG. 4 is a cross sectional view taken along the plane A–A' in FIG. 2.

First, the constitution of the electro-optical device in an exemplary embodiment of the present invention will be described with reference to FIGS. 1 to 4. Herein, FIG. 1 is a circuit schematic illustrating an equivalent circuit of various elements and wiring lines which are provided in a plurality of pixels arranged in a matrix which constitute image display regions in the electro-optical device. FIG. 2 is a plan view illustrating a plurality of pixel groups which are adjacent to each other on a TFT array substrate on which data lines, scanning lines, pixel electrodes, etc., are formed in the electro-optical device. FIG. 3 is a plan view illustrating the only principal parts extracted from FIG. 2, specifically, the arrangement relationship of the data lines, shielding layers, and pixel electrodes. FIG. 4 is a cross sectional view taken along the plane A–A' in FIG. 2. In FIG. 4, each layer and each member are shown in different scales in order that each layer and each part are recognizable in the drawing.

In FIG. 1, in a plurality of the pixels arranged in a matrix and constituting image display regions of the electro-optical device according to the exemplary embodiment, each of pixel electrodes 9a and each of TFTs 30 to control the switching of each of the pixel electrodes 9a are formed, and each of data lines 6a to which image signals are applied are electrically connected to sources of the TFTs 30. The image signals S1, S2, . . . , Sn which are written into the data lines 6a may be line sequentially applied in this order, or may be applied per group of a plurality of data lines 6a adjacent to each other.

In addition, scanning lines 3a are electrically connected to gates of the TFTs 30 and scanning signals G1, G2, . . . , Gm are line sequentially applied as pulses to the scanning lines 3a in this order at a predetermined timing. The pixel electrodes 9a are electrically connected to the drains of the TFTs 30 and image signals S1, S2, . . . , Sn, which are applied from the data lines 6a, are written at a predetermined timing by closing the switches of the TFTs 30, which are "switching element", for a predetermined period.

The predetermined levels of the image signals S1, S2, . . . , Sn, which are written into the liquid crystal through pixel electrodes 9a, as a example of the electro-optical materials, are held for a predetermined period between pixel electrodes and the counter electrode which is formed on the counter substrate. The liquid crystal modulates light by varying the alignment or order of molecule group in accordance with the applied voltage levels to display the gray scale. If in a normally white mode, the transmittance ratio to the incident light reduces in accordance with applied voltages in each pixel unit, and if in a normally black mode, the transmittance ratio to the incident light increases in accordance with applied voltages in each pixel unit. Totally, light having contrast according to image signals is emitted from the electro-optical device.

Herein, in order to reduce or prevent leakage of the held image signals, storage capacitors 70 are added parallel to the liquid crystal capacitances which are formed between the pixel electrodes 9a and the counter electrode. The storage capacitors 70 are provided parallel to the scanning lines 3a and each of the storage capacitors include a fixed-potential-side capacitor electrode and a capacitor electrode 300 which is fixed to a constant potential.

Now, the real construction of the electro-optical device to which the aforementioned circuit operation is realized by the data lines 6a, the scanning lines 3a, and the TFTs 30 will be described with reference to FIGS. 2 to 4.

First, in FIG. 2, a plurality of the pixel electrodes 9a are provided in a matrix on the TFT array substrate 10 (the contours of the pixel electrodes are represented by the dot line portions 9a') and the data lines 6a and the scanning lines 3a are provided along the perpendicular and horizontal boundaries of the pixel electrodes 9a, respectively. The data lines 6a are formed in a laminated structure including aluminum film, etc., as described later, and the scanning lines 3a are made of, for example, conductive polysilicon film. The scanning lines 3a are provided to face the channel regions 1a' which are marked by the forward slanting line regions on the drawing of the semiconductor layers 1a. The scanning lines 3a function as gate electrodes. That is, the pixel switching TFTs 30, in which the main line portions of the scanning lines 3a are disposed as the gate electrodes to face the channel regions 1a', are formed in the portions where the scanning lines 3a intersect the data lines 6a.

Next, the electro-optical device includes TFT array substrate 10 and counter substrate 20, which is provided to face the TFT array substrate 10, as shown in FIG. 4 which is a cross sectional view taken along the plane A–A' of FIG. 2. The TFT array substrate 10 is made of, for example, a quartz substrate, a glass substrate, or a silicon substrate, and the counter substrate 20 is made of, for example, a glass substrate or a quartz substrate.

As shown in FIG. 4, the aforementioned pixel electrode 9a is provided on the TFT array substrate 10, and an alignment film 16 which is subjected to a predetermined alignment process, such as a rubbing process, is provided above the pixel electrode. The pixel electrode 9a is made of, for example, a transparent conductive film such as an ITO film. On the other hand, the counter electrode 21 is provided over the entire surface of the counter substrate 20, and, an alignment film 22 which is subjected to a predetermined alignment process, such as a rubbing process is provided below the counter electrode. The counter electrode 21 is made of, for example, a transparent conductive film, such as an ITO film similarly to the aforementioned pixel electrodes 9a, and the aforementioned alignment films 16 and 22 are made of, for example, a transparent organic film such as a polyimide film. Between the TFT array substrate 10 and the counter substrate 20 which are provided to face like this, liquid crystal layer 50 is formed by sealing electro-optical materials, such as liquid crystal within a space which is surrounded with a sealing material which is described later (see FIGS. 27 and 28). The liquid crystal layer 50 is aligned by the alignment films 16 and 22 when no electric field is applied from the pixel electrode 9a. The liquid crystal layer 50 is made of an electro-optical material formed of, for example, one nematic liquid crystal or a mixture of various kinds of nematic liquid crystal. The sealing material is an adhesive agent formed of, for example, photo-curing resin or thermosetting resin for connecting the TFT substrate 10 and the counter substrate 20 at their peripherals. Spacers, such as glass fiber or glass beads for separating both substrates from each other by a predetermined distance are mixed in the adhesive agent.

On the other hand, on the TFT array substrate 10, besides the aforementioned pixel electrodes 9a and the alignment film 16, various constituents are provided in a laminated structure. As shown in FIG. 4, the laminated structure includes, in the following order from the bottom, a first layer having lower light-shielding film 11a, a second layer having the TFT 30 and the scanning line 3a, a third layer having the storage capacitor 70 and data line 6a, a fourth layer having shielding layer 400, and a fifth layer (the uppermost layer) having the aforementioned pixel electrode 9a and the alignment film 16. In addition, a base insulating film 12 is provided between the first layer and the second layer, a first interlayer insulating film 41 is provided between the second layer and the third layer, a second interlayer insulating film 42 is provided between the third layer and the fourth layer, and a third interlayer insulating film 43 is provided between the fourth layer and the fifth layer, respectively, in order to reduce or prevent short circuit among the aforementioned elements. In addition, contact holes, etc. to electrically connect heavily doped source regions 1d within the semiconductor layer 1a of the TFTs 30 with the data lines 6a are also provided in the respective insulating films 12, 41, 42, and 43. Now, these elements will be described in the aforementioned order from the bottom.

First, in the first layer, the lower light-shielding films 11a which are made of, for example, a single metal substance, a metal alloy, a metal silicide, a poly silicide, or a structure staking thereon including at least one of high melting point metals, such as Ti (titan), Cr (chromium), W (tungsten), Ta (tantalum), and Mo (molybdenum), etc. is provided. The lower light-shielding film 11a is patterned in lattice in plan view, to thereby define opening regions for pixels are defined (see FIG. 2). Regions protruded so as to round the corners of the pixel electrodes 9a are formed at the regions of the lower light-shielding films 11a where scanning lines 3a and the data lines 6a intersect. In addition, the lower light-shielding films 11a are formed to cover the TFTs 30, the scanning lines 3a, the data lines 6a, the storage capacitors 70, and second relay layers 402 to be described later as shown from the lower side. In addition, in order to reduce or prevent the potential variation of the lower light-shielding film 11a from having bad effect on the TFTs 30, it is preferable that the lower light-shielding film 11a extend from the image display regions to peripherals thereof to be connected to a constant potential source.

Next, the TFTs 30 and the scanning lines 3a are provided as the second layer. The TFT 30 has a LDD (lightly doped drain) structure as shown in FIG. 4, in which the scanning line 3a which functions as a gate electrode as described above, the channel region 1a' of the semiconductor layer 1a, which is made of a polysilicon film, for example, and where a channel is formed by an electric field from the scanning line 3a, an insulating film 2 having a gate insulating film which insulates the scanning line 3a from the semiconductor layer 1a, and a lightly doped source region 1b, a lightly doped drain region 1c, a heavily doped source region 1d, and a heavily doped drain region 1e in the semiconductor layer 1a, are provided.

Furthermore, although the TFTs 30 preferably have the LDD structure as shown in FIG. 4, the TFTs may have an offset structure where impurity implantation is not performed to the lightly doped source regions 1b and the lightly doped drain regions 1c. Alternatively, the TFTs may be self-aligned type TFTs in which impurities are implanted heavily by using the gate electrodes which are formed to be part of the scanning lines 3a as masks and then the heavily doped source regions and the heavily doped drain regions are formed in a self-aligned manner. In addition, in the present exemplary embodiment, although a single gate structure in which only one gate electrode of the pixel switching TFT 30 is provided between the heavily doped source regions 1d and the heavily doped drain regions 1e is used, two or more gate electrodes may be provided between them. Likewise, if the TFT is constructed with dual gates, triple gates, or more, the leakage current at the connection portions of the channel and source regions and the drain regions can be reduced or prevented and thus to reduce current in the OFF state. In addition, the semiconductor layer 1a which constructs the TFTs 30 may be a non-single crystalline layer or a single crystalline layer. Any suitable method, such as an attaching method may be used for the formation of the single crystalline layer. In particular, by forming the semiconductor layer 1a with the single crystalline layer, it is possible to obtain high performance of peripheral circuits.

The base insulating film 12 which is made of, for example, a silicon oxide film is provided above the aforementioned lower light-shielding films 11a and below the TFTs 30. Other than the function of insulating as an interlayer the TFTs 30 from the lower light-shielding films 11a, the base insulating film 12 has a function of reducing or preventing the properties of the pixel switching TFTs 30 from varying due to the roughness which is generated at the time of polishing the surface of the TFT array substrate 10 or contaminants which remain after the cleaning, by being formed on the entire surface of the TFT array substrate 10.

Furthermore, in the present exemplary embodiment, particularly, in the base insulating film 12, grooves 12cv (grooves formed in a contact hole shape) having the same width as the channel length of the semiconductor layer 1a which extends along the below-described data lines 6a or have a width longer than the channel length are etched in both sides of the semiconductor layer 1a in plan view. The scanning lines 3a, which are laminated thereon, have concave portions formed corresponding to the grooves 12cv at lower sides thereof (these are not shown to avoid complexity in FIG. 2. See FIG. 5). In addition, by forming the scanning lines 3a so as to bury the entire grooves 12cv, horizontal protrusions 3b (including "vertical protrusions" in the an aspect of present invention) which are formed in one body with the scanning line 3a are provided to extend to the scanning line 3a. According to such a structure, the semiconductor layer 1a of the TFT 30 is covered from the sides in plan view, as shown in FIG. 2, so that it is possible to suppress the incident of the light from at least this part. In addition, the horizontal protrusions 3b may be formed at only one side of the semiconductor layer 1a. In addition, the grooves 12cv, and the scanning line 3a and the horizontal protrusions 3b which are laminated thereon will be described later in details again with reference to FIG. 5.

Following the aforementioned second layer, on the third layer, a storage capacitor 70 and the data line 6a are provided. The storage capacitor 70 is formed by facing a first relay layer 71 as a pixel-potential-side capacitor electrode, which is electrically connected to the heavily doped drain region 1e of the TFT 30 and the pixel electrode 9a, to capacitor electrode 300 as a fixed-potential-side capacitor electrode, through the dielectric film 75. It is possible to greatly enhance the potential holding property of the pixel electrodes 9a by the storage capacitor 70. In addition, the storage capacitors 70 according to the exemplary embodiment are formed not to reach light transmitting regions corresponding almost to regions for forming the pixel electrode 9a as shown in the plan view of FIG. 2, and in other words, the storage capacitors 70 are formed so as to be accommodated into the light-shielding region. Specifically, the storage capacitor 70 is formed on a region which overlaps the scanning lines 3a between the adjacent data lines 6a and a region in which the lower light-shielding film 11a rounds the corners of the pixel electrode 9a at corner portions where the scanning line 3a intersects the data line 6a. By doing so, the pixel aperture ratio of the entire electro-optical device is maintained to be relatively large so that it is possible to display brighter images.

More specifically, the first relay layer 71 is made of, for example, a conductive polysilicon film having light-absorbing property and functions as a pixel-potential-side capacitor electrode. However, the first relay layer 71 may be constructed in a single layer film or a multi-layered film including metals or alloys thereof. In case of the multi-layered film, it is preferable that the lower layer be constructed with the conductive polysilicon film having light-absorbing property and the upper layer be constructed with metals having a light-absorbing property or alloys thereof. In addition to the function as the pixel-potential-side capacitor electrode, the first relay layer 71 has a function of relay-connecting the pixel electrode 9a with the heavily doped drain region 1e of the TFT 30 through contact holes 83, 85, and 89. The first relay layer 71 is formed to have almost the same shape as that of the capacitor electrode 300 described later, as shown in FIG. 2.

The capacitor electrode 300 functions as a fixed-potential-side capacitor electrode of the storage capacitor 70. In the first exemplary embodiment, in order to keep the capacitor electrode 300 at a fixed potential, the capacitor electrode 300 is electrically connected through the contact hole 87 to the shielding layer 400 which has a fixed potential.

However, as described later, in another exemplary embodiment where the capacitor electrode 300 and the data line 6a are formed in different layers, it is preferable that the capacitor electrode 300 be, for example, provided to extend from the image display region 10a on which pixel electrode 9a is provided to peripheral thereof and the capacitor electrode 300 be held to a fixed potential by electrically connecting to a constant potential source. Incidentally, "the constant potential source" referred herein may be a constant potential source, such as a positive power source or a negative power source supplied to a data line driving circuit 101 or a constant potential source supplied to the counter electrode 21 of the counter substrate 20.

Moreover, in particular, in this exemplary embodiment, the data lines 6a are made of the same films as the capacitor electrodes 300. Herein, "the same films" refer to the same layers or layers which are formed at the same time in manufacturing process steps. However, the capacitor electrodes 300 and the data lines 6a are not two-dimensionally continuously formed but divided based on the patterning.

Specifically, as shown in FIG. 2, the capacitor electrodes 300 are formed to overlap the regions for forming the scanning lines 3a, that is, to be divided along the X direction in the drawing. The data lines 6a are formed to overlap the semiconductor layer 1a in the longitudinal direction thereof, that is, to extend in the Y direction in the drawing. More specifically, the capacitor electrodes 300 includes main line portions which extend along the scanning lines 3a, and protrusions (parts shown as approximate a trapezoid shape in the drawing) protruded upwardly in the drawing along the semiconductor layer 1a in the regions which are adjacent to the semiconductor layer 1a in FIG. 2, and necking portions which are slightly necked at the position corresponding to the below-described contact holes 85. The protrusions contribute to the increase of the regions for forming storage capacitors 70.

On the other hand, the data lines 6a include main line portions which extend linearly along the Y direction in FIG. 2. In addition, the heavily doped drain regions 1e which are at the upper end in FIG. 2 of the semiconductor layer 1a have the shape curving toward the right side perpendicularly, that is, at 90 degrees in order to overlap the regions of the protrusions of the storage capacitors 70, thereby electrically connecting the semiconductor layer 1a with the storage capacitors 70 avoiding the data lines 6a (see FIG. 4). In addition, the lower light-shielding films 11a also exist at the regions of forming the contact holes 83 which electrically connect the semiconductor layer 1a with the first relay layers 71 of the storage capacitors 70.

In the exemplary embodiment, such a patterning is performed to obtain the aforementioned shapes, and thus, the capacitor electrodes 300 and the data lines 6a are simultaneously formed.

In addition, the capacitor electrode 300 and the data line 6a are formed of films having a two-layered structure, as shown in FIG. 4, in which the lower layer is made of conductive polysilicon and the upper layer is made of aluminum. Although the data line 6a is electrically connected to the semiconductor layer 1a of the TFT 30 through the contact hole 81 which passes through opening portion of the below-described dielectric film 75, the data line 6a has the aforementioned two-layered structure and the aforementioned first relay layer 71 is constructed with a conductive polysilicon film so that the electrical connection between the data line 6a and the semiconductor layer 1a can be actually implemented by the conductive polysilicon film. Specifically, a polysilicon film of first relay layer, a polysilicon film below the data line 6a, and an aluminum film above the data line are formed in this order from the bottom. Therefore, it is possible to maintain a good electrical connection between them.

Since the capacitor electrode 300 and the data line 6a include aluminum having relatively excellent light reflective properties and also polysilicon having relatively excellent light absorbing properties, the capacitor electrode 300 and the data line 6a can function as light-shielding layers. In other words, the capacitor electrode 300 and the data line 6a are able to block the progress of the incident light (see FIG. 4) for the semiconductor layer 1a of the TFT 30 at the upper side thereof.

As shown in FIG. 4, the dielectric film 75 is constructed with a silicon oxide film, such as an HTO (high temperature oxide) film, an LTO (low temperature oxide) film, etc., or a silicon nitride film having relatively thin thickness of, for example, about 5 to 200 nm. In view of increasing the storage capacitor 70, it is preferable for the dielectric film 75 to be thin as long as sufficient reliabilities of the films are obtained. In addition, particularly in the exemplary embodiment, the dielectric film 75 has a two-layered film structure, as shown in FIG. 4, in which the lower layer is a silicon oxide film 75a and the upper layer is a silicon nitride film 75b, and is formed over the entire surface of the TFT array substrate 10. Alternatively, the dielectric film 75 may be constructed in a manner that the lower silicon oxide film 75a is formed over the entire surface of the TFT array substrate 10, and the upper silicon nitride film 75b is patterned to be accommodated within light-shielding regions (non-opening regions), so that the decrease of the transmittance ratio due to the silicon nitride film having colorability can be reduced or prevented. By doing so, since the silicon nitride film 75b having a relatively large dielectric constant exists, it is possible to increase the capacitance value of the storage capacitors 70, and also, since the silicon oxide film 75a exists, the dielectric strength of the storage capacitors 70 will never decrease. Like this, by forming the dielectric film 75 in the two-layered structure, it is possible to have two incompatible functions and effects simultaneously. In addition, the silicon nitride film 75b reduces or prevents water from permeating the TFTs 30. By doing so, in the exemplary embodiment, the threshold voltages of the TFTs 30 never increase, so that it is possible to employ the apparatus for a relatively long time. Although the dielectric film 75 has a two-layered structure in the exemplary embodiment, in some cases the dielectric film 75 may have a three-layered structure having, for example, a silicon oxide film, a silicon nitride film, and a silicon oxide film, or more-than-three-layered structure.

Furthermore, although the data line 6a and the capacitor electrode 300 are constructed in two-layered structures, they may be constructed with a polysilicon film, an aluminum film, and a titanium nitride film from the lower layer and a titanium nitride film may be used as a barrier metal at the time of opening the contact hole 87.

A first interlayer insulating film 41 is formed above the TFT 30 or the scanning line 3a and below the storage capacitor 70 or the data line 6a. The first interlayer insulating film 41 is made of, for example, a silicate glass film such as NSG (non-doped silicate glass), PSG (phosphorus silicate glass), BSG (boron silicate glass), and BPSG (boron phosphorus silicate glass), a silicon nitride film, a silicon oxide film, or preferably NSG. In addition, the contact hole 81 which electrically connects the heavily doped source region 1d of the TFT 30 with the data line 6a is opened in the first interlayer insulating film 41. Furthermore, the contact hole 83 which electrically connects the heavily doped drain region 1e of the TFT 30 with the first relay layer 71 constituting the storage capacitor 70 is opened in the first interlayer insulating film 41.

In addition, it is adapted that the aforementioned dielectric film 75 is not formed in the portion for forming the contact hole 81 out of the two contact holes, specifically, opening portions are formed in the dielectric film 75. The reason for such a formation is that it is necessary to facilitate the electric conduction between the lightly doped source regions 1b and the data lines 6a through the first relay layers 71 in the contact hole 81. If the opening portion is provided in the dielectric film 75, in case of performing a hydrogenation process on the semiconductor layer 1a of the TFT 30, it is also possible to obtain the function and effect that hydrogen used in the process can easily reach the semiconductor layer 1a through the opening portion.

Furthermore, in the exemplary embodiment, the first interlayer insulating film 41 may undergo a sintering process at about 1000° C. to activate the ions which are implanted into the polysilicon film constituting the semiconductor layer 1a or the scanning line 3a.

Following the aforementioned third layer, shielding layers 400 are provided on the fourth layer. The shielding layers 400 are formed in lattice to extend in the X and Y directions of FIG. 2 in plan view as shown in FIGS. 2 and 3. The portions of the shielding layers 400 which extend in the Y direction of FIG. 2 to form to be wider than the data lines 6a, thereby covering the data lines 6a. In addition, the portions which extend in the X direction of FIG. 2 have notched parts in the vicinity of the center of one side of respective pixel electrodes 9a in order to ensure regions for forming the below-described second relay layers 402. In addition, at the corner portions of the intersections of the shielding layers 400 which extend in the X and Y directions of FIG. 2, respectively, parts which have approximately a triangle shape are provided to correspond to the protrusions of the aforementioned capacitor electrodes 300, which have approximately a trapezoid shape. The shielding layers 400 having light shielding property may have the same width as the lower light-shielding films 11a, or a shorter or wider width than the lower light-shielding films 11a. However, the shielding layers 400 are formed to cover, except for the second relay layers 402, the TFTs 30, the scanning lines 3a, the data lines 6a, and the storage capacitors 70 as viewed from the upper side. In addition, by the shielding layers 400 and the lower light-shielding films 11, each side and the corner portions, that is, four corner parts, of the pixel opening regions are defined.

The shielding layers 400 are provided to extend from the image display regions 10a on which the pixel electrodes 9a are provided to their peripherals, and electrically connected to the constant potential source to be at a fixed potential. Incidentally, "the constant potential source" referred to herein may be the constant potential source, such as a positive power source or a negative power source supplied to a data line driving circuit 101, or a constant potential source supplied to the counter electrode 21 of the counter substrate 20.

Like this, since the shielding layers 400 are formed to cover the entire data lines 6a (see FIG. 3) and to have a fixed potential, it is possible to remove the influence of the capacitance coupling which occurs between the data lines 6a and the pixel electrodes 9a. Namely, it becomes possible to reduce or prevent the variation of the potential of the pixel electrodes 9a in accordance with electrical conduction to the data lines 6a, and thus, it is possible to reduce the probability of occurrence of the display non-uniformity along the data lines 6a on the image. In the exemplary embodiment, since the shielding layers 400 are formed in lattice, it is also possible to suppress the unnecessary capacitance couplings at the portions where the scanning lines 3a extend. In addition, by the aforementioned triangle portions of the shielding layers 400, it is possible to reduce or prevent the influence of the capacitance coupling which occurs between the capacitor electrodes 300 and the pixel electrodes 9a, and by doing so, it is possible to obtain the substantially same functions and effects described above.

In addition, on the fourth layer, second relay layers 402 which are one example of "relay layers" referred in the present invention are formed as the same film as the shielding layers 400. The second relay layers 402 have a function of relaying electrical connection between the pixel electrodes 9a and the first relay layers 71 which constitute the storage capacitors 70 through the below-described contact holes 89. In addition, the shielding layers 400 and the second relay layers 402 are not two-dimensionally continuously formed, but divided based on the patterning similarly to the aforementioned the capacitor electrodes 300 and the data lines 6a.

On the other hand, the shielding layers 400 and the second relay layers 402 have a two-layered structure in which the lower layer is made of aluminum and the upper layer is made of titanium nitride. By doing so, it is expected to obtain the moisture proof function by the titanium nitride. In addition, in the second relay layers 402, the lower layer of aluminum is connected to the first relay layers 71 which constitute the storage capacitors 70, and the upper layer of titanium nitride is connected to the pixel electrodes 9a which are made of ITO, etc. In this case, particularly, the latter connection can be performed well. On the contrary, in case that the aluminum and the ITO are directly contacted, it is different in that electrical erosion occurs between them, and thus, the disconnection of the aluminum or the insulation due to formation of alumina occurs, so that it is not possible to implement desirable electrical connection. In addition, the titanium nitride functions as a barrier metal to reduce or prevent penetration at the time of opening the contact holes 89. Like this, in the exemplary embodiment, since it is possible to implement the good electrical connection between the second relay layers 402 and the pixel electrodes 9a, it is possible to keep the voltage application property of the pixel electrodes 9a and the potential holding property of the pixel electrodes 9a to be in good states.

In addition, since the shielding layers 400 and the second relay layers 402 include aluminum having relatively good light reflective property and also titanium nitride having relatively good light absorbing property, the shielding layers 400 and the second relay layers 402 can function as light-shielding layers. In other words, the shielding layers 400 and the second relay layers 402 are able to block the travel of the incident light (see FIG. 2) to the semiconductor layer 1a at the upper side thereof. These are similar to the case of the capacitor electrodes 300 and the data lines 6a as described above. In the exemplary embodiment, the shielding layers 400, the second relay layers 402, the capacitor electrodes 300, and the data lines 6a constitute some portions of the stacked structure which is formed on the TFT array substrate 10 and also, in consideration of constituting the upper light-shielding film or "some portions of the laminated structure" which block the light incident from the upper side to the TFTs 30, thereby functioning as "an embedded light-shielding film". Incidentally, according to the concept of the "upper light-shielding film" or the "embedded light-shielding film," the scanning lines 3a, the first relay layers 71 or the like can be also regarded to be included. Essentially, in the broadest meaning of the "upper light-shielding film" or the "embedded light-shielding film", all the structures made of opaque materials constructed on the TFT array substrate 10 can be referred to as the "upper light-shielding film" or the "embedded light-shielding film".

A second interlayer insulating film 42 is formed above the data line 6a and below the shielding layer 400. The second interlayer insulating film 42 is made of, for example, a silicate glass film such as NSG, PSG, BSG, and BPSG, a silicon nitride film, a silicon oxide film, or preferably NSG. The contact hole 87 which electrically connects the shielding layer 400 and the capacitor electrode 300 and the contact hole 85 which electrically connects the second relay layer 402 with the first relay layer 71 are opened in the second interlayer insulating film 42.

Furthermore, with respect to the first interlayer insulating film 41, the stress which occurs in the vicinity of the boundary surface of the capacitor electrode 300 may be reduced by not subjecting the second interlayer insulating film 42 to the sintering process as described above.

Finally, on the fifth layer, the pixel electrode 9a is formed in a matrix as described above and the alignment film 16 is formed on the pixel electrode 9a. The pixel electrode 9a may have a shape that their corner portions are cut. In addition, a third interlayer insulating film 43 is formed below the pixel electrode 9a. The third interlayer insulating film 43 is made of, for example, a silicate glass film such as NSG, PSG, BSG, and BPSG, a silicon nitride film, a silicon oxide film, or preferably BPSG. The contact hole 89 which electrically connects the pixel electrode 9a with the second relay layer 402 is opened on the third interlayer insulating film 43. In addition, particularly, in the exemplary embodiment, the surface of the third interlayer insulating film 43 is planarized by CMP (chemical mechanical polishing) process, etc., so that it is possible to reduce the disorder of the liquid crystal layer 50 due to the step difference in the various wiring lines or elements which exist at the lower portions of the third interlayer insulating film 43. However, in addition to the aforementioned planarization process on the third interlayer insulating film 43, grooves may be etched in at least one of the TFT array substrate 10, the base insulating film 12, the first interlayer insulating film 41, and the second interlayer insulating film 42 to bury the wiring lines, such as data lines 6a or the TFTs 30 therein, thereby performing the planarization process. Alternatively, without doing the planarization process on the third interlayer insulating film 43, planarization may be achieved only by forming the aforementioned groove.

Constitution of Light Shielding against TFT

Now, the constitution of light shielding for the TFTs 30, more specifically, the structure associated with the scanning lines 3a including the gate electrodes of the TFTs 30 or the grooves 12cv of the base insulating film 12 will be described.

1: Light shielding in accordance with an aspect in which grooves 12cv formed in a base insulating film 12 and horizontal protrusions 3b extended from scanning lines 3a are provided will now be described.

Figure 5:
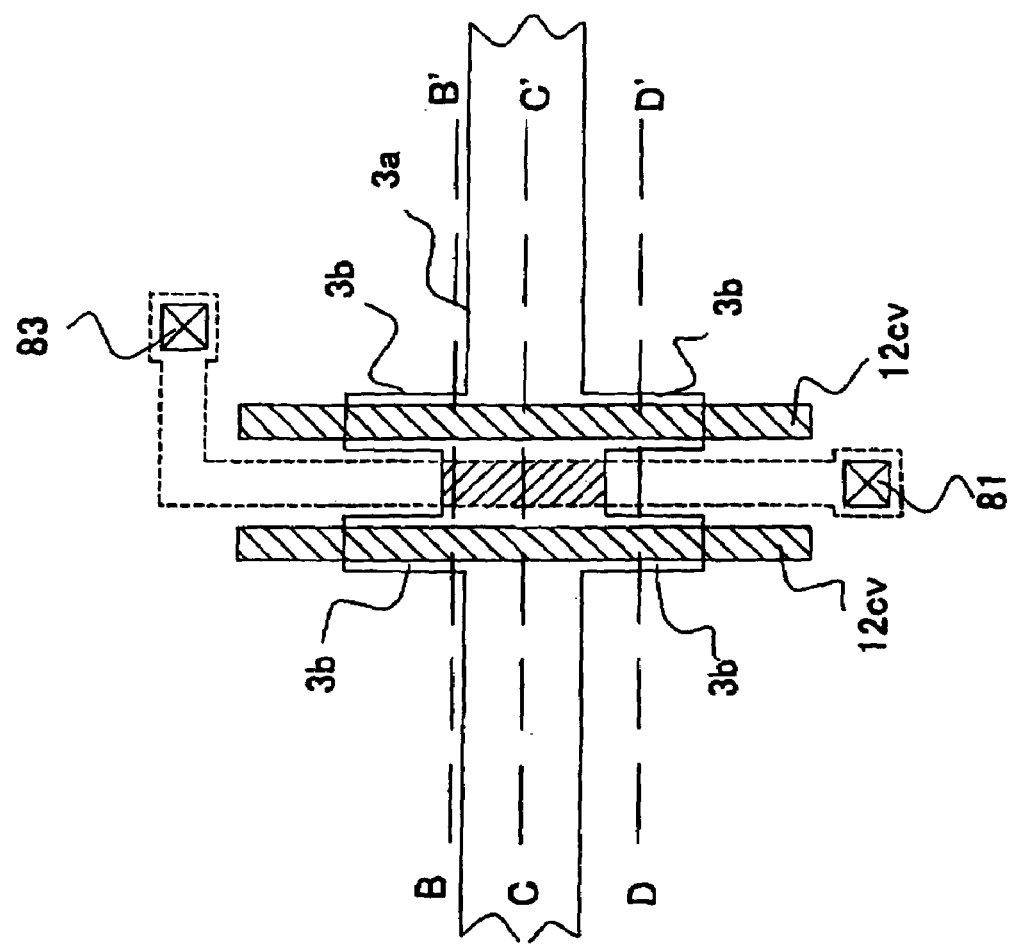
FIG. 5 is a plan view illustrating vertical protrusions of the scanning lines 3a and grooves which are formed by carving base insulating films together with a semiconductor layer, extracted from FIG. 2.
Figure 6:
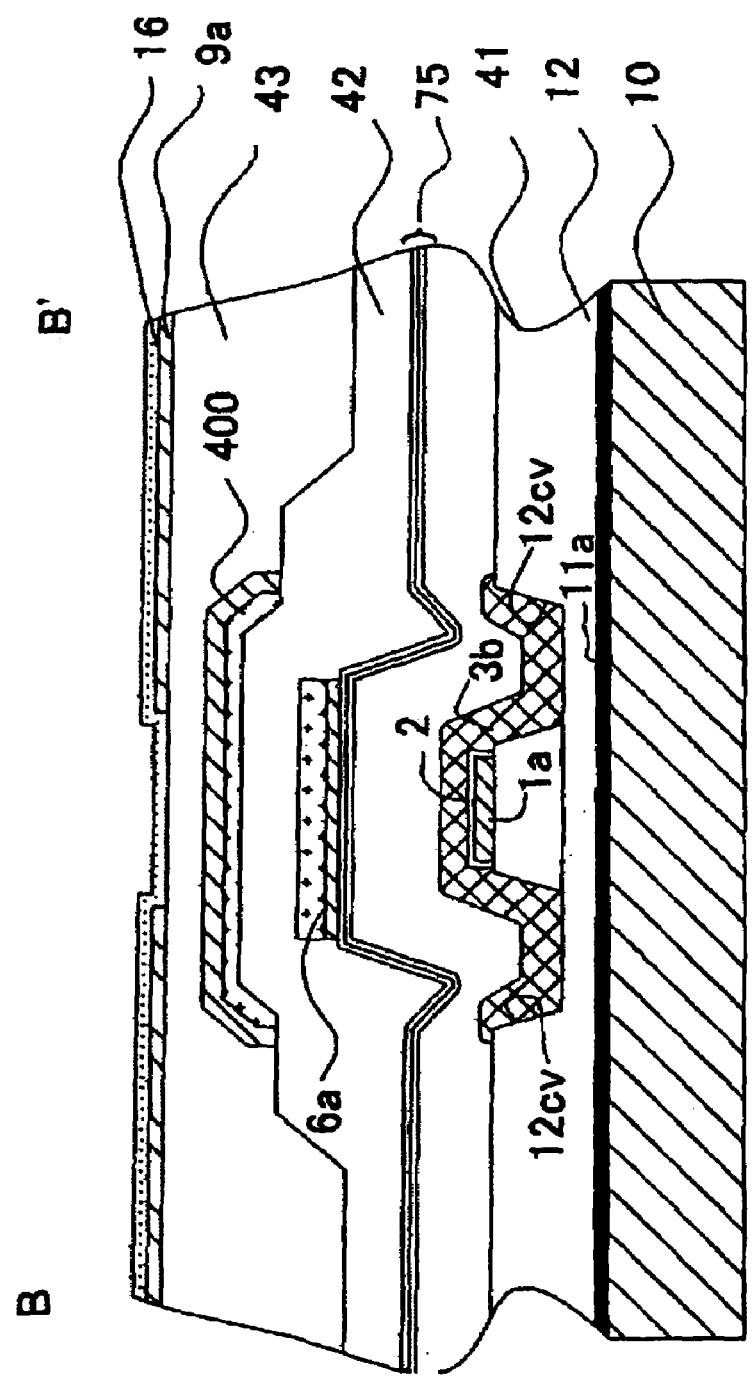
FIG. 6 is a cross sectional view taken along the plane B–B' in FIG. 5.
Figure 7:
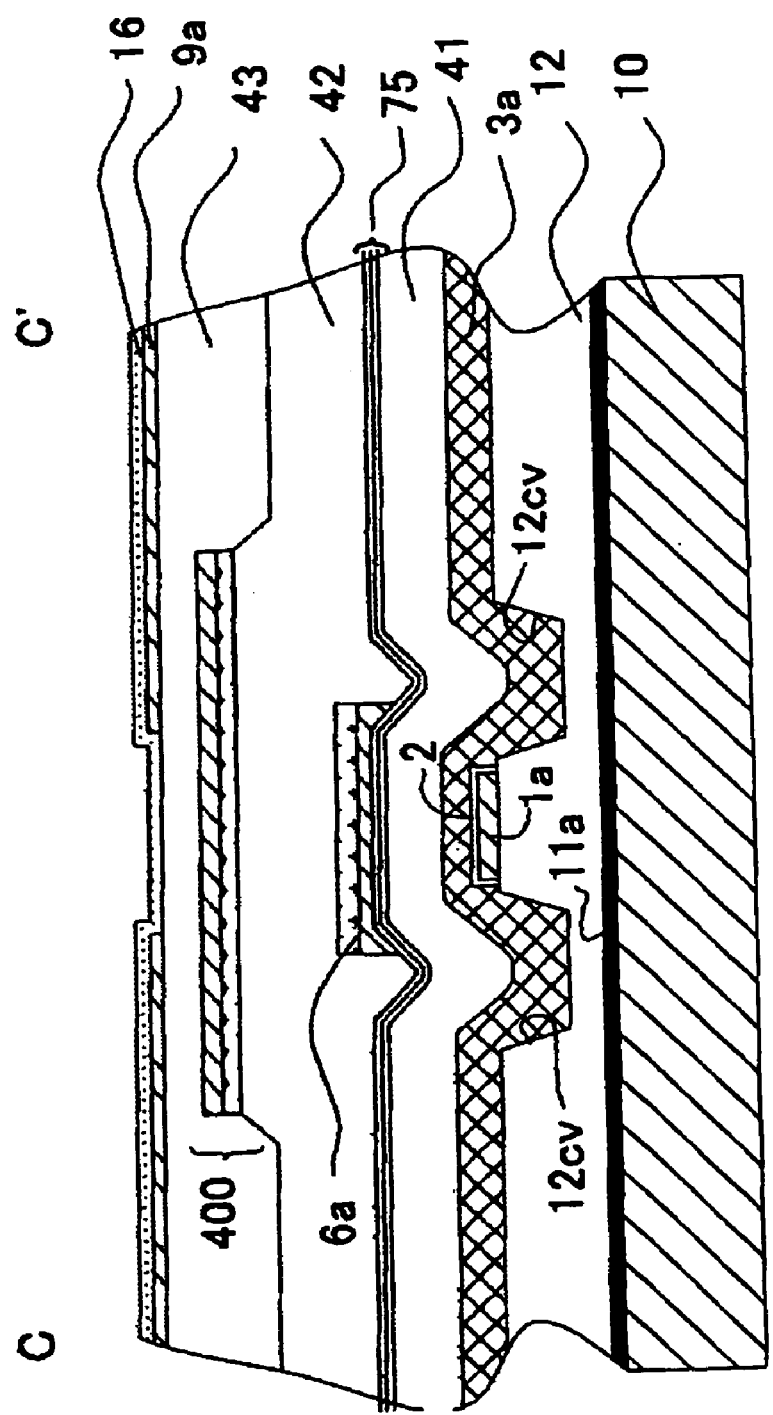
FIG. 7 is a cross sectional view taken along the plane C–C' in FIG. 5.
Figure 8:
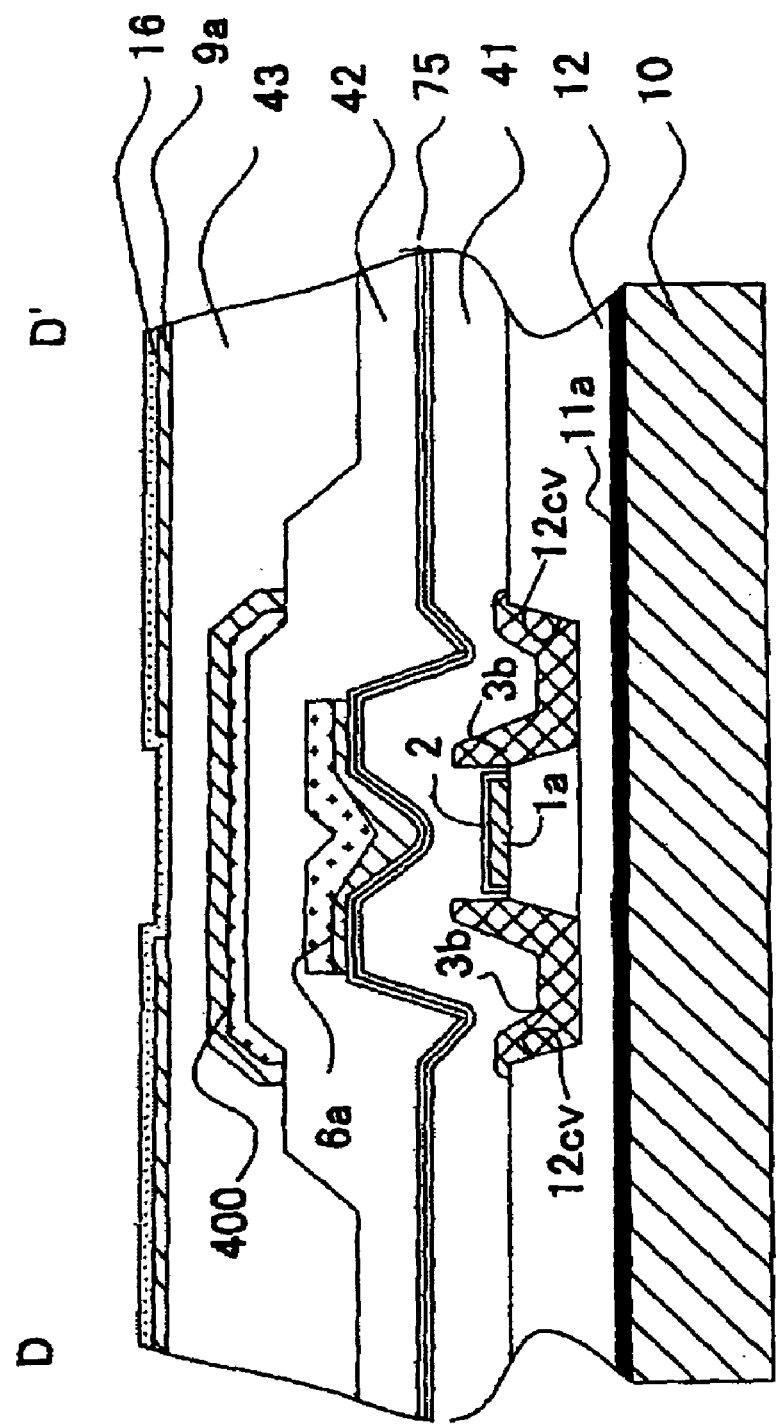
FIG. 8 is a cross sectional view taken along the plane D–D' in FIG. 5.

First, the construction, functions, and effects of the scanning lines 3a and the horizontal protrusions 3b, and the construction, functions, and effects of the grooves 12cv, which are etched into the base insulating film 12, will be described in details with reference to FIGS. 5 to 8. FIG. 5 is a plan view illustrating vertical protrusions 3b of the scanning line 3a and the grooves 12cv which are etched in the base insulating film 12, together with a semiconductor layer 1a extracted from FIG. 2. FIG. 6 is a cross sectional view taken along the plane B–B' in FIG. 5. FIG. 7 is a cross sectional view taken along the plane C–C' in FIG. 5. In addition, FIG. 8 is a cross sectional view taken along the plane D–D' in FIG. 5.

As shown in FIGS. 5 to 8, the grooves 12cv are etched in the base insulating film 12 along the data lines 6a at both sides of the semiconductor layer 1a. Inside the grooves 12cv, the horizontal protrusions 3b of the scanning line 3a are partially buried, and the first relay layer 71 and the capacitor electrode 300 are partially recessed corresponding to the grooves 12cv through the first interlayer insulating film 41. By doing so, the horizontal protrusions 3b of the scanning line 3a and the capacitor electrode 300, etc., have concave portions formed at the lower sides corresponding to the grooves 12cv, in each cross sectional view shown in FIGS. 6 to 8. In the construction, since the horizontal protrusions 3b are buried inside the grooves 12cv, the horizontal protrusions 3b have also function as vertical protrusions in the depth direction of the grooves 12cv.

In accordance with the construction, first, since the horizontal protrusions 3b are provided in the scanning lines 3a, which are made of polysilicon, the incident light and the returning light which travel at an angle with respect to the surface of the TFT array substrate 10 and the slanted light, such as the inside-reflected light and the multiple-reflected light based on the incident light and the returning light can be at least partially prevented from entering the channel region 1a' and its adjacent regions, that is, the lightly doped source region 1b and the lightly doped drain region 1c by mainly absorption and partial reflection of light by the horizontal protrusions 3b in particular, as well as the main body portion, which functions as the gate electrode, of the scanning line 3a. At this time, since the light shielding is performed by the horizontal protrusions 3b near the semiconductor layer 1a and the main body portion of the scanning line 3a, it is possible to effectively perform the light shielding.

Second, since the scanning line 3a (including horizontal protrusions 3b), the first relay layer 71, and the capacitor electrode 300, which function as light-shielding films covering the semiconductor layer 1a from the upper side, have concave portions formed at the lower sides thereof corresponding to the grooves 12cv, respectively, in comparison to the case that the upper light-shielding films are flat, the incident light which travels at an angle with respect to the surface of the substrate and the slanted light, such as the inside-reflected light and the multiple-reflected light based on the incident light and the returning light can be reduced or prevented more effectively from finally entering the channel region 1a' and the adjacent region thereof from the slanted upper side by the upper light-shielding film. Specifically, since the tendency of diffusion of the slanted light from the upper sides increase along the grooves 12cv due to the upper surface portion of the upper light-shielding film having concave shape at the lower side thereof (or convex shape at the upper side thereof), it is finally possible to reduce the light amount that enters into the channel region 1a' and the adjacent region from the slanted upper side. In addition, for the same reason, the lower light-shielding film 11a may be formed to partially have concave shapes at the upper side, that is, convex shapes at the lower side, with inverted unevenness of the aforementioned upper light-shielding film.

Herein, in the exemplary embodiment, the light shielding is performed against the TFTs 30 at upper and lower sides thereof by various light-shielding films as shown in FIGS. 2 and 4. Namely, the capacitor electrodes 300, the shielding layers 400, etc., function as the upper light-shielding films for the incident light from the upper side of the electro-optical device, that is, from the incident side of the incident light. The lower light-shielding films 11a, literally, function as the lower light-shielding films for the returning light entering from the lower side of the electro-optical device, that is, from the emitting side of the incident light. Therefore, it is considered that it is not necessary to provide the horizontal protrusions 3b in the scanning lines 3a or to provide any additional special shape to the capacitor electrodes 300, etc., which are the upper light-shielding films, by the grooves 12cv. However, the incident light includes the slanted light entering the substrate 10 from the slanted direction. For the reason, the slanted light is reflected on the upper surface of the substrate 10 or the upper surface of the lower light-shielding films 1a, or on the lower surface of the upper light-shielding film, and further on other boundary surfaces within the electro-optical device, so that the inside-reflected light and the multiple-reflected light are generated. Therefore, even when various light-shielding films are provided at the upper and lower sides of the TFTs 30, some slanted light entering the gaps between both sides may exist. Accordingly, in the exemplary embodiment, the light shielding effect obtained by the horizontal protrusions 3b which perform the light shielding on the sides of the semiconductor layer 1a or the concave portions corresponding to the grooves 12cv, as in the exemplary embodiment, is great.

Like this, according to the electro-optical device of the exemplary embodiment, since the light-resistant property can be enhanced by providing the horizontal protrusions 3b and the grooves 12cv, it is possible to efficiently control the switching of the pixel electrodes 9a by the TFTs 30 with reduced light leakage current, even under such a severe condition that strong incident light or returning light enters, and thus, it is eventually possible to display image having high brightness and high contrast.

In addition, in the exemplary embodiment, since the upper light-shielding films are formed of some portions of the scanning lines 3a including the horizontal protrusions 3b, the capacitor electrodes 300, and the shielding layers 400, it is possible to facilitate the simplification of the laminated structure and the manufacturing process of the TFT array substrate 10 as a whole. In addition, in the exemplary embodiment, since the horizontal protrusions 3b are formed in one body with the same film as the scanning lines 3a, any additional process is not necessary to form the horizontal protrusions 3b.

Moreover, in the exemplary embodiment, the grooves 12cv do not reach the lower light-shielding films 11a, and thus, the horizontal protrusions 3b which are formed to cover the bottom surface of the grooves 12cv and the scanning line 3a which includes vertical protrusions in the depth direction do not contact with the lower light-shielding films 11a. For the reason, even though the lower light-shielding films 11a are conductive films, it is possible to reduce or prevent the potential variation from having a bad effect on the scanning lines 3a in advance.

In the aforementioned exemplary embodiment, the scanning lines 3a may be constructed with light-shielding films including metals or alloys (a single metal substance, a metal alloy, a metal silicide, a poly silicide including at least one of high melting point metals such as Ti, Cr, W, Ta, and Mo, or laminated structure thereof) similarly to the lower light-shielding films 11a. According to the construction, since the reflection performance is increased by the scanning lines 3a and the horizontal protrusions 3b, it is possible to further enhance the light shielding performance of the channel regions 1a' or the channel adjacent regions for the slanted light.

Although four horizontal protrusions 3b are formed for each of the channel regions 1a', the horizontal protrusion may be formed only at one side of the channel regions 1a', or only at upper or lower side thereof, in FIG. 2, thereby obtaining similar effects to some extent. For example, in a case where it is difficult to form a total of four horizontal protrusions 3b, that is, at both sides and at the upper and lower sides of the channel regions 1a', in consideration of the arrangement of wiring lines or elements in the vicinity of the semiconductor layer 1a, three or less horizontal protrusions 3b may be formed in every channel region only at one side, only at upper side, or only at lower side without causing any bad effect on the layout.

2: Light shielding in accordance with an aspect in which horizontal protrusion parts 3b are substituted with surrounding portions 3c is described below.

Figure 9:
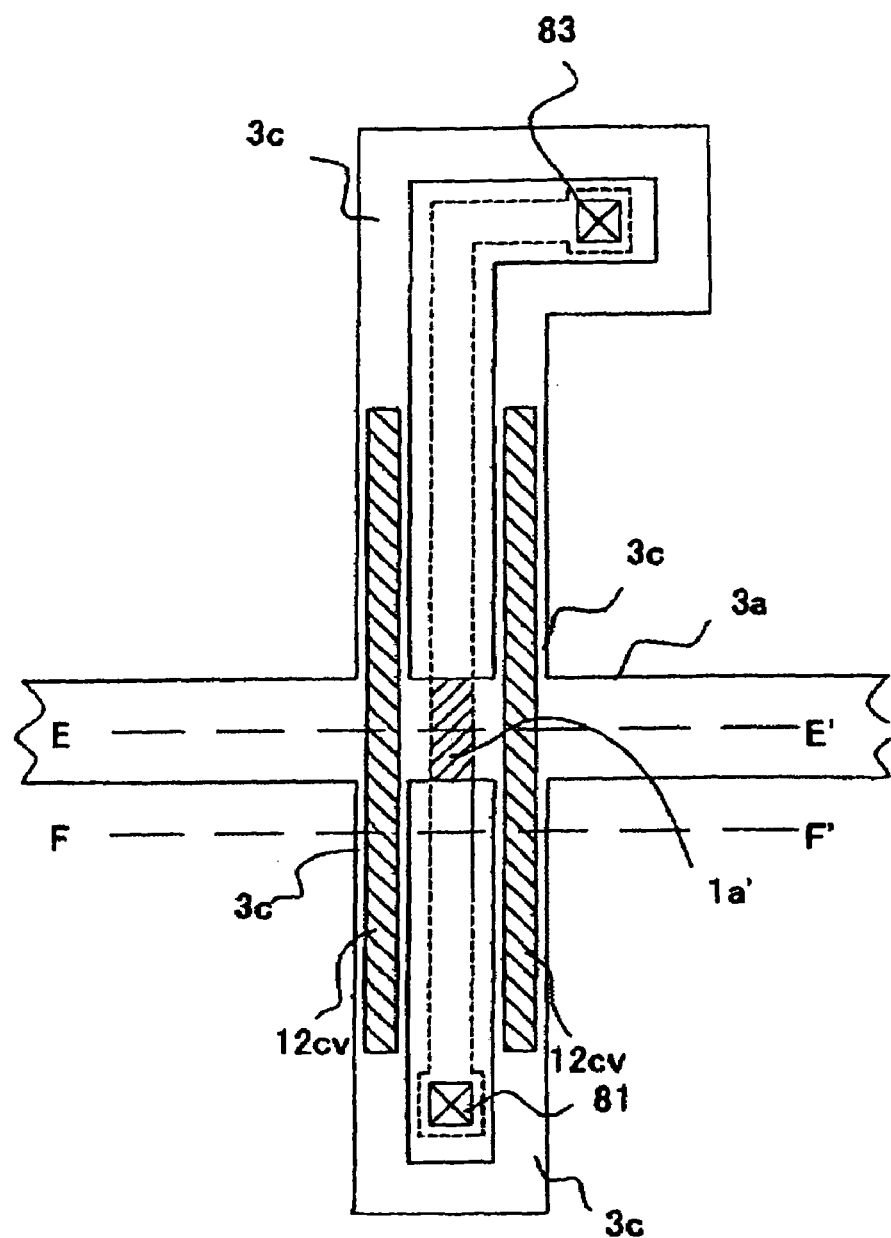
FIG. 9 is a view illustrating a configuration where the vertical protrusion in FIG. 5 is substituted with a surrounding portion, in the same purpose as FIG. 5.
Figure 10:
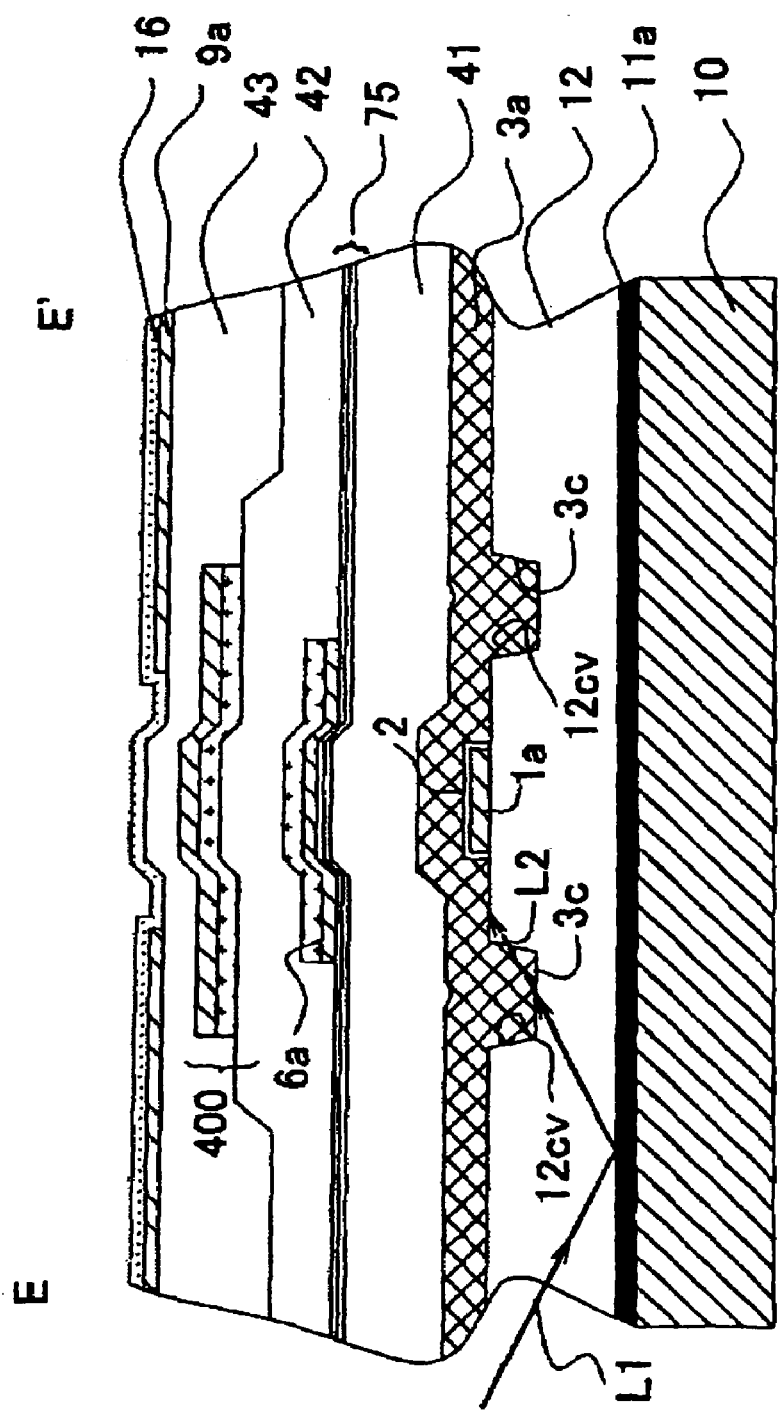
FIG. 10 is a cross sectional view taken along the plane E–E' in FIG. 9.
Figure 11:
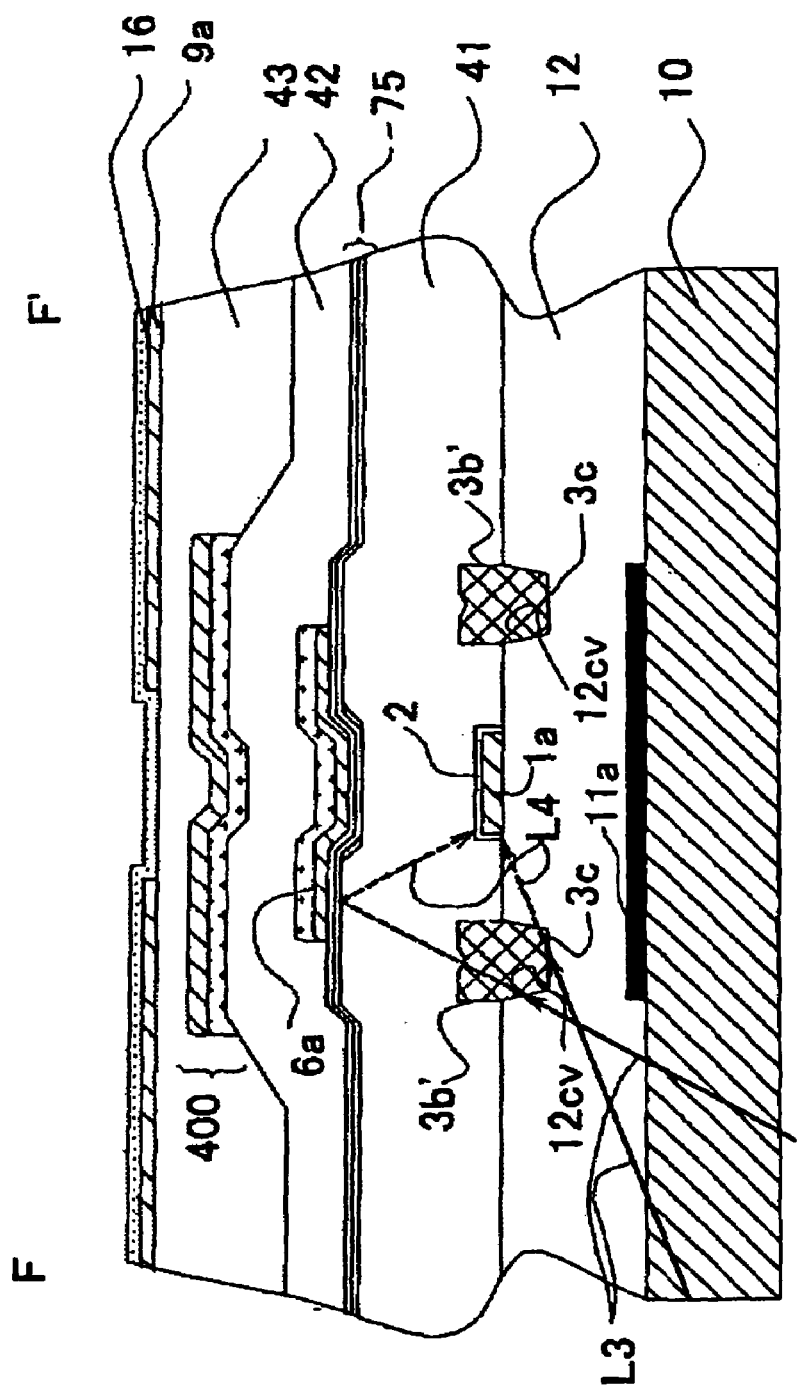
FIG. 11 is a cross sectional view taken along the plane F–F' in FIG. 9.
Figure 12:
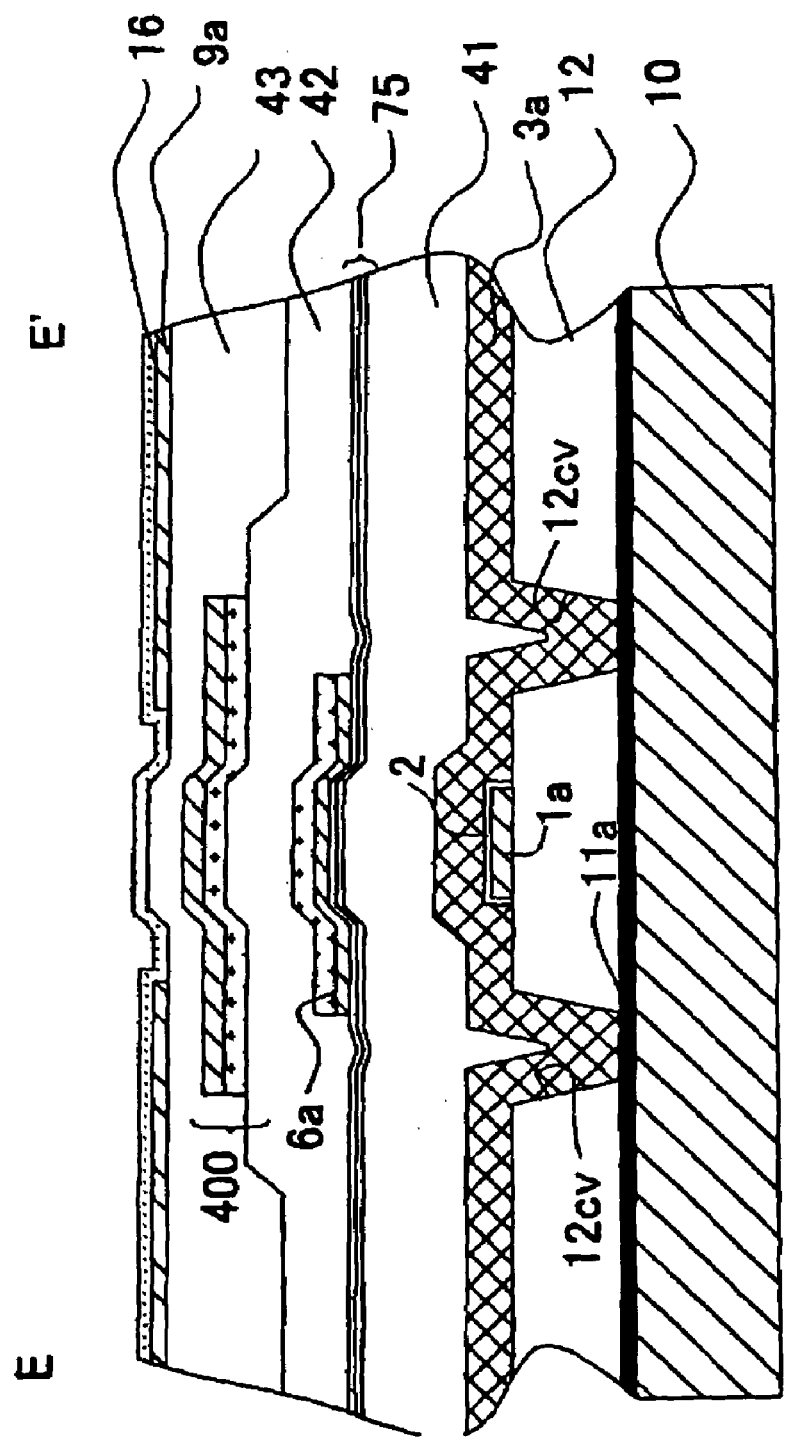
FIG. 12 is a cross sectional view taken along the plane E–E' in FIG. 9 which is a modified configuration.

Second, an exemplary embodiment that the surrounding portions 3c for surrounding the semiconductor layer 1a are formed for the scanning line 3a will be described with reference to FIGS. 9 to 11. Herein, FIG. 9 is a view, with the same purpose as FIG. 5, illustrating a configuration in which the vertical protrusions 3b in FIG. 5 are substituted with surrounding portions 3c. FIG. 10 is a cross sectional view taken along the plane E–E' in FIG. 9. FIG. 11 is a cross sectional view taken along the plane F–F' in FIG. 9. FIG. 12 is a cross sectional view taken along the plane E–E' in FIG. 9 which shows a modified exemplary embodiment.

As shown in FIGS. 9 to 11, in the exemplary embodiment, in place of the aforementioned horizontal protrusions 3b, the surrounding portions 3c are provided to extend from the main line portion of the scanning line 3a at the positions which are separated from the channel regions 1a' by a predetermined distance along the scanning line 3a in plan view, so as to surround the entire semiconductor layer 1a which includes the channel regions 1a' and the contact hole opening regions, that is, the regions where the contact holes 83 and 81 are opened. Other constructions, for example, including that the surrounding portions 3c are buried inside the grooves 12cv and also having a function of vertical protrusions in the depth direction as the grooves 12cv are substantially similar to the construction in accordance with the aforementioned 1.

In addition, since, also in this exemplary embodiment, the construction that the semiconductor layer 1a is interposed between the upper light-shielding films and the lower light-shielding films 11a interlayer distance of which is relatively short can be obtained, it is possible to obtain basically the very high light shielding performance against the light perpendicular to the surface of the substrate. In addition, particularly, as shown in FIGS. 10 and 11, even in a case wherein the incident light and the returning light which travel at an angle with respect to the surface of the substrate and the slanted lights L1 and L3, such as the inside-reflected light and the multiple-reflected light based on the incident light and the returning light occur, some portions of the lights can be absorbed or reflected by the surrounding portions 3c in particular as well as the main line portions of the scanning lines 3a and reduced to the lights L2 and L4 having low light intensities before the light reaches the semiconductor layer 1a. At this time, since the light shielding is performed by the surrounding portions 3c which are located at the positions where the interlayer distance from the semiconductor layer 1a is very short and also the surrounding portions 3c can shield the slanted lights L1 and L3 in any directions, it is possible to effectively perform the light shielding.

Furthermore, in the exemplary embodiment, particularly since the semiconductor layer 1a including the contact hole opening regions where the contact holes 81 and 83 are opened is surrounded, it is possible to improve the light shielding performance in the vicinity of the contact holes 81 and 83 where the light in general leaks easily.

In addition, in the exemplary embodiment, in place of the construction shown in FIG. 10, the vertical protrusions may contact the lower light-shielding films 11a as shown in FIG. 12. In this construction, since the semiconductor layer 1a is provided within the closed space, it is possible to further implement the good light shielding against the semiconductor layer 1a. Incidentally, the construction that the lower light-shielding films 1a and the scanning lines 3a contact with each other can be implemented in the aforementioned construction shown in FIGS. 5 to 8.

However, in these cases, the bad influence due to the potential variation of the lower light-shielding films 11a may occur as described above. For the reason, after weighing the necessity of the light shielding for the semiconductor layer 1a and the bad influence due to the potential variation of the lower light-shielding films 11a, it is determined, case by case, whether the scanning lines 3a should be contacted to the lower light-shielding films 11a.

In addition, in the exemplary embodiment, the grooves 12cv may be etched along the entire surrounding portions 3c of the scanning lines 3a, and then, the protrusions, that is, vertical protrusions, which protrude downwardly over the entire surrounding portions 3c may be formed. Moreover, in a case where the surrounding portions 3c are formed as in the exemplary embodiment, if the width of the semiconductor layer 1a in the contact hole opening regions is formed to be equal to the width of the semiconductor layer 1a in the channel regions 1a', it is possible to cover the semiconductor layer 1a by the surrounding portions 3c having rectangular shape at the positions relatively near the semiconductor layer 1a. Therefore, it is believed that the higher light shielding effect can be obtained.

Furthermore, in the aforementioned configurations, the surrounding portions 3c are buried inside the grooves 12cv and thus have a function as vertical protrusions as well. However, this exemplary embodiment also include such a construction that the surrounding portions having only horizontal parts are formed so as to surround the semiconductor layer 1a, which can be expected to exhibit functions and effects accordingly.

3: Light shielding in accordance with an aspect in which grooves 12cva extending along scanning line 3a are provided is described below.

Figure 13:
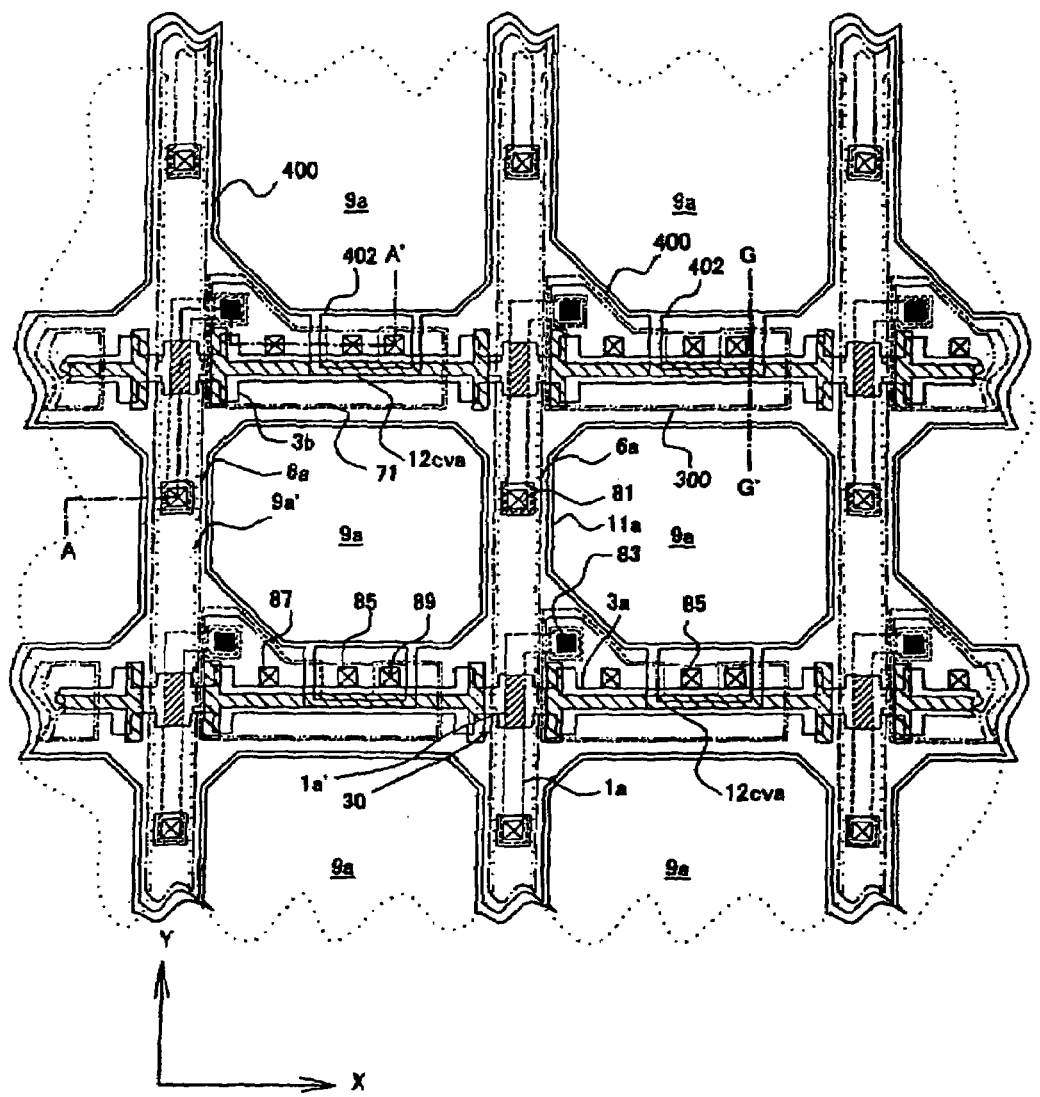
FIG. 13 is a view, in the same purpose as FIG. 2, but illustrating a configuration different from FIG. 2 in that the grooves extending along the scanning line are provided in the base insulating film.
Figure 14:
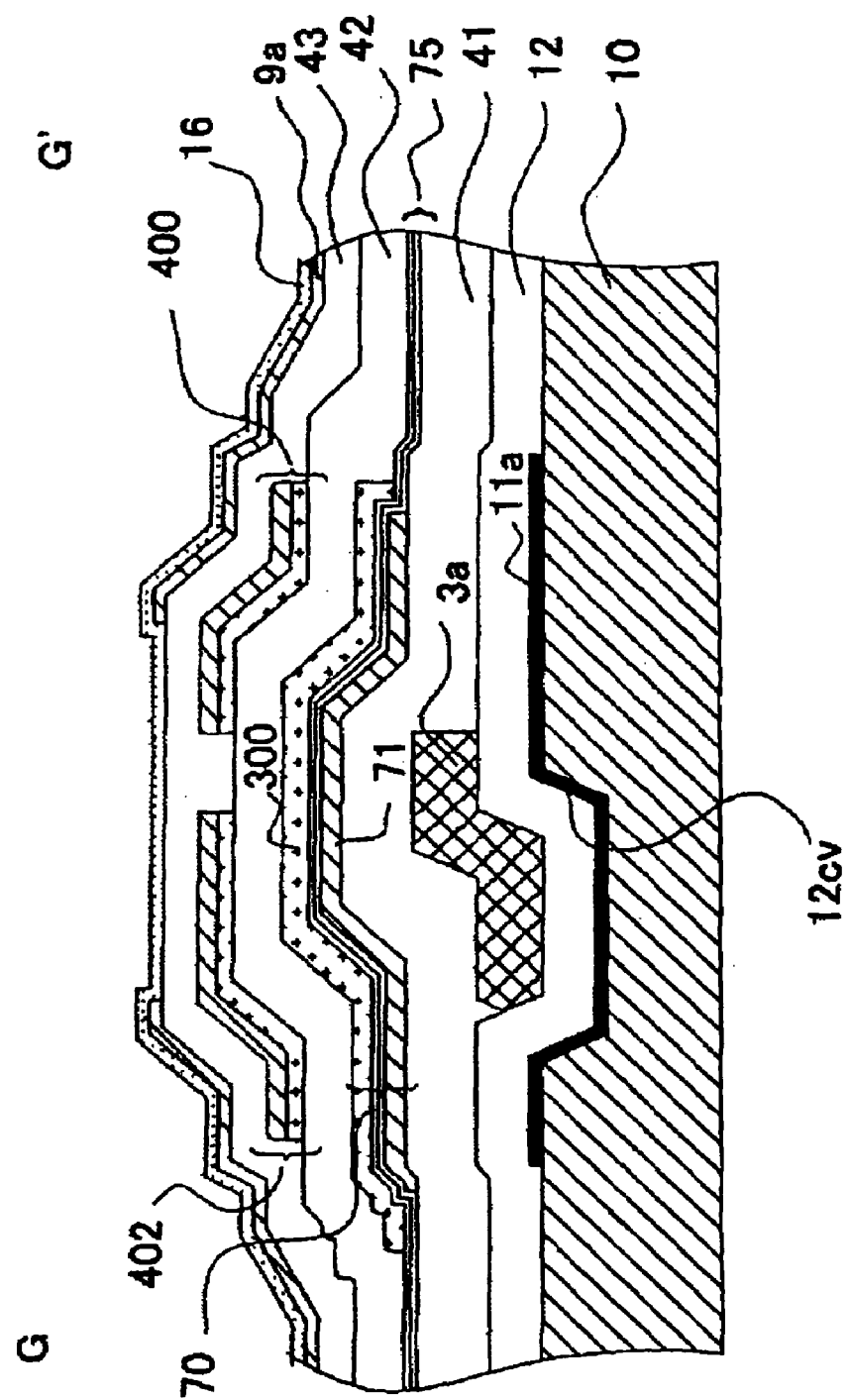
FIG. 14 is a cross sectional view taken along the plane G–G' in FIG. 13.

Third, the exemplary embodiment in which the grooves 12cva extending along the scanning line 3a are formed and the main line portions of the scanning line 3a are partially buried inside the grooves 12cva will be described with reference to FIGS. 13 to 16. Herein, FIG. 13 is a plan view, in the same purpose as FIG. 2, illustrating a configuration which is different from FIG. 2 in that the grooves 12cva extending along the scanning line 3a are provided in the base insulating film 12, and FIG. 14 is a cross sectional view taken along the plane G–G' in FIG. 13. In addition, FIGS. 15 and 16 are cross sectional views taken along the plane G–G' in FIG. 13 which shows a modified exemplary embodiment of FIG. 14.

The scanning lines 3a include inside-groove portions which are provided in the grooves 12cva which extend along the scanning lines 3a and partially cover the channel regions 1a' and the adjacent regions thereof from the sides. Therefore, even in the configuration, the incident light which travels at an angle with respect to the surface of the substrate, the returning light which particularly travels at an angle particularly with respect to the rear surface, and the slanted light, such as the inside-reflected light and the multiple-reflected light based on the incident light and the returning light, can be partially prevented from entering into the channel regions 1a' and the adjacent regions thereof by the absorption or reflection of light by inside-groove portions. Like this, by enhancing the light-resistant property, it is possible to efficiently control the switching of the pixel electrodes 9a by the TFTs 30 light leakage current which is reduced even under such a severe condition that strong incident light or returning light enters.

Figure 15:
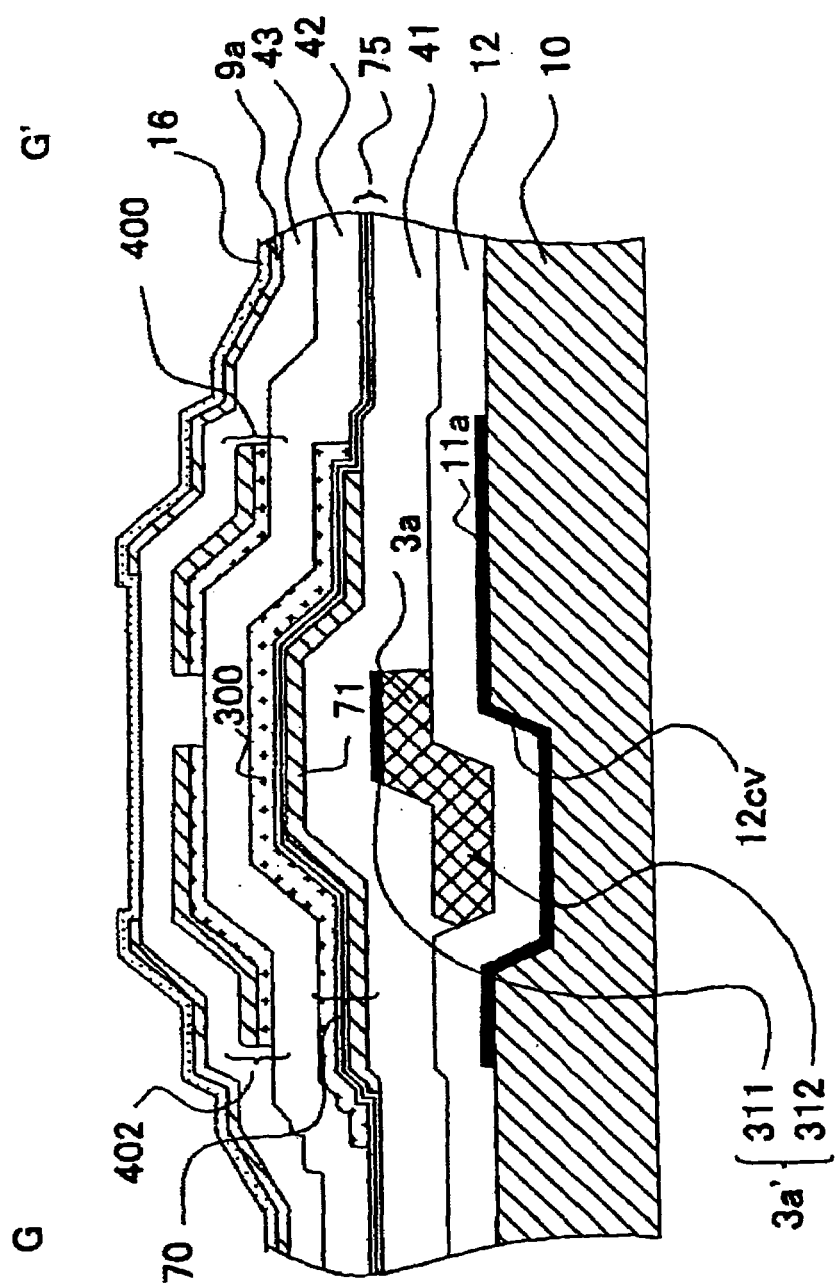
FIG. 15 is a cross sectional view taken along the plane G–G' in FIG. 13 with respect to a modified configuration of FIG. 14.

In addition, in this exemplary embodiment, as shown in FIG. 15, in place of the aforementioned construction that the scanning line 3 a has a single-layered structure in FIG. 14, the scanning line 3a' made of a laminated substance which includes a first layer 311 made of light-shielding materials and a second layer 312 made of light-absorbing materials may be formed. In this case, the first layer 311 is made of, for example, WSi, TSi, and the like. The second layer 312 is made of, for example, SiGe or a polysilicon film which is the same film as the semiconductor layer 1a. Even though the scanning line 3a' is formed in this manner, it is possible to enhance light shielding performance for the channel region 1a' and the adjacent region thereof in accordance with the inside-groove portion which is provided in the groove 401 of the scanning line 3a', and at the same time, it is possible to reduce the wire resistance of the scanning line. Furthermore, the second layer 312 which is made of SiGe, etc., may effectively function as the gate electrode which is provided to face the gate oxide films in the TFTs 30. In addition, the laminated order of the first 311 and the second 312 may be inverted up and down.

Figure 16:
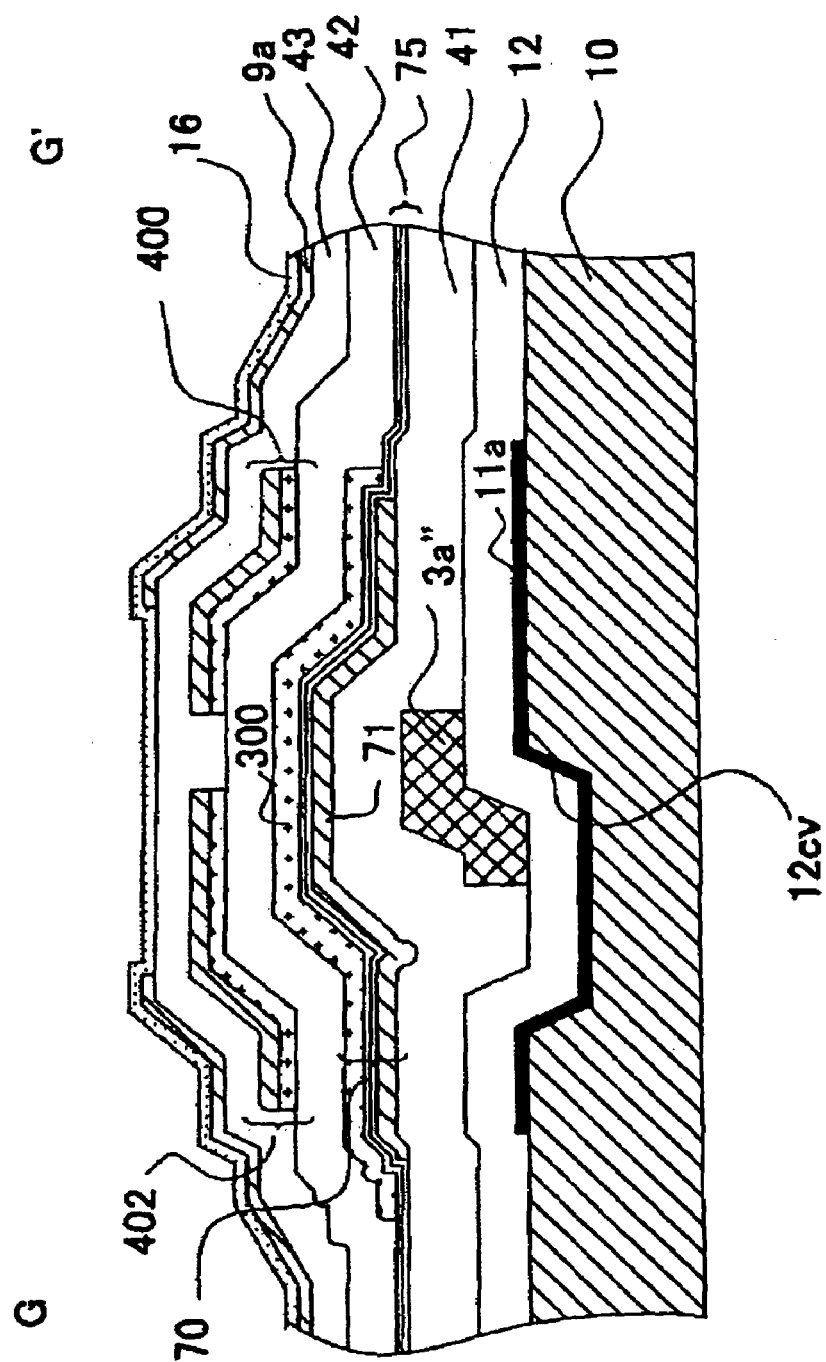
FIG. 16 is a cross sectional view taken along the plane G–G' in FIG. 13 with respect to another modified configuration of FIG. 14.

Alternatively, as shown in FIG. 16, scanning line 3a" may be formed so as not to be completely buried in the grooves 12cva. Even though the scanning line 3a" is formed in this manner, it is possible to enhance light shielding performance on the channel regions 1a' and the adjacent regions thereof in accordance with the inside-groove portions which are provided in the groove 12cva of the scanning line 3a", and at the same time, it is possible to reduce the wire resistance of the scanning line.

In accordance with the constructions, functions, and effects associated with the various light shielding described above, since the light incident from the upper or lower side of the TFT 30, from the sides, and from slanted directions can be effectively reduced or prevented. Thus, it is possible to reduce or prevent the light leakage current from occurring in the TFT 30 to the most. As a result, according to the exemplary embodiment, since the switching operation of the TFT 30 can be accurately performed and the state in which so called bias is always driven due to the light leakage current in the semiconductor layer 1a can be avoided, it is also possible to implement high frequency driving. Furthermore, if the light shielding can be effectively performed on the TFTs 30, any particular hindrance will not occur in realizing the miniaturization of the electro-optical device. In other words, displaying images of predetermined brightness, the electro-optical device, even miniaturized, has to have a certain pixel aperture ratio corresponding to its size, and thus, "miniaturization" is accompanied with a risk that light enters the TFTs 30. However, this risk is reduced in the present exemplary embodiment.

As described above, according to the electro-optical device of the present exemplary embodiment, it is possible to keep the voltage applied to the pixel electrode to be as constant as possible, and at the same time, it is possible to implement miniaturization and render high accuracy and to display high quality of image by high frequency driving.

Construction of Shielding Layer

Figure 17:
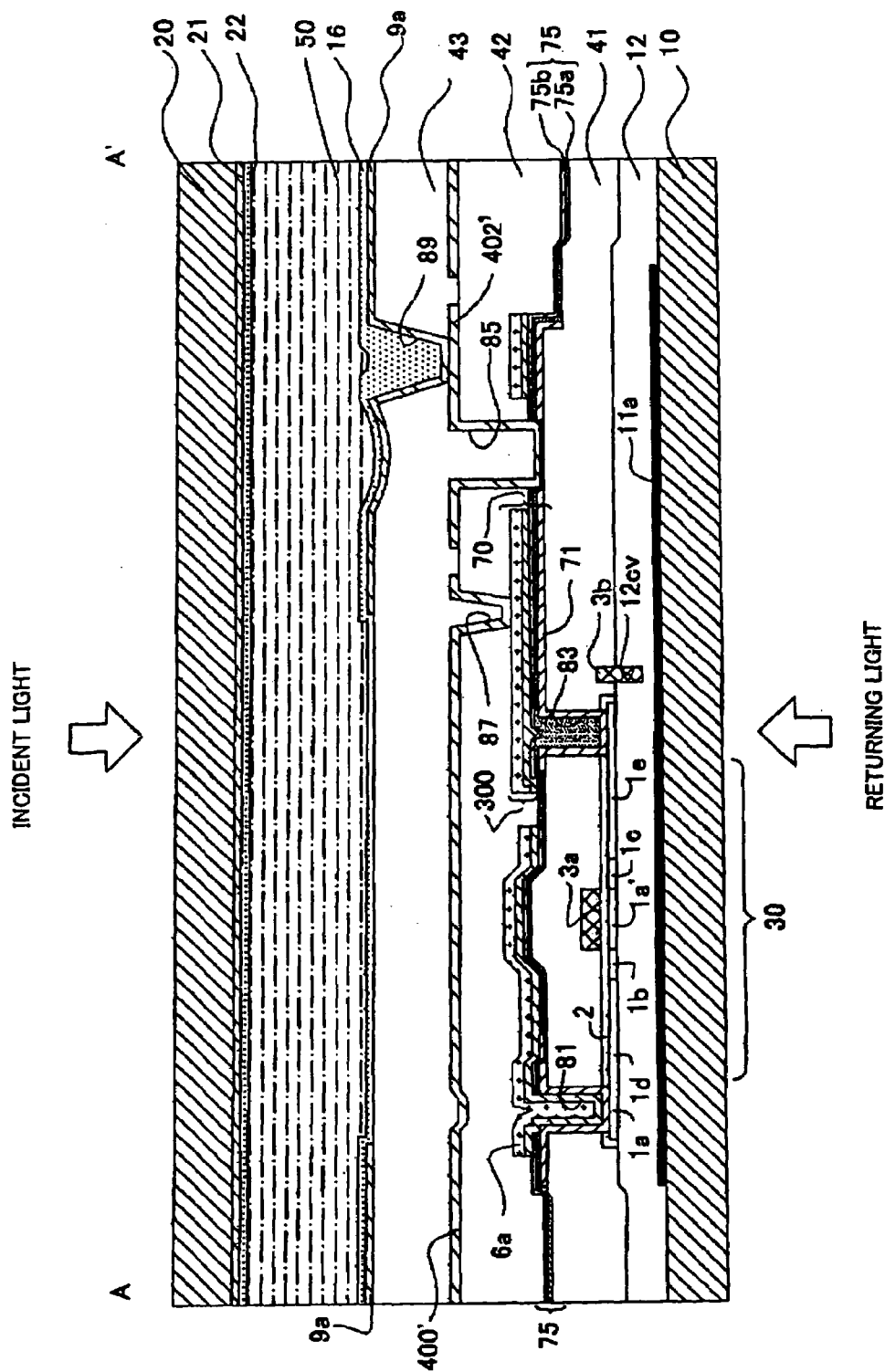
FIG. 17 is a view, in the same purpose as FIG. 4, but illustrating a modified configuration of a shielding layer.
Figure 18:
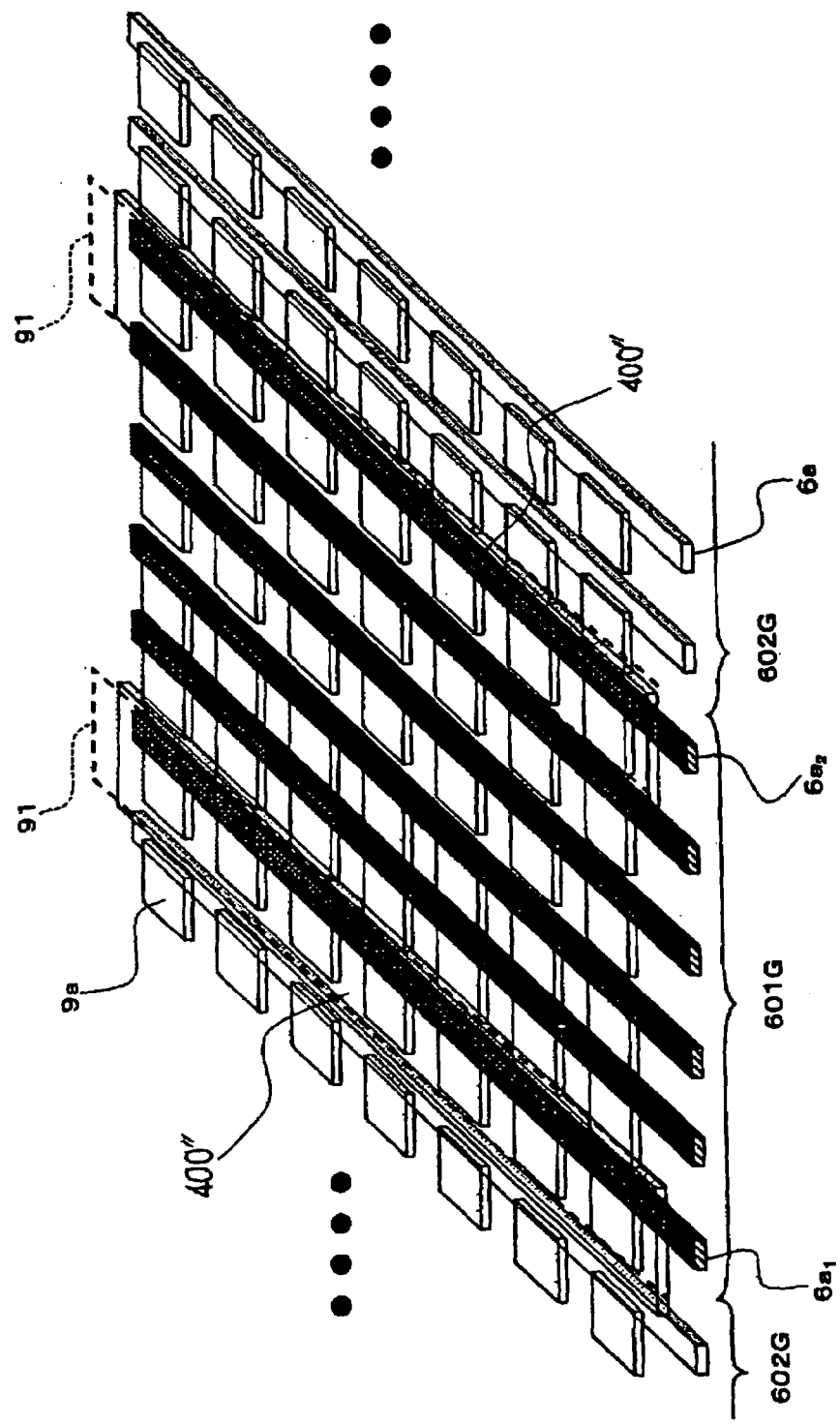
FIG. 18 is a perspective view illustrating essential portions of a configuration in which shielding layer is provided on the data lines which are located at end boundaries of supplied groups among a plurality of the data lines.
Figure 19:
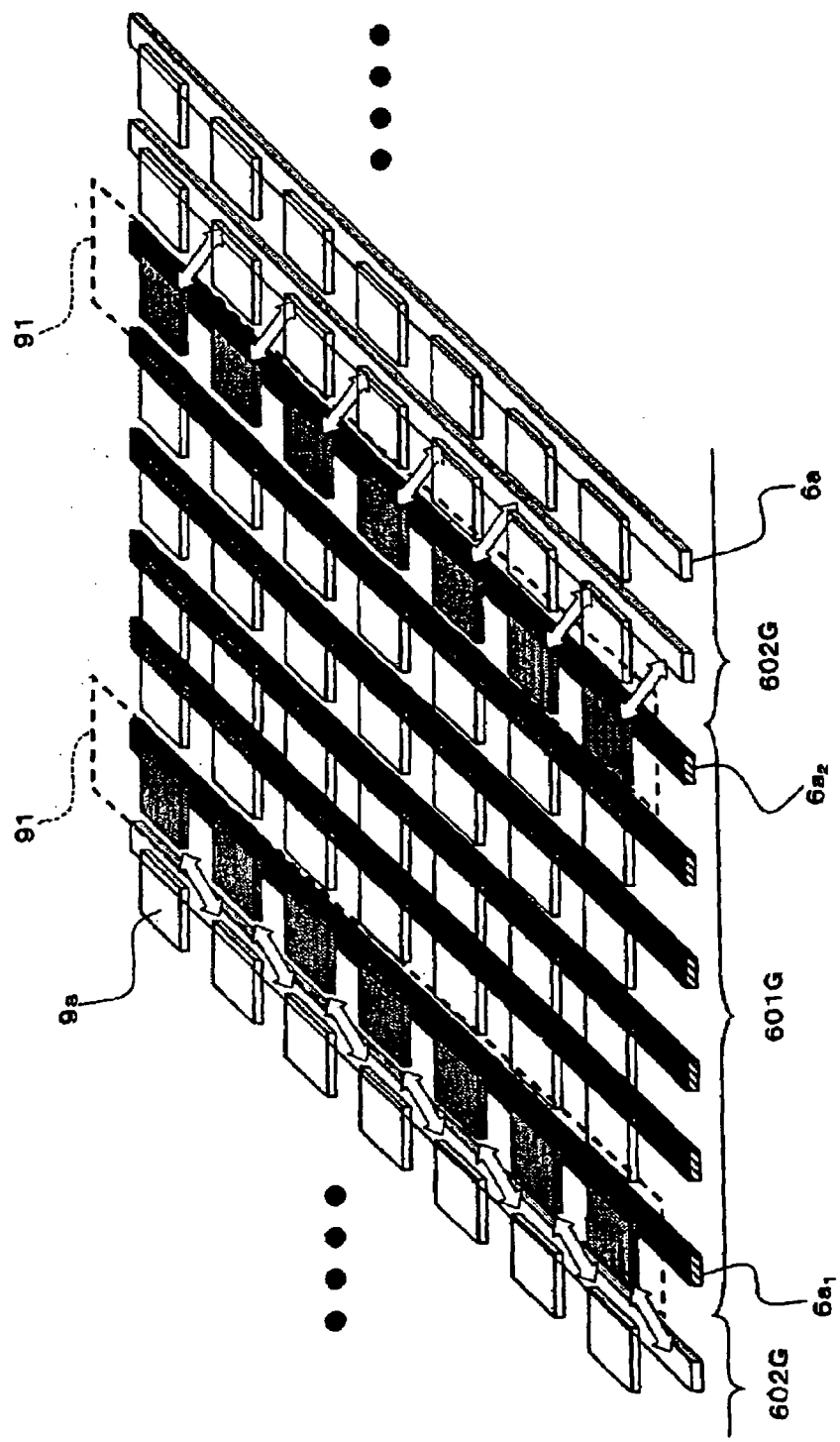
FIG. 19 is a view, in the same purpose as FIG. 18, schematically illustrating states of capacitance couplings which occur between the pixel electrodes and the data lines which are located at the end boundaries of the supplied groups.

Now, the construction of the aforementioned shielding layers 400, more specifically, various modified configurations of the shielding layers 400, or the arrangement relationship between the data lines 6a and the pixel electrodes 9a will be described with reference to FIGS. 17 and 18. Herein, FIG. 17 is a view, in the same purpose as FIG. 4, illustrating a modified configuration of shielding layer. FIG. 18 is a perspective view illustrating the essential part of a configuration in which shielding layer is provided on the data lines which are located at end boundaries of supplied groups among a plurality of the data lines, and FIG. 19 is a view, in the same purpose as FIG. 18, schematically illustrating states of capacitance couplings which occur between the pixel electrodes and the data lines which are located at the end boundaries of the supplied groups.

1: An exemplary embodiment in which shielding layer is provided on entire surface of substrate will now be described.

Although in the aforementioned configurations the shielding layer 400 includes the upper layer of aluminum film and the lower layer of titanium nitride film and is formed along the data line 6a, an aspect of the present invention is not limit to such a configuration. For example, as shown in FIG. 17, the shielding layer 400' which is made of transparent conductive materials such as ITO, IZO, etc., may be formed on the entire surface of the TFT array substrate 10.

According to such a configuration, the regions between the data lines 6a and the pixel electrodes 9a can be said to be almost completely covered, and the influence of the capacitance couplings which occur between them can be more surely reduced or eliminated. Furthermore, even though the shielding layer 400' is formed in a mat shape, since the shielding layer is made of ITO and the like, any particular hindrance does not occur on the light transmission in the electro-optical device. In addition, since the storage capacitor can be formed between the pixel electrode and the shielding layer by providing the shielding layers on the entire surface of the substrate, it is possible to enhance the display quality in accordance with the increase of the storage capacitance.

In addition, it is preferable to perform the below-described processes on the shielding layer 400'. Namely, first, a second relay layer 402' is formed at the positions for forming contact holes 89, as the same film as the shielding layer 400' but divided based on the patterning. By doing so, the insulation between the shielding layer 400' having a fixed potential and the second relay layer 402' can be obtained. Furthermore, in some cases, the second relay layer is formed as the lower layer of the shielding layer which is formed on the entire surface of the substrate at the positions of forming the contact hole 89, and aperture having a suitable diameter may be provided in the shielding layer (the aspect is not shown in the drawings) at the position of forming the contact hole 89. By doing so, it is possible to form the contact hole 89, and the like without any difficulty. Incidentally, since the "aperture" is sufficient if it realizes the penetration of the contact hole, it is not necessary to form the aperture with high accuracy (a so-called "large aperture" is allowable). Second, it is preferable that the thickness of the shielding layer 400' be about 50 to 500 nm. By doing so, it is possible to sufficiently eliminate the influence of the capacitance couplings, and also, it is possible to surely avoid the case that the shielding layer 400' may be a hindrance to sustaining the transparency of the whole electro-optical device.

2: An exemplary embodiment in which shielding layer is selectively formed on data line will now be described.

In an aspect of the present invention, as mentioned above, although the shielding layers may be formed to extend along the data lines 6a and have wider width than the data lines 6a in order to cover the data lines 6a, in addition to this, it is possible to appropriately select the data lines 6a on which the shielding layers are formed. Namely, as shown in FIG. 18, the shielding layers 400" may be formed with respect to the data lines which are located at both ends of the data line group to which image signals are supplied at one time, among the plurality of the data lines.

In accordance with the construction, in the aspect that the data lines 6a are grouped into several groups and the image signals are supplied simultaneously per group, since the shielding layers 400" are formed with respect to the data lines in which the influence of the capacitance coupling is least desired to occur, it is possible to expect enhancement of the quality of the image more effectively.

Namely, it is general that the supply of the image signals to the data lines 6a can be performed with respect to one group of the plurality of the data lines 6a. In this case, the display non-uniformity may occur on the image along the data lines $6a_1$ and $6a_2$ which extend at the end boundaries between the groups 601G to which the image signals are supplied (hereinafter, referred to as a "supplied group") and the groups 602G adjacent to the group 601G (hereinafter, referred to as "non-supplied group").

Such non-uniformity of display may occur because there are some cases that the electric fields which accurately correspond to the image signals are not applied to the pixel electrodes 9a which exist just at the end boundaries of the supplied groups 601G and the non-supplied groups 602G. More specifically, in this case, as shown in FIG. 19, since the data lines $6a_1$ and $6a_2$ to which image signals are supplied exist at one end portion of the pixel electrodes 9a (see the pixel electrodes 9a within the dashed line 91 in FIG. 19) and the data lines 6a to which image signals are not supplied (in FIG. 19, the data lines 6a just at left of the data line $6a_1$ and the data lines 6a just at right of the data line $6a_2$) exist at the other end portion of the pixel electrodes 9a, even if the electric fields which accurately correspond to the image signals are applied, the potential variation may occur due to the influence of the capacitance couplings between the pixel electrodes 9a and the data lines 6a to which image signals are not supplied. Incidentally, in FIG. 19, white bi-directional arrows are marked between the pixel electrodes 9a and the data lines in order to visually show these situations.

Therefore, in the aspect, by providing the shielding layers 400" on the data lines 6a which are located at the end boundaries of the supplied groups 601G as shown in FIG. 18, it is possible to suppress the occurrence of the display non-uniformity which is almost along the data lines $6a_1$ and $6a_2$ which extend to the aforementioned locations.

Although the number of the data lines constituting the supplied group 601G is six in FIG. 18 etc., the number is basically determined in accordance with how many parallel signals the image signal includes. For example, assuming that the image signals are formed by converting a serial signal into six parallel signals, the aforementioned group becomes a group including six data lines which are adjacent to each other.

3: An exemplary embodiment in which shielding layer and data line are formed in separate layer will now be described.

Figure 20:
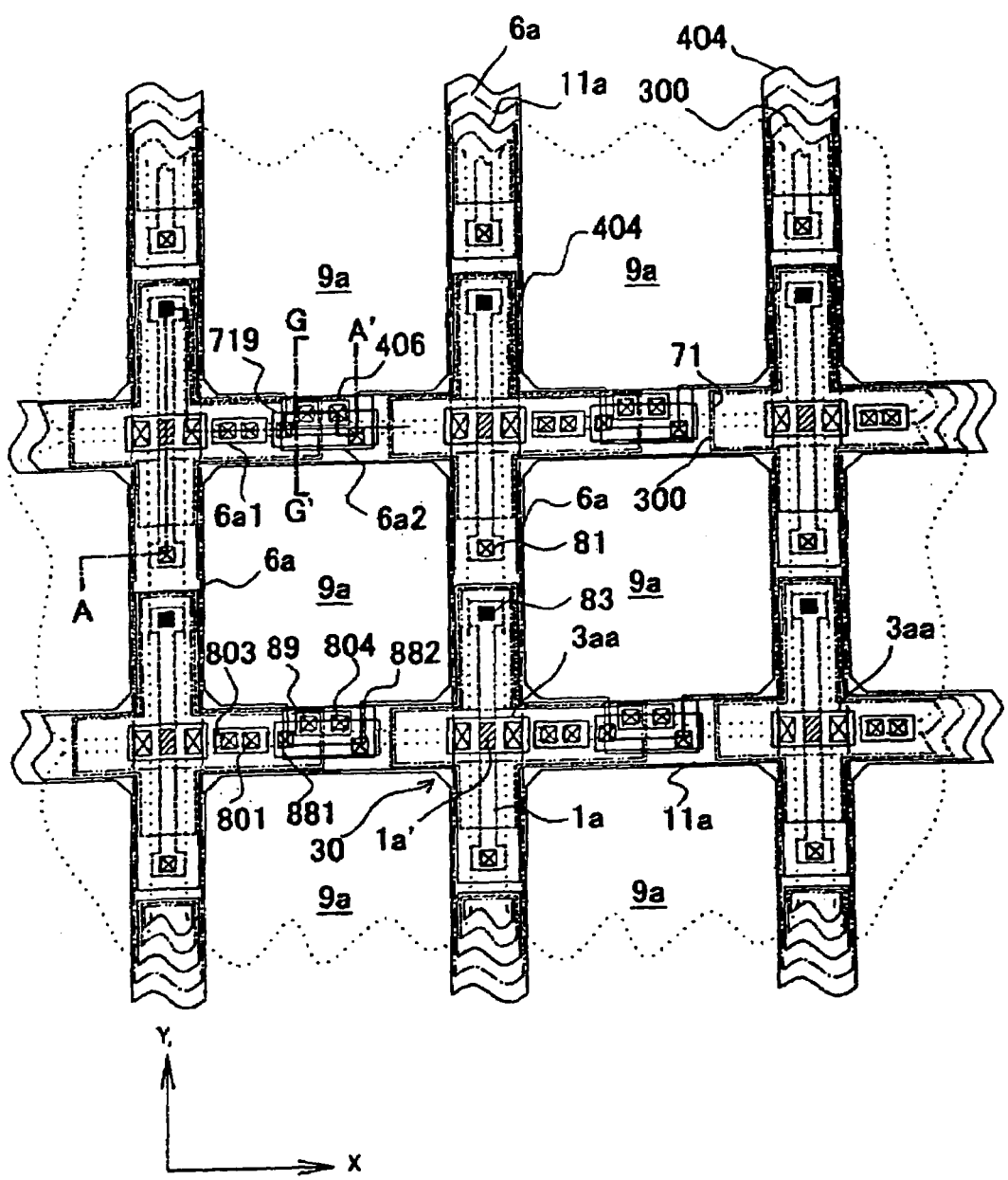
FIG. 20 is a view, in the same purpose as FIG. 2, but illustrating a configuration in which the storage capacitors and the data lines are formed in different layers.
Figure 21:
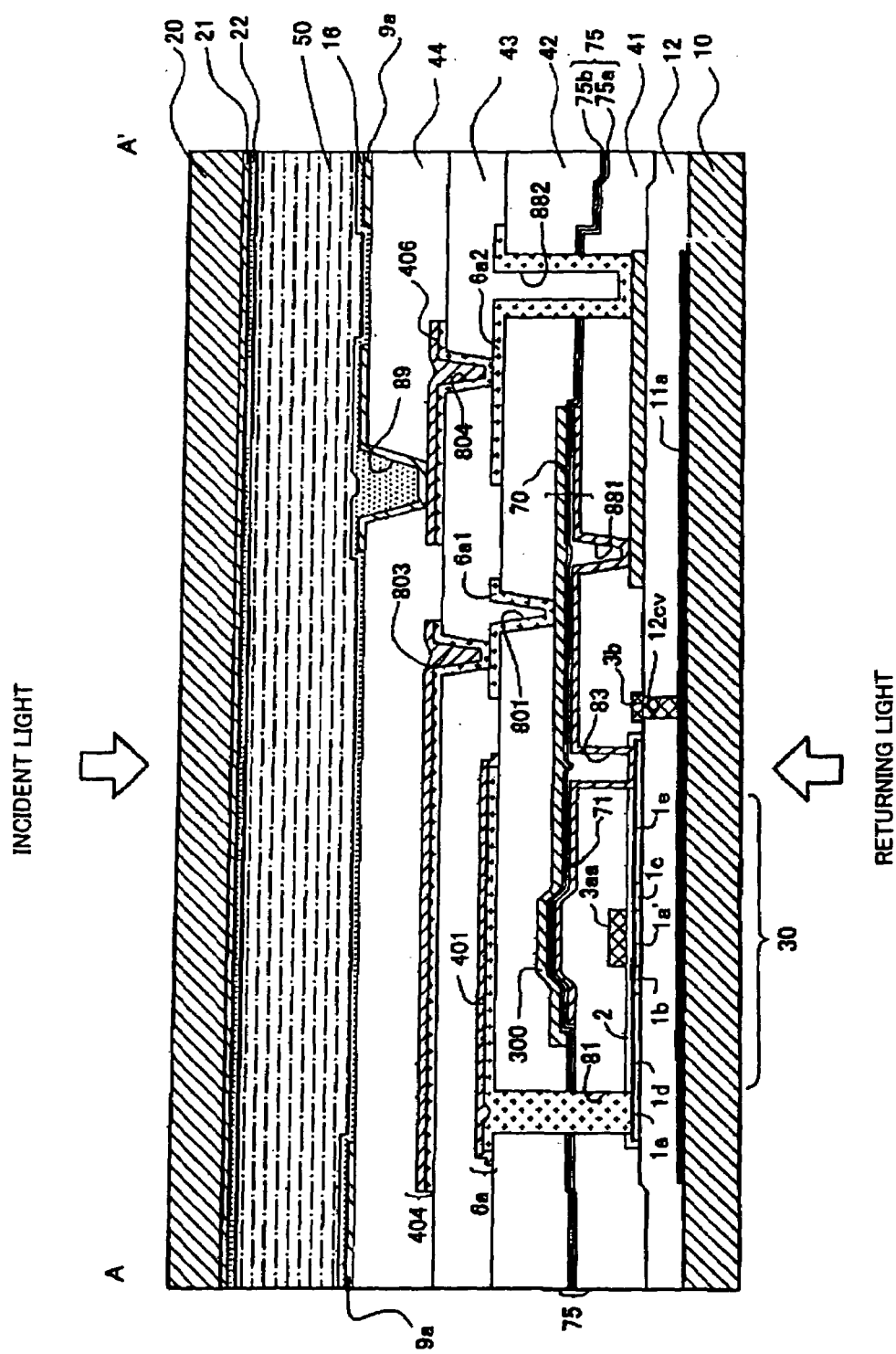
FIG. 21 is a view, in the same purpose as FIG. 4, but illustrating a configuration in which the storage capacitors and the data lines are formed in different layers.

Although in the aforementioned exemplary embodiment the capacitor electrodes 300 and the data lines 6a are made as the same film, both constituents may be formed in separate layers in the present invention. For example, the laminated structures as shown in FIGS. 20 and 21 may be employed. Herein, FIGS. 20 and 21 are views, in the same purpose as FIGS. 2 and 4, illustrating a configuration in which one of the electrodes constituting the storage capacitor and the data lines are formed in different layers.

In FIGS. 20 and 21, in comparison to FIGS. 2 and 4, the capacitor electrode 300, which is the upper electrode constituting the storage capacitor 70, and the data line 6a are not made as the same film, and an interlayer insulating film is added thereto. Namely, the difference is that one more new "fourth interlayer insulating film 44" is provided and a relay electrode 719 is formed as the same film as the gate electrode 3aa. By doing so, on the TFT array substrate 10, a first layer which includes the lower light-shielding film 11a functioning also as scanning line, a second layer which includes the TFT 30 having the gate electrode 3aa, a third layer which includes the storage capacitor 70, a fourth layer which includes the data line 6a or the like, a fifth layer on which the a shielding layer 404 is formed, a sixth layer (uppermost layer) which includes the aforementioned pixel electrode 9a, the alignment film 16, and the like are provided in that order. Furthermore, the base insulating film 12 is formed between the first layer and the second layer, the first interlayer insulating film 41 is formed between the second layer and the third layer, the second interlayer insulating film 42 is formed between the third layer and the fourth layer, the third interlayer insulating film 43 is formed between the fourth layer and the fifth layer, and the fourth interlayer insulating film 44 is formed between the fifth layer and the sixth layer, respectively, thereby reducing or preventing a short circuit between the aforementioned constituents. In the example, in place of the scanning line 3a, the gate electrode 3aa is formed, and the relay electrode 719 is further formed of the same film as the gate electrode 3aa.

Furthermore, contact hole 801 is formed in the second interlayer insulating film 42 which is located between the aforementioned third and fourth layers, and the relay layer 6a1 for the shielding layer is formed to correspond to the contract hole 801 on the fourth layer. And also, contact hole 803 is formed on the third interlayer insulating film 43 which is located between the aforementioned fourth and fifth layers. By doing so, the electrical connection is obtained between the shielding layer 404 and the capacitor electrodes 300 by the contact hole 801 or the relay layer 6a1 for the shielding layer and the contact hole 803.

Moreover, in FIG. 21, the relay electrode 719 is formed of the same film as the gate electrode 3aa, and the pixel electrode 9a and the first relay electrode 71 are electrically connected to the relay electrode 719.

More specifically, the electrical connection to the pixel electrodes 9a is obtained through a second relay layer 6a2 and a third relay layer 406. Among them, the second relay layer 6a2 is formed of the same film as the data line 6a to be buried in a contact hole 822 which is opened in the first and second interlayer insulating films 41 and 42 and to reach the relay electrode 719. The third relay layer 406 is formed of the same film as the shielding layer 404 to be buried in a contact hole 804 which is opened in the third interlayer insulating film 43 to reach the second relay layer 6a2.

In addition, in this case, since it is the third relay layer 406 that is at the risk of being electrically eroded with the ITO of the pixel electrode 9a, it is preferable to employ the construction that the third relay layer 406 is made of aluminum film and titanium nitride film as described above. Furthermore, in some cases, it is possible that the shielding layer 404 and the third relay layer 406 be made of ITO similarly to the aforementioned 1, and at the same time, formed in a mat shape on the entire surface of the substrate, and the second relay layer 6a2 and the relay layer 6a1 for the shielding layer and others which may be electrically eroded with the aforementioned constituents made of ITO are formed by the same two-layered structures.

On the other hand, the electrical connection between the relay electrode 719 and the first relay layer 71 is performed through contact hole 881 which is opened in the first interlayer insulating film 41. Namely, after opening the contact hole 881, the precursor film of the first relay layer 71 is formed to be buried in the contact hole, so that the electrical connection between the first relay layer 71 and the relay electrode 719 can be realized.

By doing so, the electrical connection is formed between the first relay layer 71 and the pixel electrode 9a through the relay electrode 719.

Incidentally, although in the aforementioned exemplary embodiment the scanning line 3a is formed to include the gate electrode in the same plane, in this exemplary embodiment, the lower light-shielding film 11a in the aforementioned exemplary embodiment functions as the scanning line in order to obtain the regions in which the relay electrode 719 is formed. In other words, the lower light-shielding film 11a in this exemplary embodiment are formed in a striped shape in plan view, and the bottom of the groove 12cv which constitutes the contact hole is formed to contact the lower light-shielding film 11a, so that the scanning signal is supplied to the gate electrode 3aa through the aforementioned lower light-shielding film 11a.

By doing so, the horizontal protrusion 3b in this exemplary embodiment has the light shielding function for the semiconductor layer 1a and also the function of supplying signal to the gate electrode 3aa. Furthermore, the protruded region for rounding corner of the pixel electrode 9a is formed in the region where the lower light-shielding film 11a intersects the data line 6a.

Furthermore, the relay electrode 719 is formed in an island shape to be located at the approximately center potion of one side of each pixel electrode 9a in plan view as shown in FIG. 20. Since the relay electrode 719 and the gate electrode 3aa are formed as the same film, if the latter is made of, for example, a conductive polysilicon film, etc., the former is also made of a conductive polysilicon film, etc.

Moreover, even in such configuration, the shielding layer 404 has the function of eliminating the influence of the capacitance coupling between the data line 6a and pixel electrode 9a similarly to the aforementioned aspect.

Furthermore, in this aspect, since the relay electrode 719 is particularly formed, it is possible to obtain the following functions and effects. Namely, in FIG. 4, etc., it is necessary to facilitate the contact with "the upper surface" in the drawing of the first relay layer 71 which is the electrodes of the further lower layer which constitutes the storage capacitor 70, similarly to the contact hole 85 in the same figure in order to facilitate the electrical connections between the TFT 30 and the pixel electrode 9a.

However, in that case, in the processes of forming the capacitor electrode 300 and the dielectric film 75, when etching the precursor film, a very difficult manufacturing process is required that the precursor film is etched while leaving the first relay layers 71 just below the precursor film in unimpaired condition. In particular, in a case wherein the high dielectric constant materials are used as the dielectric film 75 similarly to the present invention, the etching is in general difficult, and with other conditions such that the etching rate of the capacitor electrode 300 and the etching rate of the high dielectric constant materials are different, the manufacturing process becomes more difficult. Therefore, in this case, the probability of the so-called "penetration" in the first relay layer 71 becomes high. If so, there are some cases that the short circuit may occur between the capacitor electrode 300 and the first relay layer 71 constituting the storage capacitor 70.

However, if the electrical connection between the TFT 30 and the pixel electrode 9a is realized by providing the electrical connection points at the "lower surface" in the figure of the first relay layer 71 as this aspect, the aforementioned trouble does not occur. The reason is that the process of remaining the first relay layers 71 while etching the precursor film of the capacitor electrode 300 and the dielectric film 75 is not necessary in this aspect, as clearly seen from FIG. 21.

In addition, the dielectric film 75 has a two-layered structure, as shown in FIG. 21, in which the lower layer is a silicon oxide film 75a and the upper layer is a silicon nitride film 75b, and is formed over the entire surface of the TFT array substrate 10. Furthermore, as another example of the dielectric film 75, the lower layer of the silicon oxide film 75a maybe formed over the entire surface of the TFT array substrate 10 and the upper layer of the silicon nitride film 75b may be patterned to be accommodated in a light-shielding region (a non-opening region), reducing preventing the decrease of the transmittance otherwise caused by the silicon nitride film having colorability.

As described above, according to this aspect, since the difficult etching process is not necessary, it is possible to realize a good electrical connection between the first relay layer 71 and the pixel electrode 9a. The reason is that the electrical connection is implemented through the relay electrode 719. In addition, for the same reason, according to this modified aspect, the probability that a short circuit occurs between the capacitor electrodes 300 and the first relay layers 71 becomes very low. Namely, it is possible to form non-defective storage capacitor 70 appropriately.

In addition, in this aspect, since the capacitor electrode 300 and the data line 6a are formed in different layers, it is not necessary to facilitate the electrical connection between them in the same plane similarly to FIG. 2, etc. Therefore, in this aspect, the capacitor electrode 300 can be formed as part of the lower light-shielding film 11a, that is, the portion of the capacitor line which extends in the direction of the "scanning lines 3a" of the aforementioned aspects. Furthermore, by doing so, in order to provide the capacitor electrodes 300 with a fixed potential, the capacitor lines are extended outside image display regions 10a to be connected with a constant potential source. In addition, in this case, since the capacitor lines themselves which include the capacitor electrodes 300 can be connected to the constant potential source independently and the shielding layer 404 can be also connected to the constant potential source independently, in case of employing this construction, the contact holes 801 and 803 for electrically connecting both constituents are not always necessary.

Furthermore, the data line 6a, the relay layer 6a1 for the shielding layer, and the second relay layer 6a2 may be formed of a three-layered film which includes a layer made of aluminum, a layer made of titanium nitride, and a layer made of silicon nitride film in this order from the bottom. It is preferable that the silicon nitride film be patterned to be slightly larger in size in order to cover the aluminum layer and the titanium nitride layer which are the lower layers thereof. Among them, since the data line 6a includes aluminum, a relatively low-resistance material, it is possible to efficiently supply the image signal to the TFT 30 and the pixel electrode 9a without delay. On the other hand, since the silicon nitride film which has a relatively excellent function of reducing or preventing water from permeating the data lines 6a is formed, it is possible to enhance the moisture proof property of the TFT 30 and thus to lengthen the life time of the TFTs 30. It is preferable that the silicon nitride film be a plasma silicon nitride film.

Figure 22A:
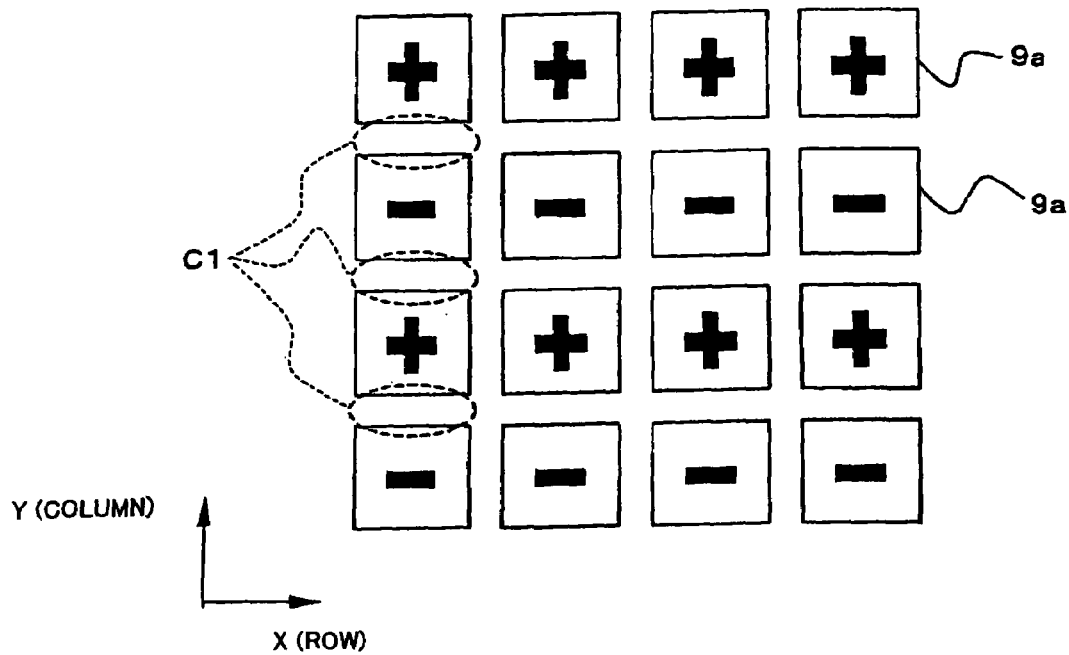
FIGS. 22(a) and 22(b) are a view for explaining a transverse electric field generating mechanism.
Figure 22B:
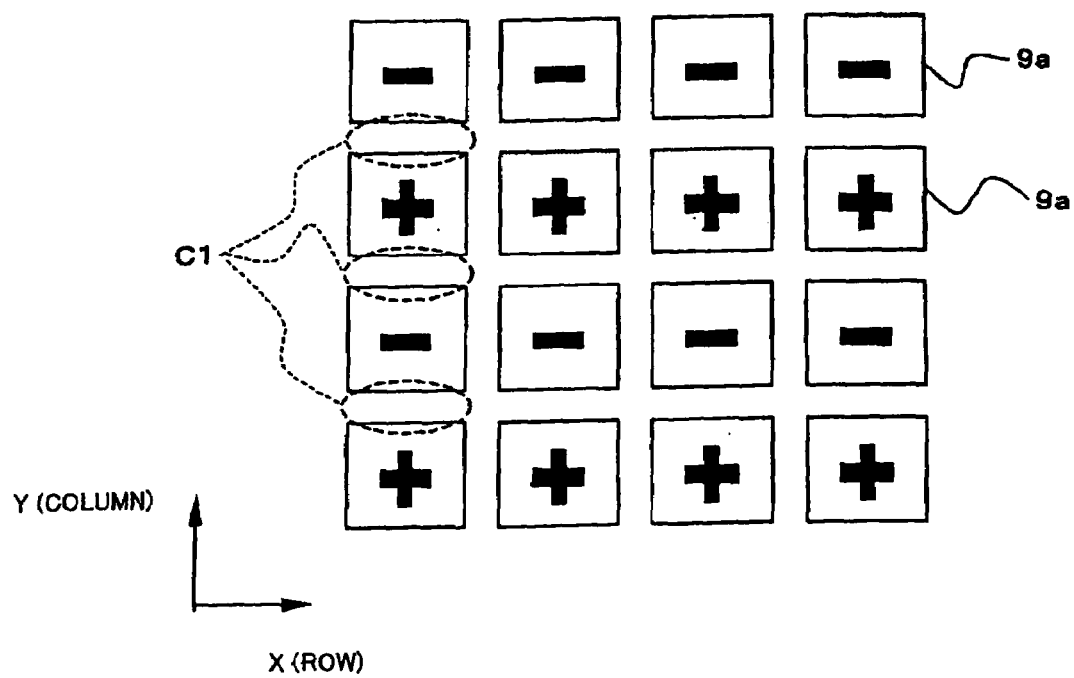

Construction of Planarization of Interlayer Insulating Film Below Pixel Electrode Now, the construction of the fourth interlayer insulating film 44 which is provided as a base of the aforementioned pixel electrode 9a, more specifically, the modified aspects of the planarization process on the fourth interlayer insulating film 44 will be described with reference to FIGS. 22 to 26. Herein, FIG. 22 is a view for explaining a transverse electric field generating mechanism.

Figure 23:
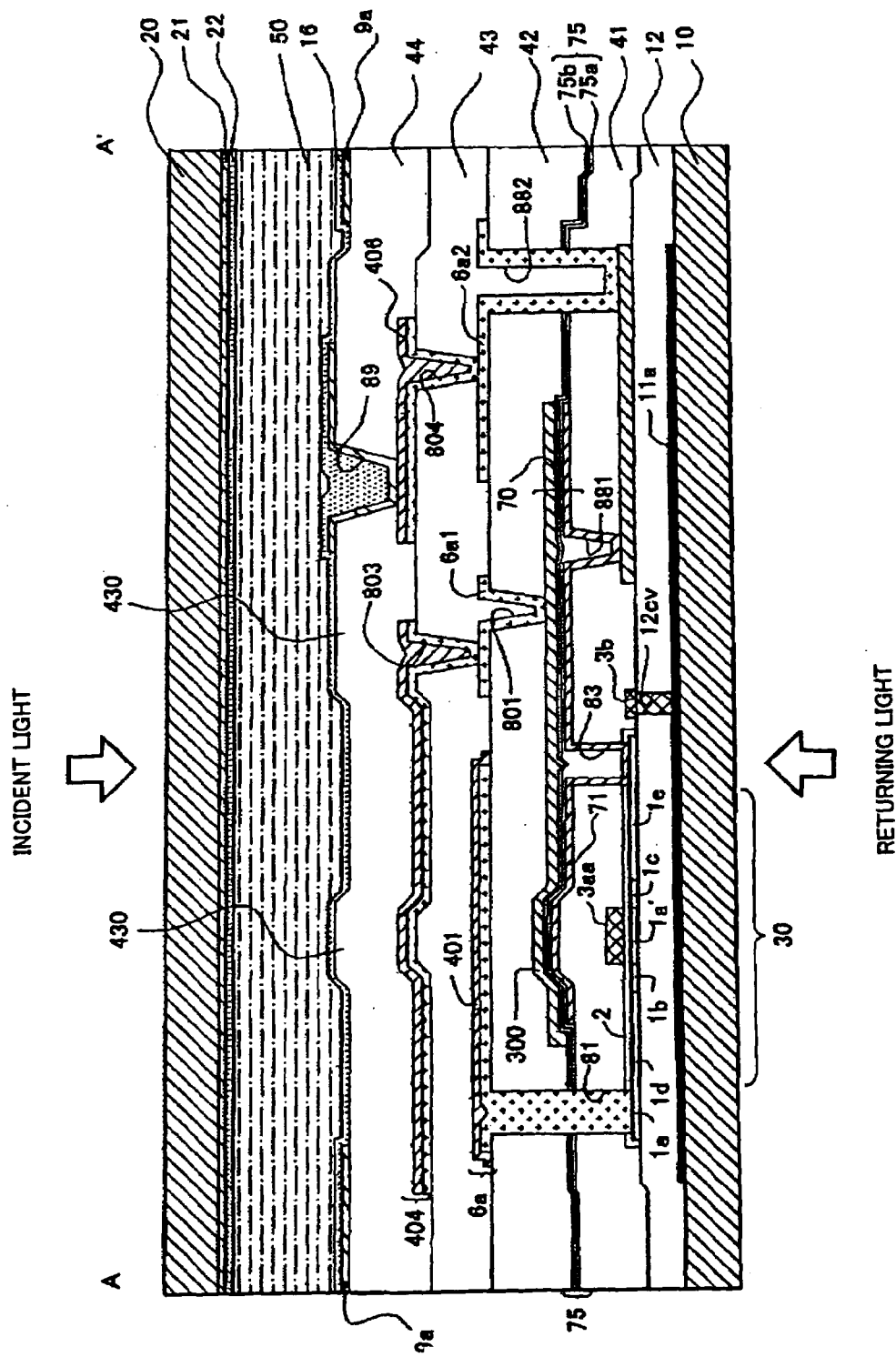
FIG. 23 is a view, in the same purpose as FIG. 4, but illustrating a configuration in which convex portions are formed in order to reduce or prevent the transverse electric field.
Figure 24:
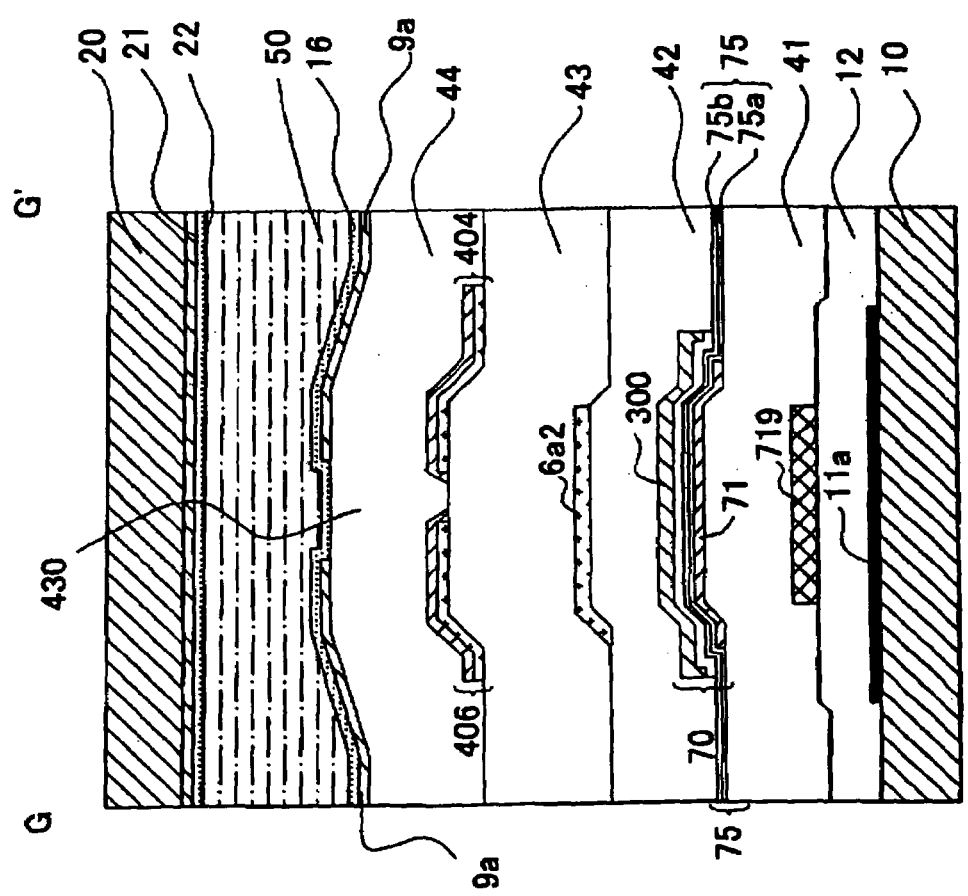
FIG. 24 is a cross sectional view taken along the plane G–G' of FIG. 20, illustrating a configuration in which convex portions are formed in order to reduce or prevent the transverse electric field.

Furthermore, FIG. 23 is a view, in the same purpose as FIG. 4, illustrating a configuration in which convex portions are formed in order to reduce or prevent the transverse electric field from being generated, and FIG. 24 is a cross sectional view taken along the plane G–G' of FIG. 20 illustrating a configuration in which convex portions are formed. In addition, FIGS. 25 and 26 will be referred later.

Although in the aforementioned aspects the interlayer insulating films below the pixel electrodes undergo the CMP process to have almost completely flat surfaces, the present invention is not limited to the aspects. Now, a configuration having functions and effects equivalent to, or better than those of the aforementioned configurations will be described.

In the aforementioned aspects, since the pixel electrode 9a and the alignment film 16 can be surely formed to be planarized, no disorder of the alignment state of the liquid crystal layer 50 occurs. However, there is the probability that the following trouble may occur.

Namely, in the electro-optical device similar to the exemplary embodiment, in order to reduce or prevent the deterioration of electro-optical materials due to the application of direct voltages and cross-talk or flicker in the image display, the inversion driving manner in which the polarity of the voltage applied to each of the pixel electrode 9a is inverted in accordance with a predetermined rule is generally employed. More specifically, the so-called "1H inversion driving manner" is described as follows.

First, as shown in FIG. 22(*a*), during the period in which image signals of the n-th field or frame are displayed (herein, n is a natural number), the polarity of the liquid crystal driving voltage which is represented by + or − for every pixel electrode 9a is not inverted, and the pixel electrode 9a is driven with the same polarity for every row. After that, as shown in FIG. 22(*b*), at the time that image signal of the (n+1)th field or one frame is displayed, the voltage polarity of the liquid crystal voltage for every pixel electrode 9a is inverted. During the period in which image signals of the (n+1)th field or one frame are displayed, the polarity of the liquid crystal driving voltage which is represented by + and − for every pixel electrode 9a is not inverted, and the pixel electrodes 9a are driven with the same polarity for every row. And then, the states shown in FIG. 22(*a*) and FIG. 22(*b*) are repeated at the period of one field or one frame. This is the driving in accordance with the 1H inversion driving manner. As a result, it is possible to reduce or prevent the disorder of liquid crystal due to the application of direct voltages and simultaneously to perform the image display with reduced cross-talk or flicker. In addition, it is advantageous that there is almost no longitudinal cross-talk in comparison to the below-described 1S inversion driving manner.

However, as seen from FIG. 22(*a*) and FIG. 22(*b*), in the 1H inversion driving manner, a transverse electric field is generated between the pixel electrodes 9a which are adjacent in the longitudinal direction (Y direction) in the figures. In the figures, the transverse electric field generating regions C1 are always in the vicinity of the gap between the pixel electrodes 9a which are adjacent in the Y direction. If the transverse electric field is applied to the electro-optical material to which the longitudinal electric field (that is, the electric field perpendicular to the surface of the substrate) generated between the pixel electrodes and the counter electrode which face each other is to be applied, the operational failure of the electro-optical material, such as a disorder of the liquid crystal occurs and the light leakage occurs at the portions, so that the problem of reduction in contrast rate is caused.

Although the region where the transverse electric field is generated can be covered and shielded by the light-shielding films, another problem in that the opening area of the pixels is reduced in accordance with the area of the regions where the transverse electric field is generated. In particular, in accordance with the miniaturization of the pixel pitch, the distance between the adjacent pixel electrodes is further reduced and the transverse electric field increases. Therefore, these problems are getting more serious as the electro-optical devices are formed with higher accuracy.

Therefore, in this aspect, the fourth interlayer insulating film 44 includes the convex portions 430 which extend in a stripe shape to the lateral direction, as shown in FIGS. 23 and 24, between the pixel electrodes 9a which are adjacent in the longitudinal direction in FIG. 22, that is, the adjacent pixel electrodes 9a to which potential of inverted polarity is applied, respectively.

According to the presence of the convex portions 430, it is possible to strengthen the longitudinal electric field and to lessen the transverse electric field in the vicinity of the edge of the pixel electrodes 9a provided on the convex portions 430. More specifically, as shown in FIGS. 23 and 24, the distance between the vicinity of the edge of the pixel electrodes 9a provided on the convex portions 430 and the counter electrode 21 is shortened by the height of the convex portions 430. Accordingly, it is possible to strengthen the longitudinal electric field between the pixel electrodes 9a and the counter electrode 21 at the transverse electric field generating regions Cl, as shown in FIG. 22. In addition, in FIGS. 23 and 24, since the gap between the adjacent pixel electrodes 9a is constant, the intensity of the transverse electric field increases regularly as the gap gets narrower.

Accordingly, as shown in FIG. 22, in the transverse electric field generating regions C1, it is possible to reduce or prevent the disorder of the liquid crystal due to the transverse electric field by making the longitudinal electric field more dominant. In addition, by the presence of the convex portions 430 which are made of an insulating film, since the intensity of the transverse electric field is lessened and the portions of the liquid crystal to which the transverse electric field is applied are reduced by the portions which are substituted with the convex portions 430 where the transverse electric field exists, it is possible to reduce the influence of the transverse electric field on the liquid crystal layer 50.

In addition, specifically, the convex portions 430 are formed, for example, as follows.

Figure 25:
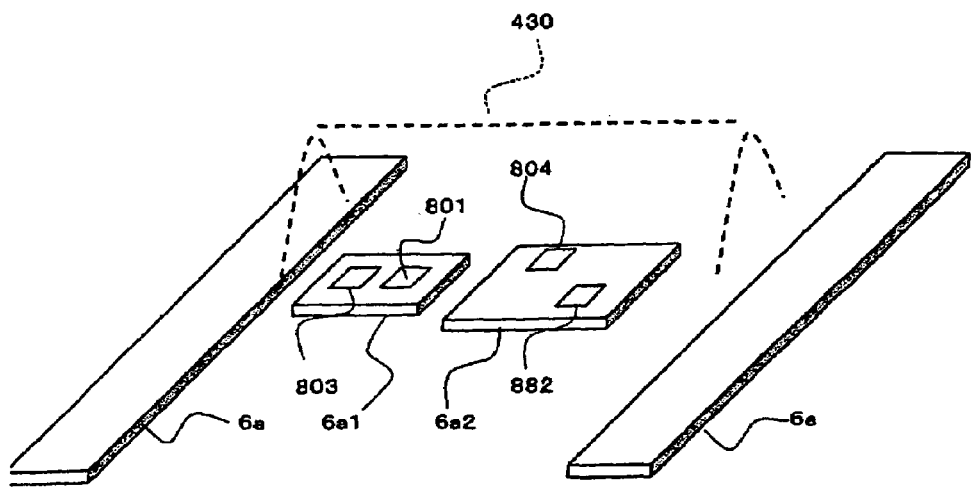
FIG. 25 is a perspective view relating to an electro-optical device as the configuration shown in FIGS. 20 and 21 and illustrating a specific configuration (a configuration using data lines, relay layers for the shielding layers, and second relay layers) in order to form the convex portions shown in FIGS. 23 and 24.
Figure 26:
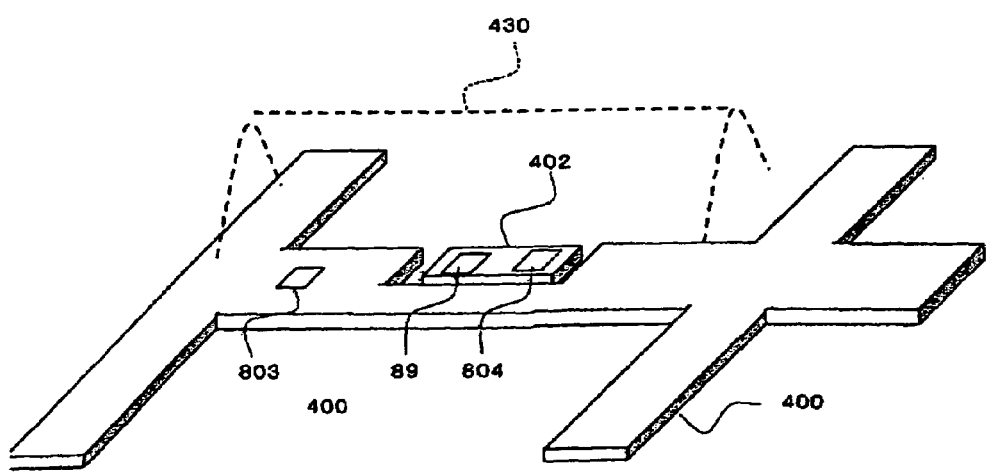
FIG. 26 is a perspective view relating to an electro-optical device as the configuration shown in FIGS. 20 and 21 and illustrating a specific configuration (a configuration using shielding layers and third relay layers) in order to form the convex portions shown in FIGS. 23 and 24.

Now, a specific exemplary embodiment to form the convex portions 430 will be described with reference to FIGS. 25 and 26. FIG. 25 is a perspective view illustrating the data lines and other constituents formed in the same layer as the data lines in an electro-optical device having the configuration as shown in FIGS. 20 and 21. FIG. 26 is a perspective view illustrating the data lines and other constituents formed in the same layer as the data lines. In these figures, the only construction to form the convex portions 430 is illustrated and the other various constituents are omitted in the illustration.

As the specific aspect to form the convex portions 430, first, the aspect that the data lines 6*a*, the relay layer 6*a*1 for the shielding layer, and the second relay layer 6*a*2 which are formed in the aforementioned electro-optical device shown in FIG. 25 are used is considered. In other words, as described above with reference to FIG. 20, the data lines 6*a* include the main line portions which extend linearly in the Y direction in FIG. 20, and the relay layer 6*a*1 for the shielding layer and the second relay layer 6*a*2 are formed overhang from the data lines 6*a* in the X direction in FIG. 20.

If the data lines 6*a*, the relay layer 6*a*1 for the shielding layer, and the second relay layer 6*a*2 are used, the convex portions 430 can be automatically formed on the surface of the fourth interlayer insulating film 44 as the base of the pixel electrodes 9*a* by their heights (see FIG. 25). In this case, it is to be understood that the "overhanging portion" corresponds to the aforementioned shielding relay layer 6*a*1 and the second relay layer 6*a*2.

Second, the exemplary embodiment that the shielding layer 404 and the third relay layer 406 which are formed in the aforementioned electro-optical device as shown in FIG. 26 are used is considered. In other words, the shielding layer 404 is formed in a lattice shape as described above with reference to FIG. 5, and the third relay layer 406 is formed of the same layer as the shielding layer 404. If the shielding layer 404 and the third relay layer 406 are used, the convex portions 430 can be automatically formed on the surface of the fourth interlayer insulating film 44 as the base of the pixel electrodes 9*a* by their heights (see FIG. 26). In this case, it is to be understood that "the overhanging portion" referred in the present invention corresponds to the portion of the shielding layer 404 which extends in the X direction which crosslinks the portion which extends in the Y direction of the shielding layer 404 shown in FIG. 20.

In addition, in each of the above cases, it is preferable that a suitable planarization process be performed on the surfaces of the interlayer insulating film formed as the base of the data lines 6*a* or the shielding layer 404. Such a construction enables the height of the convex portions 430 to be defined accurately. Furthermore, the exemplary embodiment that the shielding layers or the data lines are used to form the convex portions in this way can be similarly applied to the first exemplary embodiment.

Third, other than the exemplary embodiment that the convex portions 430 are provided on the surface of the fourth interlayer insulating film 44 as the base of the pixel electrodes 9*a* by adding some design to the construction of the lower layer of the pixel electrodes 9*a* as described above, in some cases, another exemplary embodiment may be employed in which a film for directly forming the convex portions 430 is newly formed on the surface of the fourth interlayer insulating film 44, and the patterning process is performed thereon, thereby forming the convex portions 430 may be employed.

Furthermore, it is preferable that the step difference formed by the convex portions 430 is gentle. The "gentle" convex portions may be implemented, for example, by the following processes: the steep convex portions are formed, a planarization film is formed on the steep convex portions and the peripherals thereof, the planarization film is removed, and an etch back process in which the surfaces of the convex portions which are exposed after removing the planarization film are recessed is performed.

If the "gentle" convex portions are provided, the rubbing process on the alignment film 16 can be relatively easily and excellently performed without any non-uniformity, so that it is possible to effectively reduce or prevent the operational failures of the electro-optical materials, such as the disorder of the liquid crystal. If the angle of the surface of the convex portions varies steeply, discontinuous planes occur in the electro-optical materials, such as liquid crystal, etc., and the operational failures of the electro-optical materials, such as a disorder of liquid crystal, etc. occur This is greatly different from the present aspect.

Furthermore, since the convex portions 430 are preferably formed along the scanning lines 3*a*, for example, in the case of the aforementioned 1H inversion driving, the formation of convex portions 430 may be implemented by constructing the laminated structure in which the height of the scanning lines 3*a* is kept as it is so as to reach the third interlayer insulating film 43. Alternatively, in some case, the CMP process is performed on the surface of the third interlayer insulating film 43 and then the convex portions are formed again along the scanning lines 3*a* as described above.

In addition, although the aforementioned cases are described as to the 1H inversion driving manner, the present invention is not limited to such a driving manner. For example, the present invention may be adapted to the 1S inversion driving manner, which is often used because it can be relatively easily controlled and provide high quality of images, and in which, while the pixel electrodes in the same column are driven with the potential of the same polarity, the voltage polarity is inverted at the frame or field period for every column. In addition, there is a recently developed dot inversion driving manner in which the polarity of the voltage applied to each of the pixel electrodes is inverted between the pixel electrodes which are adjacent to each other in both the column and row directions. The present invention can be also adapted to the dot inversion driving manner.

As described above in details, in the electro-optical device according to an aspect of the present invention, various comprehensive measures are taken, including: the elimination of capacitance coupling between the data lines 6*a* and the pixel electrodes 9*a* by the shielding layers 400, the enhancement of the image contrast according to the enhancement of the charge storage characteristics of the storage capacitors 70, the maintenance of the suitability of the alignment states of the liquid crystal according to the planarization of the third interlayer insulating film 43, or the accurate switching operation according to the suppression of the occurrence of the transverse electric field by the formation of the convex portions 430 which is performed subsequently after the planarization or without the planarization and the suppression of the light entering the semiconductor layer 1a of the TFTs 30. Moreover, these measures greatly contribute to implementation of the miniaturization and the high accuracy of the electro-optical device or the high frequency driving thereof. As a result, by taking the above-described measures, the electro-optical device according to the embodiments_can display very high quality of images.

Whole Construction of Electro-Optical Device

Figure 27:
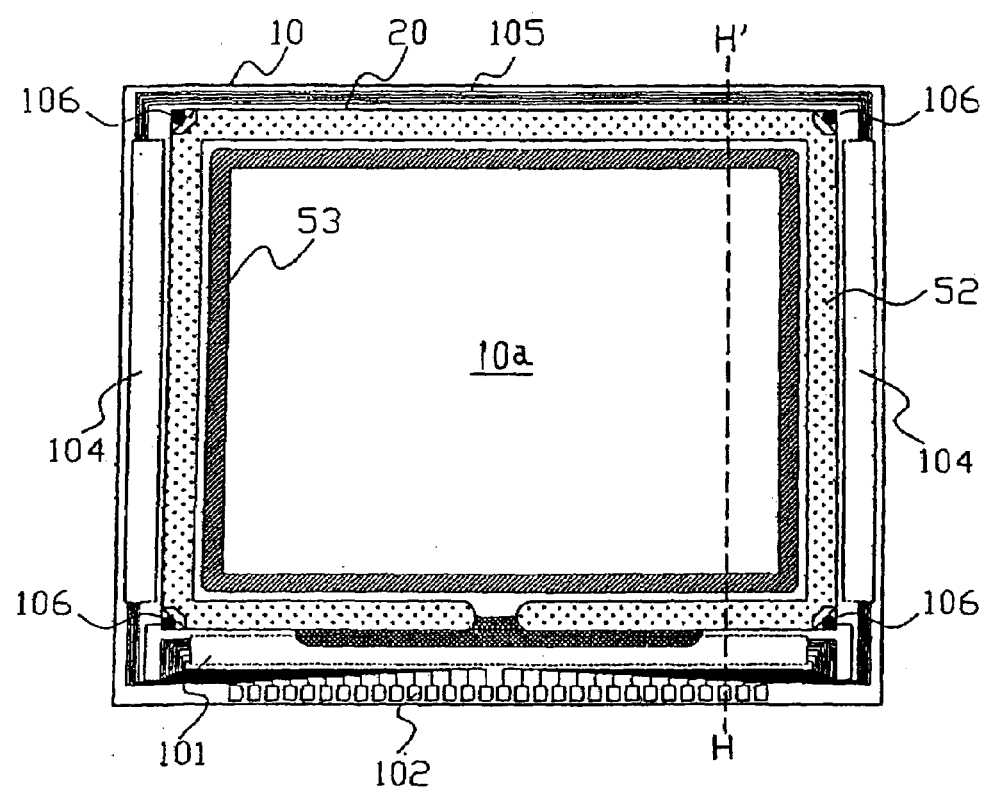
FIG. 27 is a plan view illustrating the TFT array substrate in the electro-optical device of an exemplary embodiment according to the present invention and the constituents formed thereon as viewed from the counter substrate side.

The whole construction of the electro-optical device in each of the exemplary embodiments will be described with reference to FIGS. 27 and 28. FIG. 27 is a plan view illustrating the TFT array substrate and the constituents formed thereon as viewed from the counter substrate 20 side, and FIG. 28 is a cross sectional view taken along the plane H–H' in FIG. 27.

Figure 28:
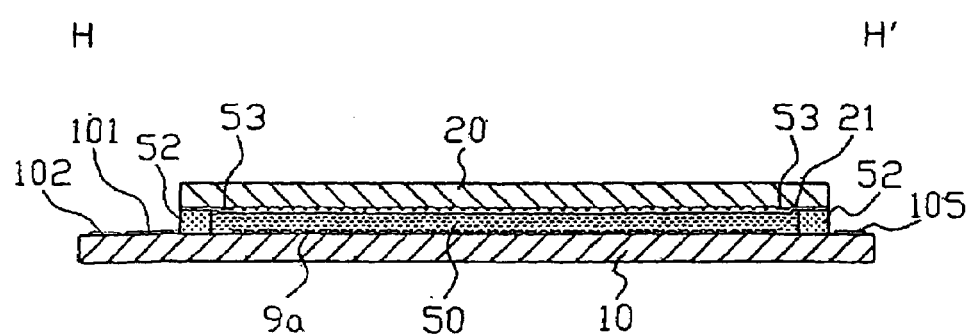
FIG. 28 is a cross sectional view taken along the plane H–H' in FIG. 27.

In FIGS. 27 and 28, with regard to the electro-optical device according to the present exemplary embodiment, the TFT array substrate 10 and the counter substrate 20 are provided to face each other. Between the TFT array substrate 10 and the counter substrate 20, liquid crystal layer 50 is sealed, and the TFT array substrate 10 and the counter substrate 20 are attached to each other with sealing materials 52 which are provided at the sealing regions where are located at the periphery of the image display regions 10a.

The sealing materials 52 are for attaching both substrates to each other and made of, for example, a ultra-violet curing resin or a thermo setting resin which are cured by ultra-violet irradiation, heating, etc. Furthermore, in the sealing materials 52, gap materials (spacers), such as glass fibers or glass beads may be dispersed in order to keep the distance (the gap between the substrates) between both substrates in a predetermined value if the liquid crystal device in the exemplary embodiments is a small liquid crystal device with a function of displaying enlarged images, such as a projector. Or, the gap materials may be included in the liquid crystal layer 50 if the liquid crystal device is a large liquid crystal device with a function of displaying images in the equal magnification power.

In the outside regions of the sealing materials 52, a data line driving circuit 101 which drives the data lines 6a by supplying the image signals to the data lines 6a at a predetermined timing and an external circuit connection terminals 102 are provided along one side of the TFT array substrate 10, and a scanning line driving circuit 104 which drives the scanning lines 3a by supplying the scanning signals to the scanning lines 3a at a predetermined timing, is provided along the two sides which are adjacent to the one side.

Incidentally, it is understood that as long as the delay of the scanning signals supplied to the scanning lines 3a is not considered to be a problem, the scanning line driving circuit 104 may be provided at only one side. Furthermore, the data line driving circuit 101 may be provided at both sides of the image display regions 10a.

At the remaining one side of the TFT array substrate 10, a plurality of wiring lines 105 are provided to connect between the scanning line driving circuits 104 which are provided at both sides of the image display regions 10a.

Furthermore, in at least one of the corner parts of the counter substrate 20, a conductive material 106 is provided to perform electrical conduction between the TFT array substrate 10 and the counter substrate 20.

In FIG. 28, on the TFT array substrate 10, an alignment film is provided over the pixel electrodes 9a on which the pixel switching TFTs or wiring lines such as scanning lines, data lines, or the like are formed in advance. On the other hand, on the counter substrate 20, in addition to the counter electrode 21, an alignment film is provided as the uppermost layer. Furthermore, the liquid crystal layer 50 includes, for example, one type liquid crystal or a mixture of various types of liquid crystal, and takes predetermined states between a pair of the alignment films.

In addition, on the TFT array substrate 10, a sampling circuit to apply the image signals to the plurality of the data lines 6a in a predetermined timing, a precharge circuit to supply precharge signals of a predetermined voltage level to the plurality of the data lines 6a in advance of the image signals, and a test circuit to check the quality, defects, etc., of the electro-optical device during the manufacturing stage or at the shipment stage may be provided in addition to the data line driving circuit 101, the scanning line driving circuits 104, etc.

Electronic Apparatus

Next, with regard to an exemplary embodiment of a projection type color display device as an example of the electronic apparatus for which the electro-optical device described above in details is used as a light valve, the whole construction, and particularly the optical construction will be described. Herein, FIG. 29 is a schematic cross sectional view of the projection type color display device.

Figure 29:
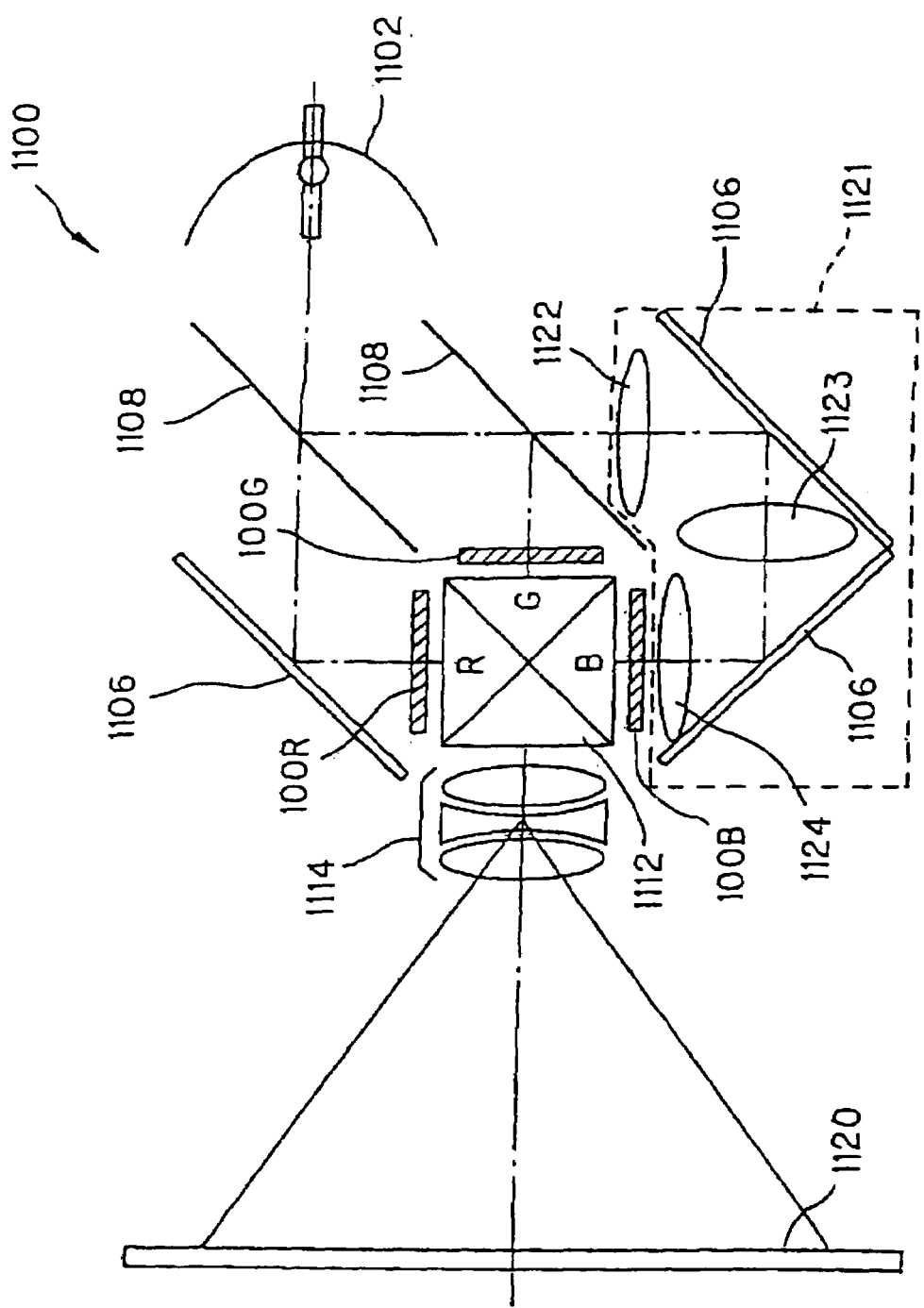
FIG. 29 is a schematic cross sectional view illustrating a color liquid crystal projector as an example of a projection type color display apparatus according to an exemplary embodiment of an electronic apparatus of the present invention.

In FIG. 29, the liquid crystal projector 1100, as an example of the projection type color display device according to the exemplary embodiment is provided with three liquid crystal modules each including a liquid crystal device in which driving circuits are mounted on the TFT array substrate, which are used as RGB light valves 100R, 100G, and 100B, respectively to construct a projector. In the liquid crystal projector 1100, when projection light is emitted from a lamp unit 1102 of a white light source such as a metal halide lamp, etc., the light is divided into light components R, G, and B corresponding to the three primary colors RGB by three mirrors 1006 and two dichroic mirrors 1108, and then guided to the light values 100R, 100G, and 100B corresponding to each color. At this time, in particular, the B light is guided through relay lens system 1121 which includes an incident lens 1122, a relay lens 1123, and an emitting lens 1124 in order to reduce or prevent light leakage due to its long light path. In addition, the light components corresponding to the three primary colors which are modulated by the light valves 100R, 100G, and 100G, respectively, are combined again by a dichroic prism 1112, and then projected as a color image on a screen 1120 through the projection lens 1114.

The present invention is not limited to the aforementioned exemplary embodiments, and can be appropriately modified without departing from the principle or spirit of the invention drawn out from the claims and the whole specification, and any electro-optical device and electronic apparatus involved in the modifications are also included into the technical scope of the present invention. The electro-optical device can be adapted to an electrophoresis device, an electroluminescent device, or a device using electron emitting elements (a field emission display and a surface-conduction electron-emitter display).

What is claimed is:

1. An electro-optical device comprising, above a substrate:
   a data line extending in a first direction;
   a scanning line extending in a second direction which intersects the data line;
   a pixel electrode and thin film transistor provided so as to correspond to an intersection region of the data line and the scanning line;
   a storage capacitor electrically connected to the thin film transistor and the pixel electrode, dielectric films which constitute the storage capacitor being made of at least two layers including different materials and one of the at least two layers being made of a material having a higher dielectric constant than that of the other layer;
   a relay layer that electrically connects the pixel electrode and the storage capacitor and that at least partially covers the storage capacitor to shade the storage capacitor from incident light; and
   a light shielding layer provided between the data line and the pixel electrode, the light shielding layer being formed along the data line and having a width wider than the width of the data line, the light shielding layer being formed to cover the entire data line in plan view, the light shielding layer at least partially covering the storage capacitor.

2. The electro-optical device according to claim 1, the dielectric films being made of silicon oxide films and silicon nitride films.

3. The electro-optical device according to claim 1, the storage capacitor being formed above a semiconductor layer of the thin film transistor and below the pixel electrode.

4. The electro-optical device according to claim 1, a planarization process being performed on surfaces of an interlayer insulating film which is positioned beneath the pixel electrode.

5. The electro-optical device according to claim 1, the data line being formed as the same film as one of a pair of electrodes of the storage capacitor.

6. The electro-optical device according to claim 1, the relay layer electrically connecting the pixel electrode to one of a pair of electrodes of the storage capacitor.

7. The electro-optical device according to claim 6, the light shielding layer and the relay layer having a multi-layer structure including a titanium nitride layer formed over an aluminum layer, the light shielding layer being formed from the same films as the relay layer.

8. The electro-optical device according to claim 1,
   the shielding layer being made of transparent conducting materials and formed in a mat shape over the entire surface of the substrate.

9. The electro-optical device according to claim 1,
   the thin film transistor including a semiconductor layer having a channel region which extends in a longitudinal direction and a channel adjacent region which extends in the longitudinal direction further from the channel region; and
   the scanning line including a main body part extending in a direction intersecting the longitudinal direction and having a gate electrode of the thin film transistor overlapping the channel region in plan view, and
   a horizontal protrusion protruding from the main body part in the longitudinal direction at a side of the channel adjacent region in plan view.

10. The electro-optical device according to claim 1, the thin film transistor including a semiconductor layer having a channel region which extends in a longitudinal direction,
    the electro-optical device further comprising
    an upper light-shielding film covering at least the channel region of the thin film transistor from the upper side,
    at least a part of the upper light-shielding film being formed in a concave shape in the cross section which is perpendicular to the longitudinal direction of the channel region as viewed from the channel region.

11. The electro-optical device according to claim 1,
    the thin film transistor including a semiconductor layer having a channel region which extends in the first direction, and
    the scanning line including a main line portion having a gate electrode of the thin film transistor which faces the channel region with a gate insulating film interposed therebetween and extending in the second direction which intersects the first direction in plan view, and
    a surrounding portion extending to at least partially surround the semiconductor layer from the main line portion at a position which is separated from the channel region by a predetermined distance in the second direction in plan view.

12. The electro-optical device according to claim 1,
    the thin film transistor including a semiconductor layer having a channel region which extends in the first direction, and
    the scanning line including a main line portion having a gate electrode of the thin film transistor which faces the channel region with a gate insulating film interposed therebetween and extending in the second direction which intersects the first direction in plan view, and
    a vertical protrusion protruding downwardly from the main line portion at a position which is separated from the channel region by a predetermined distance in the second direction in plan view.

13. The electro-optical device according to claim 12, further comprising,
    on the substrate, a lower light-shielding film which covers at least the channel region from the lower side,
    the vertical protrusion contacting the lower light-shielding film at a front end thereof.

14. The electro-optical device according to claim 1,
    the thin film transistor including a semiconductor layer having a channel region which extends in the first direction, and
    the scanning line including a main line portion having a gate electrode of the thin film transistor which faces the channel region with a gate insulating film interposed therebetween and extending in the second direction which intersects the first direction in plan view,
    the main line portion including an inside-groove portion which is provided inside a groove which is etched in the substrate and covers at least a part of the channel region from the side.

15. The electro-optical device according to claim 1,
    the thin film transistor including semiconductor layer having a channel region which extends in the first direction, and
    the scanning line including a main line portion having a gate electrode of the thin film transistor which faces the channel region with a gate insulating film interposed therebetween and extending in the second direction which intersects the first direction in plan view,
    the main line portion including an inside-groove portion which extends in the second direction and is provided an inside groove which is etched in the substrate, and an outside-groove portion which extends in the second direction and is provided outside the inside groove.

16. The electro-optical device according to claim 1, a plurality of pixel electrodes are arranged in a plane and include a first pixel electrode group which is inversely driven at a first period and a second pixel electrode group which is inversely driven at a second period which is complementary to the first period, at least one of the data line or the shielding layer including a main line portion which is extended to an upper side of the scanning line so as to intersect the scanning line, and an overhanging portion which overhangs the scanning line;

a counter electrode which faces the plurality of the pixel electrodes on a counter substrate which is provided opposite to the substrate; and convex portions being formed on base surfaces of the pixel electrodes on the substrate corresponding to the overhanging portions, the convex portions being regions of gaps between the pixel electrodes, which are adjacent to each other with scanning lines interposed therebetween in plan view.

17. The electro-optical device according to claim 1, a plurality of pixel electrodes are arranged in a plane and include a first pixel electrode group which is inversely driven at a first period and a second pixel electrode group which is inversely driven at a second period which is complementary to the first period;

a counter electrode which faces the plurality of the pixel electrodes on a counter substrate which is provided opposite to the substrate; and convex portions formed in regions of gaps between the pixel electrodes which are adjacent to each other in plan view, the convex portions having gentle step differences which are formed by removing planarization films which are formed in advance on the convex portions by an etching process and causing the surfaces of the convex portions which are exposed after removing to be receded.

18. An electronic apparatus including an electro-optical device, the electro-optical device comprising, above a substrate:

a data line extending in a first direction;

a scanning line extending in a second direction which intersects the data line;

a pixel electrode and a thin film transistor provided so as to correspond to an intersection region of the data line and the scanning line;

a storage capacitor electrically connected to the thin film transistor and the pixel electrode, dielectric films which constitute the storage capacitor being made of at least two layers including different materials and one of the at least two layers being made of a material having a higher dielectric constant than that of the other layer;

a relay layer that electrically connects the pixel electrode and the storage capacitor and that at least partially covers the storage capacitor to shade the storage capacitor from incident light; and a light shielding layer provided between the data line and the pixel electrode, the light shielding layer being formed along the data line and having a width wider than the width of the data line, the light shielding layer being formed to cover the entire data line in plan view, the light shielding layer at least partially covering the storage capacitor.

19. The electro-optical device according to claim 11, the surrounding portion extending to entirely surround the semiconductor layer from the main line portion.

20. An electro-optical device comprising, above a substrate:

a data line extending in a first direction;

a scanning line extending in a second direction which intersects the data line;

a pixel electrode and thin film transistor provided so as to correspond to an intersection region of the data line and the scanning line;

a storage capacitor electrically connected to the thin film transistor and the pixel electrode; and a relay layer that electrically connects the pixel electrode and the storage capacitor and that at least partially covers the storage capacitor to shade the storage capacitor from incident light.

* * * * *